US011200542B2

(12) United States Patent
Jon et al.

(10) Patent No.: US 11,200,542 B2
(45) Date of Patent: Dec. 14, 2021

(54) INTELLIGENT APPOINTMENT SUGGESTIONS

(71) Applicant: Apple Inc., Cupertino, CA (US)

(72) Inventors: Tiffany S. Jon, Cupertino, CA (US); Stephen O. Lemay, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 637 days.

(21) Appl. No.: 14/500,978

(22) Filed: Sep. 29, 2014

(65) Prior Publication Data

US 2015/0347983 A1  Dec. 3, 2015

Related U.S. Application Data

(60) Provisional application No. 62/005,093, filed on May 30, 2014.

(51) Int. Cl.
*G06Q 10/00* (2012.01)
*G06Q 10/10* (2012.01)
(Continued)

(52) U.S. Cl.
CPC ....... *G06Q 10/1095* (2013.01); *G06F 3/0481* (2013.01); *G06F 3/0482* (2013.01);
(Continued)

(58) Field of Classification Search
CPC .. G06Q 10/1095; G06Q 10/109; G06F 3/048; G06F 3/0482; G06F 3/0488; G06F 2203/04806; G06F 2203/04808
(Continued)

(56) References Cited

U.S. PATENT DOCUMENTS 5,570,109 A   10/1996 Jenson
5,825,308 A   10/1998 Rosenberg
(Continued)

FOREIGN PATENT DOCUMENTS

CA   2997146 A1 *  1/2019  ......... G06Q 10/1095
CN   101198976 A   6/2008
(Continued)

OTHER PUBLICATIONS

International Preliminary Report on Patentability Received for PCT Patent Application No. PCT/US2015/033271, dated Dec. 15, 2016, 8 pages.
(Continued)

*Primary Examiner* — Rutao Wu
*Assistant Examiner* — Tyrone E Singletary
(74) *Attorney, Agent, or Firm* — Dentons US LLP

(57) ABSTRACT

Some embodiments provide a method for automatically generating an appointment for an electronic calendar. The method receives input to create a new appointment for the calendar. The method analyzes several previous appointments stored for the first calendar. Based on the analysis, the method automatically proposes a new appointment that has at least one appointment characteristic shared with at least one past appointment stored for the calendar. In some embodiments, the method receives text input describing a characteristic of the new appointment, and searches through the previous appointments using the text input.

37 Claims, 35 Drawing Sheets

(51) Int. Cl.
*G06F 3/0482* (2013.01)
*G06F 3/0488* (2013.01)
*G06F 3/0481* (2013.01)
*G06F 3/0484* (2013.01)

(52) U.S. Cl.
CPC .......... *G06F 3/0484* (2013.01); *G06F 3/0488* (2013.01); *G06F 2203/04806* (2013.01); *G06F 2203/04808* (2013.01)

(58) Field of Classification Search
USPC ....................................................... 705/7.18
See application file for complete search history.

(56) References Cited

U.S. PATENT DOCUMENTS

| | | | |
|---|---|---|---|
| 5,825,355 A | 10/1998 | Palmer et al. | |
| 5,873,108 A | 2/1999 | Goyal et al. | |
| 5,974,394 A | 10/1999 | Nakayama et al. | |
| 6,278,443 B1 | 8/2001 | Amro et al. | |
| 6,323,883 B1 | 11/2001 | Minoura et al. | |
| 6,388,877 B1 | 5/2002 | Canova, Jr. et al. | |
| 6,430,574 B1 | 8/2002 | Stead | |
| 6,469,695 B1 | 10/2002 | White | |
| 6,556,222 B1 | 4/2003 | Narayanaswami | |
| 6,603,489 B1* | 8/2003 | Edlund ................ | G06Q 10/109 715/201 |
| 6,604,059 B2* | 8/2003 | Strubbe ............... | G06Q 10/109 700/295 |
| 6,690,365 B2 | 2/2004 | Hinckley et al. | |
| 6,919,879 B2 | 7/2005 | Griffin et al. | |
| 6,966,037 B2 | 11/2005 | Fredriksson et al. | |
| 7,030,861 B1 | 4/2006 | Westerman et al. | |
| 7,054,965 B2 | 5/2006 | Bell et al. | |
| 7,376,605 B2 | 5/2008 | Weisberg | |
| 7,404,152 B2 | 7/2008 | Zinn et al. | |
| 7,786,975 B2 | 8/2010 | Ording et al. | |
| 7,922,096 B2 | 4/2011 | Eilersen | |
| 8,069,417 B2 | 11/2011 | Brush et al. | |
| 8,275,837 B1 | 9/2012 | Alexander et al. | |
| 8,327,272 B2 | 12/2012 | Anzures et al. | |
| 8,429,292 B2 | 4/2013 | Adams et al. | |
| 8,712,820 B2 | 4/2014 | Gingras et al. | |
| 8,799,826 B2 | 8/2014 | Missig et al. | |
| 9,330,381 B2 | 5/2016 | Anzures et al. | |
| 9,454,290 B2 | 9/2016 | Ma et al. | |
| 9,454,519 B1 | 9/2016 | Keysers et al. | |
| 10,402,782 B2 | 9/2019 | Moore et al. | |
| 2001/0014867 A1 | 8/2001 | Conmy et al. | |
| 2002/0186252 A1 | 12/2002 | Himmel et al. | |
| 2003/0128192 A1 | 7/2003 | van Os | |
| 2003/0226152 A1 | 12/2003 | Bilimaier et al. | |
| 2004/0093290 A1 | 5/2004 | Doss et al. | |
| 2004/0100479 A1 | 5/2004 | Nakano et al. | |
| 2004/0252109 A1 | 12/2004 | Trent, Jr. et al. | |
| 2005/0071761 A1 | 3/2005 | Kontio | |
| 2005/0108235 A1 | 5/2005 | Sato et al. | |
| 2005/0108253 A1 | 5/2005 | Metsatahti et al. | |
| 2005/0210403 A1 | 9/2005 | Satanek | |
| 2006/0026051 A1* | 2/2006 | Rose ..................... | G06Q 10/10 705/80 |
| 2006/0026356 A1 | 2/2006 | Okawa et al. | |
| 2006/0026536 A1 | 2/2006 | Hotelling et al. | |
| 2006/0069604 A1 | 3/2006 | Leukart et al. | |
| 2006/0197753 A1 | 9/2006 | Hotelling | |
| 2006/0265263 A1 | 11/2006 | Burns | |
| 2006/0282298 A1 | 12/2006 | Azvine et al. | |
| 2006/0293943 A1 | 12/2006 | Tischhauser et al. | |
| 2007/0030256 A1 | 2/2007 | Akaike et al. | |
| 2007/0132789 A1 | 6/2007 | Ording et al. | |
| 2007/0150830 A1 | 6/2007 | Ording et al. | |
| 2007/0180375 A1 | 8/2007 | Gittelman et al. | |
| 2008/0033779 A1 | 2/2008 | Coffman et al. | |
| 2008/0034047 A1 | 2/2008 | Rosenberg et al. | |
| 2008/0052643 A1 | 2/2008 | Ike et al. | |
| 2008/0134081 A1 | 6/2008 | Jeon et al. | |
| 2008/0148181 A1 | 6/2008 | Reyes et al. | |
| 2008/0163111 A1* | 7/2008 | Lee ....................... | G06Q 10/109 715/810 |
| 2008/0165151 A1 | 7/2008 | Lemay et al. | |
| 2008/0244425 A1 | 10/2008 | Kikin-Gil et al. | |
| 2008/0270886 A1 | 10/2008 | Gossweiler et al. | |
| 2008/0294994 A1 | 11/2008 | Kruger et al. | |
| 2009/0165022 A1* | 6/2009 | Madsen ................ | G06Q 10/109 719/318 |
| 2009/0172606 A1 | 7/2009 | Dunn et al. | |
| 2009/0174680 A1 | 7/2009 | Anzures et al. | |
| 2009/0204904 A1* | 8/2009 | Mujkic ................ | G06Q 10/109 715/753 |
| 2009/0210351 A1 | 8/2009 | Bush et al. | |
| 2009/0228322 A1 | 9/2009 | Van Os et al. | |
| 2009/0255153 A1 | 10/2009 | Mori et al. | |
| 2010/0099462 A1 | 4/2010 | Baek et al. | |
| 2010/0162105 A1 | 6/2010 | Beebe et al. | |
| 2010/0271312 A1 | 10/2010 | Alameh et al. | |
| 2010/0293029 A1 | 11/2010 | Olliphant | |
| 2011/0029862 A1* | 2/2011 | Scott ..................... | G06F 3/0237 715/261 |
| 2011/0078622 A1 | 3/2011 | Missig et al. | |
| 2011/0167369 A1 | 7/2011 | Van Os | |
| 2011/0167382 A1 | 7/2011 | Van Os | |
| 2011/0173221 A1 | 7/2011 | Ahiakpor et al. | |
| 2011/0184768 A1* | 7/2011 | Norton .................. | G06Q 10/02 705/5 |
| 2011/0202861 A1 | 8/2011 | Fritzley et al. | |
| 2011/0234633 A1 | 9/2011 | Ogura et al. | |
| 2011/0239146 A1* | 9/2011 | Dutta .................... | G06Q 10/109 715/768 |
| 2012/0030194 A1* | 2/2012 | Jain ...................... | G06F 3/0481 707/722 |
| 2012/0204123 A1 | 8/2012 | Bauer et al. | |
| 2012/0212421 A1 | 8/2012 | Honji et al. | |
| 2013/0080923 A1 | 3/2013 | Anzures et al. | |
| 2013/0227432 A1 | 8/2013 | Lin | |
| 2013/0326385 A1 | 12/2013 | Verstraete | |
| 2014/0033118 A1 | 1/2014 | Baird | |
| 2014/0036639 A1 | 2/2014 | Boni et al. | |
| 2014/0040741 A1* | 2/2014 | van Os ................. | G06F 3/0484 715/719 |
| 2014/0082536 A1 | 3/2014 | Costa et al. | |
| 2014/0225897 A1 | 8/2014 | Sarrazin et al. | |
| 2014/0267094 A1 | 9/2014 | Hwang et al. | |
| 2014/0267130 A1 | 9/2014 | Hwang et al. | |
| 2014/0365107 A1 | 12/2014 | Dutta et al. | |
| 2015/0046856 A1 | 2/2015 | Rucker et al. | |
| 2015/0058425 A1* | 2/2015 | Nathan ................. | H04L 65/403 709/206 |
| 2015/0095087 A1* | 4/2015 | Adderly .............. | G06Q 10/1095 705/7.19 |
| 2015/0143303 A1 | 5/2015 | Sarrazin et al. | |
| 2015/0212684 A1 | 7/2015 | Sabia et al. | |
| 2015/0248199 A1 | 9/2015 | Lemay et al. | |
| 2015/0249742 A1* | 9/2015 | Li ....................... | H04M 3/42348 455/414.1 |
| 2015/0347586 A1* | 12/2015 | Fasen .................. | G06Q 10/1093 707/722 |
| 2015/0347980 A1* | 12/2015 | White ................. | G06Q 10/1095 705/7.19 |
| 2015/0347982 A1 | 12/2015 | Lemay et al. | |
| 2015/0379476 A1 | 12/2015 | Chaudhri et al. | |
| 2016/0202859 A1 | 7/2016 | Anzures et al. | |
| 2018/0218240 A1 | 8/2018 | Kumar et al. | |
| 2018/0218340 A1 | 8/2018 | Jon et al. | |

FOREIGN PATENT DOCUMENTS

| | | |
|---|---|---|
| DE | 19621593 A1 | 12/1997 |
| DE | 29824936 U1 | 7/2003 |
| EP | 0540442 A3 | 1/1995 |
| EP | 0713187 A2 | 5/1996 |
| EP | 0880091 A2 | 11/1998 |
| EP | 0994409 A2 | 4/2000 |
| EP | 1679879 A2 | 7/2006 |

(56) References Cited

FOREIGN PATENT DOCUMENTS

| | | | | | |
|---|---|---|---|---|---|
| EP | 2547117 | A1 | 1/2013 | | |
| EP | 2693382 | A2 | 2/2014 | | |
| EP | 2733598 | A2 | 5/2014 | | |
| JP | 3-263173 | A | 11/1991 | | |
| JP | 7-123380 | A | 5/1995 | | |
| JP | 10-91685 | A | 4/1998 | | |
| JP | 2009-205682 | A | 9/2009 | | |
| JP | 2012-503822 | A | 2/2012 | | |
| JP | 2012-173890 | A | 9/2012 | | |
| JP | 5711077 | B2 | 3/2015 | | |
| KR | 20130091197 | A | * 8/2013 | ........... | G06Q 10/109 |
| WO | 99/15982 | A1 | 4/1999 | | |
| WO | WO-0225513 | A2 | * 3/2002 | ........... | G06Q 10/109 |
| WO | 2006/020305 | A2 | 2/2006 | | |

OTHER PUBLICATIONS

International Search Report and Written Opinion received for PCT Patent Application No. PCT/US2015/033271, dated Aug. 6, 2015, 11 pages.

Non-Final Office Action received for U.S. Appl. No. 14/500,974, dated Nov. 3, 2016, 17 pages.

Ahlberg et al., "The Alphaslider: A Compact and Rapid Selector", CHI '94 Proceedings of the SIGCHI Conference on Human Factors in Computing Systems, Apr. 24-28, 1994, pp. 365-371.

Al-Baker, Asri, "AquaCalendar, a Review by i-Symbian.Com", available at <http://www.i-symbian.com/forum/artlcles.php?action=viewarticle&artid=40>, 2005, 11 pages.

Arar, Yardena, "Microsoft Reveals Office 2003 Prices, Release", PC World, http://www.pcworld.com/article/112077/microsoft_reveals_office_2003_prices_release.html, Aug. 19, 2003, 3 pages.

Ellis Benus, "Use a Phone Number in Google Calender Where Line for One Click Calling", Oct. 31, 2012, 5 pages.

Extended European Search Report received for European Patent Application No. 09162953.5, dated Sep. 2, 2009, 6 pages.

Extended European Search Report received for European Patent Application No. 16190252.3, dated Mar. 1, 2017, 10 pages.

Final Office Action received for U.S. Appl. No. 11/322,553, dated Aug. 5, 2008, 25 pages.

Final Office Action received for U.S. Appl. No. 11/969,786, dated May 9, 2012, 39 pages.

Final Office Action received for U.S. Appl. No. 11/969,786, dated Jun. 15, 2011, 22 pages.

Final Office Action received for U.S. Appl. No. 12/567,171, dated Jan. 3, 2013, 12 pages.

Gsmarena Team, "Sony Ericsson P990 Review: A Coveted Smartphone", available at <http://web.archive.org/web/20061227185520//http://www.gsmarena.com/sony_ericsson_P990-review-101p8.php>, Aug. 4, 2006, 3 pages.

International Preliminary Report on Patentability received for PCT Patent Application No. PCT/US2006/061337, dated Jun. 11, 2008, 6 pages.

International Preliminary Report on Patentability received for PCT Patent Application No. PCT/US2008/050423, dated Jul. 7, 2009, 11 pages.

International Preliminary Report on Patentability received for PCT Patent Application No. PCT/US2015/038173, dated Jan. 5, 2017, 10 pages.

International Preliminary Report on Patentability received for PCT Patent Application No. PCT/US2015/038174, dated Jan. 5, 2017, 27 pages.

International Search Report and Written Opinion received for PCT Application No. PCT/US2015/038174, dated Jan. 18, 2016, 38 pages.

International Search Report and Written Opinion received for PCT Patent Application No. PCT/US2006/061337, dated Feb. 15, 2008, 7 pages.

International Search Report and Written Opinion received for PCT Patent Application No. PCT/US2008/050423, dated Sep. 1, 2008, 15 pages.

International Search Report and Written Opinion received for PCT Patent Application No. PCT/US2015/038173 dated Sep. 25, 2015, 13 pages.

Invitation to Pay Additional Fees Due received for PCT Patent Application No. PCT/US2015/038174, dated Oct. 5, 2015, 5 pages.

"Microsoft Outlook 2003 Basic Guide", available at<http://it.med.miami.edu/documents/outlook_2003_guide.pdf>, Aug. 15, 2005, 32 pages.

Microsoft, "Microsoft Outlook Calendar", Available at <http://emedia.leeward.hawaii.edu/teachtech/documents/Personal__Manage/MSOutlook_Cal.pdf>, May 3, 2012, 9 pages.

Non Final Office Action received for U.S. Appl. No. 14/581,766, dated Dec. 30, 2016, 37 pages.

Non-Final Office Action received for U.S. Appl. No. 12/242,856, dated May 21, 2012, 8 pages.

Non-Final Office Action received for U.S. Appl. No. 11/322,553, dated Apr. 5, 2010, 18 pages.

Non-Final Office Action received for U.S. Appl. No. 11/322,553, dated Dec. 26, 2008, 26 pages.

Non-Final Office Action received for U.S. Appl. No. 11/322,553, dated Feb. 5, 2008, 11 pages.

Non-Final Office Action received for U.S. Appl. No. 11/322,553, dated Jun. 15, 2007, 16 pages.

Non-Final Office Action received for U.S. Appl. No. 11/322,553, dated Jun. 17, 2009, 27 pages.

Non-Final Office Action received for U.S. Appl. No. 11/969,786, dated Dec. 8, 2011, 21 pages.

Non-Final Office Action received for U.S. Appl. No. 11/969,786, dated Feb. 11, 2011, 27 pages.

Non-Final Office Action received for U.S. Appl. No. 12/567,171, dated Jul. 6, 2012, 13 pages.

Non-Final Office Action received for U.S. Appl. No. 13/666,944, dated Oct. 3, 2014, 8 pages.

Non-Final Office Action received for U.S. Appl. No. 15/078,767, dated Nov. 18, 2016, 7 pages.

Notice of Allowance received for U.S. Appl. No. 12/242,856, dated Oct. 18, 2012, 5 pages.

Notice of Allowance received for U.S. Appl. No. 12/567,171, dated Apr. 1, 2014, 8 pages.

Notice of Allowance received for U.S. Appl. No. 12/567,171, dated Oct. 4, 2013, 9 pages.

Notice of Allowance received for U.S. Appl. No. 13/666,944, dated Apr. 21, 2015, 5 pages.

Notice of Allowance received for U.S. Appl. No. 13/666,944, dated Aug. 18, 2015, 5 pages.

Notice of Allowance received for U.S. Appl. No. 13/666,944, dated Jul. 31, 2015, 2 pages.

Notice of Allowance received for U.S. Appl. No. 13/666,944, dated Sep. 17, 2015, 2 pages.

Notice of Allowance received for U.S. Appl. No. 15/078,767, dated Jun. 5, 2017, 5 pages.

Office Action received for Australian Patent Application No. 2015279544, dated Apr. 18, 2017, 4 pages.

Office Action received for Australian Patent Application No. 2016231598, dated Apr. 7, 2017, 5 Pages.

Office Action received for Australian Patent Application No. 2015279545, dated Apr. 13, 2017, 3 pages.

Office Action Received for European Patent Application No. 06846397.5, dated Aug. 15, 2013, 6 pages.

Office Action received for European Patent Application No. 06846397.5, dated Jan. 28, 2009, 5 pages.

Office Action received for European Patent Application No. 06846397.5, dated Jun. 20, 2016, 7 pages.

Office Action Received for European Patent Application No. 06846397.5, dated Oct. 27, 2015, 6 pages.

Office Action Received for European Patent Application No. 09162953.5, dated Aug. 15, 2013, 5 pages.

Office Action received for European Patent Application No. 09162953.5, dated Jan. 27, 2010, 6 pages.

(56) References Cited

OTHER PUBLICATIONS

Office Action received for European Patent Application No. 09162953.5, dated Jun. 20, 2016, 7 pages.
Office Action Received for European Patent Application No. 09162953.5, dated Oct. 27, 2015, 6 pages.
Office Action received for Taiwanese Patent Application No. 104120843, dated Jan. 30, 2016, 5 pages (1 page of English Translation and 4 pages of Official Copy).
Potala Software, "My Time!", Available at <http://web.archive.org/web/20060615204517/potalasoftware.com/Products/MyTime/Default.aspx>, Jun. 2006, 2 pages.
Ramos, "Zliding: Fluid Zooming and Sliding for High Precision Parameter Manipulation", Proceedings of the 18th annual ACM Symposium on User Interface Software and Technology, Oct. 2005, pp. 143-152.
Rekimoto, Jun, "SmartSkin: An Infrastructure for Freehand Manipulation on Interactive Surfaces", Proceedings of the SIGCHI conference on Human factors in Computing Systems, vol. 4, No. 1, Apr. 20-25, 2002, pp. 113-120.
Smith, Rush, "Sygic. Mobile Contacts V1.0", Available online at: http://www.pocketnow.com/index.php?a=portal_detail&t=reviews&id=467, Sep. 2, 2004, 13 pages.
Tablet Talk, "Tablet Talk App: Frequently Asked Questions—Tablet Talk", URL:https://web.archive.org/web/20140625102903/http://1www.tablettalkapp.com/faq/, Jun. 25, 2014, 6 pages.
Notice of Allowance received for U.S. Appl. No. 14/500,974, dated Jun. 7, 2017, 9 pages.
Final Office Action received for U.S. Appl. No. 14/500,974, dated Mar. 24, 2017, 17 pages.
Office Action received for Australian Patent Application No. 2015266735, dated Mar. 28, 2017, 3 pages.
Office Action received in Japanese Patent Application No. 2017-515031, dated Feb. 5, 2018, 6 pages (3 pages of English Translation and 3 pages of Official Copy).
Office Action received for Australian Patent Application No. 2015266735, dated Dec. 12, 2017, 3 pages.
Notice of Allowance received for U.S. Appl. No. 14/500,974, dated Feb. 7, 2018, 9 pages.
Office Action received for Chinese Patent Application No. 201580028586.5, dated Dec. 5, 2018, 11 pages (5 pages of English translation and 6 pages of Official Copy).
Office Action received for European Patent Application No. 15727288.1, dated Jun. 4, 2018, 5 pages.
Notice of Allowance received in Japanese Patent Application No. 2017-515031, dated Aug. 31, 2018, 4 pages (1 page of English Translation and 3 pages of Official copy).
Notice of Allowance received for Chinese Patent Application No. 201580028586.5, dated May 31, 2019, 2 pages (1 page of English Translation and 1 page of Official Copy).
First Corrected Notice of Allowance received for U.S. Appl. No. 15/938,493, dated May 27, 2021, 3 pages.
Second Corrected Notice of Allowance received for U.S. Appl. No. 15/938,493, dated Jun. 7, 2021, 3 pages.
Applicant-Initiated Interview Summary received for U.S. Appl. No. 15/938,493, dated Feb. 24, 2021, 4 pages.
Applicant-Initiated Interview Summary received for U.S. Appl. No. 15/938,493, dated Jul. 6, 2020, 5 pages.
Applicant-Initiated Interview Summary received for U.S. Appl. No. 15/938,493, dated Nov. 3, 2020, 4 pages.
Brief Communication Regarding Oral Proceedings received for European Patent Application No. 15727288.1, dated May 7, 2020, 2 pages.
Decision to Refuse received for European Patent Application No. 15727288.1, dated Jul. 30, 2020, 27 pages.
Extended European Search Report received for European Patent Application No. 202008470, dated Apr. 8, 2021, 10 pages.
Final Office Action received for U.S. Appl. No. 15/938,493, dated Aug. 19, 2020, 19 pages.
Minutes of the Oral Proceedings received for European Patent Application No. 15727288.1, mailed on Jul. 24, 2020, 3 pages.
Non-Final Office Action received for U.S. Appl. No. 15/938,493, dated Dec. 7, 2020, 18 pages.
Non-Final Office Action received for U.S. Appl. No. 15/938,493, dated Feb. 21, 2020, 13 pages.
Notice of Allowance received for Japanese Patent Application No. 2018-184888, dated Oct. 2, 2020, 4 pages (1 page of English Translation and 3 pages of Official Copy).
Notice of Allowance received for U.S. Appl. No. 15/938,493, dated Mar. 22, 2021, 19 pages.
Office Action received for Australian Patent Application No. 2018202223, dated Feb. 12, 2020, 3 pages.
Office Action received for Australian Patent Application No. 2018202223, dated Jul. 11, 2019, 3 pages.
Office Action received for Australian Patent Application No. 2018202223, dated Jul. 13, 2020, 6 pages.
Office Action received for Australian Patent Application No. 2018202223, dated Jun. 29, 2020, 5 pages.
Office Action received for Japanese Patent Application No. 2018-184888, dated Dec. 2, 2019, 9 pages (5 pages of English Translation and 4 pages of Official Copy).
Result of Consultation received for European Patent Application No. 15727288.1, mailed on Jul. 6, 2020, 3 pages.
Result of Consultation received for European Patent Application No. 15727288.1, mailed on Jun. 24, 2020, 14 pages.
Summons to Attend Oral Proceedings received for European Patent Application No. 15727288.1, mailed on Jan. 31, 2020, 11 pages.
Summons to Attend Oral Proceedings received for European Patent Application No. 15727288.1, mailed on May 11, 2020, 3 pages.
Office Action received for Australian Patent Application No. 2020204640, dated Jul. 8, 2021, 2 pages.

\* cited by examiner

INTELLIGENT APPOINTMENT SUGGESTIONS

BACKGROUND

In the modern world, people regularly use electronic scheduling or calendar applications to keep track of their appointments. These calendar applications operate on both mobile devices (e.g., tablets, smart phones) as well as personal computers (e.g., laptops, desktops). In some cases, the user may synchronize their calendars across platforms (e.g., through a centralized server or a cloud storage account). As these calendar applications become more ubiquitous, further improvements to make the applications easier to use are desired.

BRIEF SUMMARY

Some embodiments provide a calendar application with one or more of several novel features. In some embodiments, the calendar application operates on a mobile device (e.g., a smart phone, tablet, etc.) with a touchscreen display. The calendar application of some embodiments enables a user to modify the time scale of calendar layouts through gestural touch input. In addition, some embodiments allow users to specify a particular time zone for an appointment. When the application displays a calendar layout for a different time zone, the application provides information regarding the specified time zone as part of a representation of the appointment in the calendar layout. In addition, the calendar application of some embodiments provides support for commenting within a new messages inbox, both in the presentation of comments sent to a user of the calendar application by invitees for appointments organized by the user, as well as providing the user with the ability to more easily comment on appointments to which the user has been invited. The calendar application of some embodiments additionally provides support for identifying an optimal time to set up an appointment, by accessing the calendars of invitees and identifying which invitees are not available at proposed appointment times, as well as proposing times at which the invitees are available. Lastly, the calendar application of some embodiments automatically analyzes the past history of a user's calendar in order to propose new appointments for the user.

As mentioned, some embodiments provide the ability for a user of the calendar application to modify the time scale of calendar layouts through gestural touch input. Specifically, the user either increases or decreases the time scale (i.e., the amount of the display screen occupied by one hour of the calendar), thereby correspondingly increasing or decreasing the size of representations of appointments in the calendar. In some embodiments, the user provides multi-touch gestural input in order to perform the resizing of the time scale in the calendar layout. As the user increases the size of the representations, some embodiments display additional information about the appointment in the representation (e.g., a location of the appointment, attendees of the appointment, etc.). In some embodiments, as the user decreases the size of the representations, the application modifies the size of the text in the representation of the appointment. At a certain point, for short (e.g., 15 minute or 30 minute) appointments, rather than display unreadable text, the application removes the text from the calendar layout altogether.

When users specify time zone information for an appointment, the calendar application of some embodiments incorporates this information into the representation of the appointment in the calendar layout. When creating an event, a user may specify a time zone for the event (e.g., the time zone in which the event will take place). The calendar application, in some embodiments, displays representations of the user's appointments according to the time zone in which the mobile device running the application is located. As a result, in some cases the calendar application displays the calendar in a first time zone, while displaying a representation for an appointment for which a second time zone is specified. In such cases, some embodiments display the representation at its corresponding time in the first time zone, but indicate within the representation the second time zone and the specified time in that second time zone for the appointment.

As indicated, the calendar application of some embodiments provides support for commenting within a new messages inbox. Specifically, the application of some embodiments aggregates both new messages inviting the user of the application to appointments as well as messages regarding appointments organized by the user of the application (e.g., invitees commenting on and/or declining the appointment). When multiple invitees have commented on and/or declined the appointment, some embodiments aggregate these communications into a single entry in the user interface. In some embodiments, the user can select one of these messages (or aggregated sets of messages) to view further detailed information about the appointment, including information indicating (i) whether invitees have responded, (ii) what the invitees' responses indicated, and (iii) whether the invitees had comments about the appointment. In addition, some embodiments provide a separate selectable item for each of the messages (or aggregated sets of messages) to access a page with more detailed information about the invitees of the appointment. This page, in some embodiments, also provides indication as to which invitees have responded, as well as indicators (e.g., graphical indicators) about whether responding invitees indicated they will attend. In addition, the page provides the full text of any comments the invitees may have had regarding the appointment.

When a user of the calendar application declines an appointment (through an invitation message in the same inbox in some embodiments), the application automatically provides the user with the ability to add a comment to a communication that will be sent to the organizer of the appointment, rather than sending the communication right away. The user can then type in a comment (e.g., through a touchscreen keyboard), and accept or decline other invitations present in the inbox. The calendar application holds off on sending the communications indicating acceptance/declining of an invitation until the user provides input indicating that she has completed actions in the inbox (e.g., by returning to the calendar layout).

The application of some embodiments further provides information regarding the availability of proposed participants for a new appointment, to aid in scheduling the appointment. In some embodiments, when a user enters a new invitee for an appointment (for which the user is the organizer), the application automatically accesses the invitee's calendar (e.g., by accessing a server) and displays an indicator (e.g., a graphical indicator) that indicates whether or not the invitee is available at an initially scheduled time for the appointment. When the application cannot access a particular invitee's calendar (e.g., because the server is inaccessible or the application does not have the required permissions), then the application displays an indicator that the invitee's availability is unknown. Once the user has finished adding invitees for the appointment, the application identifies any scheduling conflicts and proposes additional new times at which the invitees are available. Some embodiments display (i) the invitees that are not available at the currently scheduled time for the appointment, (ii) at least one upcoming time at which all invitees (and the organizer of the meeting), and (iii) upcoming times at which various subsets of the invitees are available. The application presents selectable items for each of these upcoming times, enabling the organizer to select the time as a new time for the appointment, or to view the appointment in her calendar at the upcoming time.

In addition to analyzing the calendars of invitees to determine upcoming times for an appointment, some embodiments provide a new appointment feature that analyzes the past calendar history of a user in order to propose likely appointments for the user, with appointment details. When the user selects a quick appointment feature in the calendar application, the application generates the set of likely appointments. In some embodiments, the application provides a first option for the user to name an appointment which will be created at the first open time slot in the user's calendar, without any additional details (i.e., for the user to fill in the details). In addition, the application provides one or more selectable items for proposed appointments at various upcoming times, with additional appointment details already specified.

The calendar application of some embodiments identifies patterns (e.g., recurring meetings) in the user's past calendar history, then proposes appointments that continue such patterns. For example, if the user has had an appointment with the same name at the same time on the same day of the week for the past several weeks, then the application proposes an appointment with that name at the same time on the next occurrence of the particular day of the week. If the recurring time is occupied by a different appointment, then the application of some embodiments identifies a nearby time (e.g., just before or just after) and proposes the new appointment at the nearby time. If additional details (e.g., the location, invitee list, etc.) are the same or similar throughout the recurrences, the application uses these additional details for the proposed appointment. Similarly, the application might identify appointments held every other week, every day, on the same day of the month for several months, etc. The application might identify other patterns, such as the same set of invitees at numerous appointments (with numerous different times and appointment names), and propose a new appointment for the set of invitees at the next available time. Once the user selects a proposed appointment, the application adds this appointment to the calendar of the user, and the user can edit the details (e.g., change the time, invitees, location, etc.) before sending invitations to the appointment to the finalized list of invitees.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
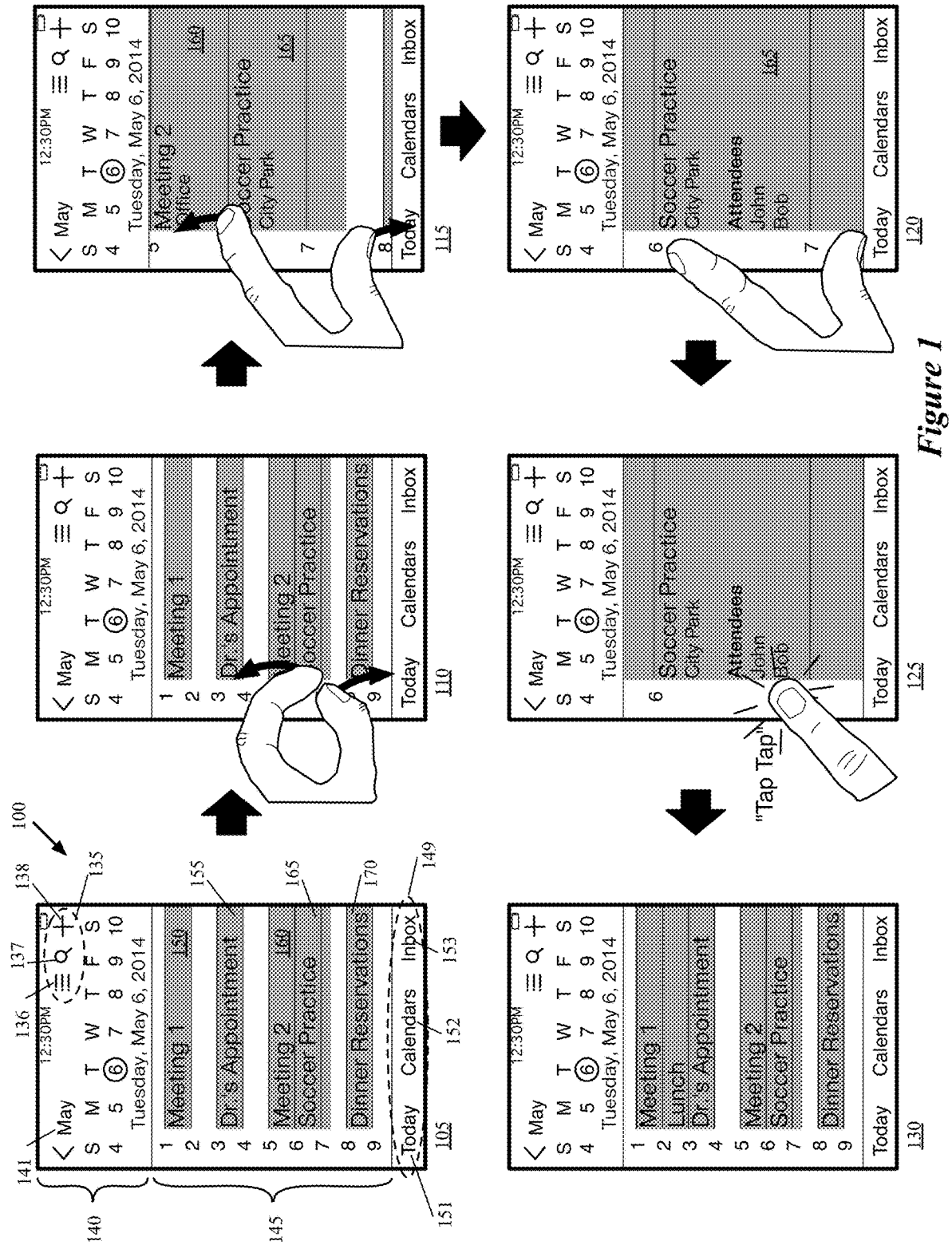
FIG. 1 illustrates a graphical user interface (GUI) of a calendar application of some embodiments as a user increases the time scale (i.e., increases the portion of the layout occupied by a unit of time), then returns the GUI to a default time scale.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a calendar application with one or more of several novel features. In some embodiments, the calendar application operates on a mobile device (e.g., a smart phone, tablet, etc.) with a touchscreen display. The calendar application of some embodiments enables a user to modify the time scale of calendar layouts through gestural touch input. In addition, some embodiments allow users to specify a particular time zone for an appointment. When the application displays a calendar layout for a different time zone, the application provides information regarding the specified time zone as part of a representation of the appointment in the calendar layout. In addition, the calendar application of some embodiments provides support for commenting within a new messages inbox, both in the presentation of comments sent to a user of the calendar application by invitees for appointments organized by the user, as well as providing the user with the ability to more easily comment on appointments to which the user has been invited. The calendar application of some embodiments additionally provides support for identifying an optimal time to set up an appointment, by accessing the calendars of invitees and identifying which invitees are not available at proposed appointment times, as well as proposing times at which the invitees are available. Lastly, the calendar application of some embodiments automatically analyzes the past history of a user's calendar in order to propose new appointments for the user.

The calendar application of some embodiments allows a user to manage appointments (also referred to as events) in one or more calendars (e.g., a work calendar, a personal calendar, etc.). In some embodiments, each calendar is associated with a different e-mail address of the user. Appointments are scheduled for a particular date and time in a particular calendar.

The calendar application allows a user to organize appointments and to receive invitations to appointments organized by others. When organizing an appointment, the user specifies various details (the name, location, date and time, etc.) as well as the list of proposed attendees (invitees). Upon finalizing the appointment, the application sends a communication (e.g., an e-mail) to the invitees. When the calendar application receives such a communication for an appointment organized by another user of a calendar application (either the same application on a different device, or a different application), the application presents the user with the ability to accept or decline the invitation (or respond that she is unsure of availability). When the user accepts the appointment, the application adds the appointment to the user's calendar.

A user can view her calendar in a calendar layout user interface of the calendar application. Such a user interface, in some embodiments, provides the user with a daily, weekly, monthly, or yearly view. In some or all of these views, the application displays representations of the user's appointments in the calendar layout, along with information about the appointment (e.g., the name of the appointment). The application of some embodiments also provides user interfaces for the user to view details of an appointment, modify the details, create new appointments, view received calendar messages, etc.

As mentioned, some embodiments provide the ability for a user of the calendar application to modify the time scale of calendar layouts through gestural touch input. Specifically, the user either increases or decreases the time scale (i.e., the amount of the display screen occupied by one hour of the calendar), thereby correspondingly increasing or decreasing the size of representations of appointments in the calendar. In some embodiments, the user provides multi-touch gestural input in order to perform the resizing of the time scale in the calendar layout. As the user increases the size of the representations, some embodiments display additional information about the appointment in the representation (e.g., a location of the appointment, attendees of the appointment, etc.). In some embodiments, as the user decreases the size of the representations, the application modifies the size of the text in the representation of the appointment. At a certain point, for short (e.g., 15 minute or 30 minute) appointments, rather than display unreadable text, the application removes the text from the calendar layout altogether.

When users specify time zone information for an appointment, the calendar application of some embodiments incorporates this information into the representation of the appointment in the calendar layout. When creating an event, a user may specify a time zone for the event (e.g., the time zone in which the event will take place). The calendar application, in some embodiments, displays representations of the user's appointments according to the time zone in which the mobile device running the application is located. As a result, in some cases the calendar application displays the calendar in a first time zone, while displaying a representation for an appointment for which a second time zone is specified. In such cases, some embodiments display the representation at its corresponding time in the first time zone, but indicate within the representation the second time zone and the specified time in that second time zone for the appointment.

As indicated, the calendar application of some embodiments provides support for commenting within a new messages inbox. Specifically, the application of some embodiments aggregates both new messages inviting the user of the application to appointments as well as messages regarding appointments organized by the user of the application (e.g., invitees commenting on and/or declining the appointment). When multiple invitees have commented on and/or declined the appointment, some embodiments aggregate these communications into a single entry in the user interface. In some embodiments, the user can select one of these messages (or aggregated sets of messages) to view further detailed information about the appointment, including information indicating (i) whether invitees have responded, (ii) what the invitees' responses indicated, and (iii) whether the invitees had comments about the appointment. In addition, some embodiments provide a separate selectable item for each of the messages (or aggregated sets of messages) to access a page with more detailed information about the invitees of the appointment. This page, in some embodiments, also provides indication as to which invitees have responded, as well as indicators (e.g., graphical indicators) about whether responding invitees indicated they will attend. In addition, the page provides the full text of any comments the invitees may have had regarding the appointment.

When a user of the calendar application declines an appointment (through an invitation message in the same inbox in some embodiments), the application automatically provides the user with the ability to add a comment to a communication that will be sent to the organizer of the appointment, rather than sending the communication right away. The user can then type in a comment (e.g., through a touchscreen keyboard), and accept or decline other invitations present in the inbox. The calendar application holds off on sending the communications indicating acceptance/declining of an invitation until the user provides input indicating that she has completed actions in the inbox (e.g., by returning to the calendar layout).

The application of some embodiments further provides information regarding the availability of proposed participants for a new appointment, to aid in scheduling the appointment. In some embodiments, when a user enters a new invitee for an appointment (for which the user is the organizer), the application automatically accesses the invitee's calendar (e.g., by accessing a server) and displays an indicator (e.g., a graphical indicator) that indicates whether or not the invitee is available at an initially scheduled time for the appointment. When the application cannot access a particular invitee's calendar (e.g., because the server is inaccessible or the application does not have the required permissions), then the application displays an indicator that the invitee's availability is unknown. Once the user has finished adding invitees for the appointment, the application identifies any scheduling conflicts and proposes additional new times at which the invitees are available. Some embodiments display (i) the invitees that are not available at the currently scheduled time for the appointment, (ii) at least one upcoming time at which all invitees (and the organizer of the meeting), and (iii) upcoming times at which various subsets of the invitees are available. The application presents selectable items for each of these upcoming times, enabling the organizer to select the time as a new time for the appointment, or to view the appointment in her calendar at the upcoming time.

In addition to analyzing the calendars of invitees to determine upcoming times for an appointment, some embodiments provide a new appointment feature that analyzes the past calendar history of a user in order to propose likely appointments for the user, with appointment details.

When the user selects a quick appointment feature in the calendar application, the application generates the set of likely appointments. In some embodiments, the application provides a first option for the user to name an appointment which will be created at the first open time slot in the user's calendar, without any additional details (i.e., for the user to fill in the details). In addition, the application provides one or more selectable items for proposed appointments at various upcoming times, with additional appointment details already specified.

The calendar application of some embodiments identifies patterns (e.g., recurring meetings) in the user's past calendar history, then proposes appointments that continue such patterns. For example, if the user has had an appointment with the same name at the same time on the same day of the week for the past several weeks, then the application proposes an appointment with that name at the same time on the next occurrence of the particular day of the week. If the recurring time is occupied by a different appointment, then the application of some embodiments identifies a nearby time (e.g., just before or just after) and proposes the new appointment at the nearby time. If additional details (e.g., the location, invitee list, etc.) are the same or similar throughout the recurrences, the application uses these additional details for the proposed appointment. Similarly, the application might identify appointments held every other week, every day, on the same day of the month for several months, etc. The application might identify other patterns, such as the same set of invitees at numerous appointments (with numerous different times and appointment names), and propose a new appointment for the set of invitees at the next available time. Once the user selects a proposed appointment, the application adds this appointment to the calendar of the user, and the user can edit the details (e.g., change the time, invitees, location, etc.) before sending invitations to the appointment to the finalized list of invitees.

The above paragraphs describe examples of the novel calendar application features of some embodiments. Several more detailed examples are described below. Section I describes the modifying the time scale of a calendar layout of some embodiments. Section II then describes the use of time zone information for appointments and the display of that information in the calendar layout of some embodiments. Next, Section III describes features that enable the user to easily comment on appointment invitations in some embodiments, while Section IV describes features of the calendar application of some embodiments for scheduling appointments based on participant availability. Section V describes a feature of the calendar application of some embodiments for automatically suggesting new appointments based on a user's calendar history. Finally, Section VI describes electronic systems with which some embodiments of the invention are implemented.

I. Resizing a Calendar Layout

As mentioned, the calendar application of some embodiments provides the ability for a user to modify the time scale of calendar layouts displayed in the user interface of the application through gestural touch input. Specifically, the user either increases or decreases the time scale (i.e., the amount of the display screen occupied by one hour or other unit of time of the calendar), thereby correspondingly increasing or decreasing the size of representations of appointments in the calendar. In some embodiments, the user provides multi-touch gestural input in order to perform the resizing of the time scale in the calendar layout. As the user increases the size of the representations, some embodiments display additional information about the appointment in the representation (e.g., a location of the appointment, attendees of the appointment, etc.). In some embodiments, as the user decreases the size of the representations, the application modifies the size of the text in the representation of the appointment. At a certain point, for short (e.g., 15 minute or 30 minute) appointments, rather than display unreadable text, the application removes the text from the calendar layout altogether.

FIG. 1 illustrates a graphical user interface (GUI) 100 of a calendar application of some embodiments as user input increases the time scale (i.e., increases the portion of the layout occupied by a unit of time), then returns the GUI to a default time scale over six stages 105-130. Specifically, in the second and third stages 110 and 115, the user provides multi-touch gestural input to increase the time scale, while in the fifth stage 125 the user provides a different touch input to return to the default time scale.

The first stage 105 illustrates the calendar layout GUI 100 of some embodiments. In some embodiments, the application operates on a touchscreen mobile device (e.g., a smart phone, tablet, etc.), and the GUI 100 is displayed on (and receives input through) the touchscreen display of the mobile device. As shown, the GUI 100 includes a set of selectable items 135, a set of calendar navigation items 140, a calendar layout 145, and a set of application navigation items 149.

The set of selectable items 135, in some embodiments, includes a calendar layout format change item 136, a search item 137, and a new event creation item 138. In some embodiments, selecting the calendar layout format change item 136 (e.g., via tapping the item on the touchscreen display) causes the application to display a calendar list view rather than the hourly calendar layout 145. The calendar list view, in some embodiments, displays a list of upcoming appointments sorted by date and time. Selection of the search item 137 causes the application to present a search bar for searching the calendar. Selection of the new event creation item 138 causes the application to open a new event creation GUI through which the user can enter details for a new event.

The set of calendar navigation items 140, in some embodiments, includes selectable items for each day of the current week, as well as a selectable item 141 for navigating upwards in the time hierarchy (i.e., to a different layout for the entire month rather than a particular week and day). Each of the selectable items for the different days of the week can be selected in order to cause the application to display the user's schedule for the selected day in the calendar layout 145. The currently selected day (May 6$^{th}$, in this example), is indicated by a graphical indicator around the date (i.e., the circle shown around the "6").

The calendar layout 145 of some embodiments displays representations of the appointments scheduled in the user's calendar for the currently selected day. The calendar layout 145 displays time markers (e.g., every hour, every half hour, every two hours, etc.), in this case starting at 1 PM (the next hour after the current time of 12:30 PM) and ending at 9 PM. The time markers (and, correspondingly, the calendar) are spaced according to a time scale for the layout, which determines the length of time for which the schedule is shown in the layout. Within the calendar layout 145, the application displays representations 150-170 of five appointments scheduled in the user's calendar. These representations horizontally span the width of the calendar layout 145, and vertically each span their respective time slots. Thus, the representation 150 for "Meeting 1", an appointment scheduled from 1 PM to 2 PM, spans the portion of the calendar layout 145 representing this time. Similarly, the representation 155 spans the portion of the calendar layout 145 from 3 PM to 4 PM, etc. Each of these representations displays the appointment name ("Meeting 1", "Soccer Practice", etc.). In some embodiments, the representations also display the location of the appointment if this information is available and fits within the representation.

The set of application navigation items 149 includes a today item 151, a calendars selection item 152, and an inbox access item 153. Selection of the today item 151 navigates the calendar layout 145 to the current day. Selection of the calendars item 152 causes the application to open a dialog window in which the user can choose what will be displayed in the calendar layout 145. For instance, the user can select from different calendars (e.g., associated with different e-mail addresses or other accounts), whether to display holidays, saved birthdays of contacts, etc. The inbox access item 153 enables the user to access a calendar message user interface, which is described in greater detail below in Section III.

The second stage 110 illustrates that the user is providing multi-touch gestural input through the display screen over the calendar layout 145. Specifically, the user inputs a pull-apart two-finger gesture centered near 7 PM in the calendar layout. This multi-touch gestural input causes the calendar application to modify the time scale of the calendar layout.

Specifically, as shown in the third stage 115, the application increases the portion of the calendar layout 145 represented by each hour, such that a smaller portion of the schedule is shown within the layout. That is, the application zooms in on a portion of the calendar layout centered near 7 PM. However, this zoom is only in the vertical direction; the horizontal aspect of the calendar layout 145 is unchanged. Some embodiments zoom in about the center of the layout 145 (which would be near 5 PM in the current example), while other embodiments (as shown in this example) zoom in about the center of the gestural input. As a result of the modification to the time scale, only the appointment representations 160 and 165 (and a small portion of the representation 170) remain displayed in the calendar layout 145 in the third stage 115. These appointment representations 160 and 165 have increased in size in correspondence with the time scale of the calendar layout, and additionally now each display the location of the appointment ("Office" and "City Park") as well as the appointment name. In this third stage 115, the user also continues the multi-touch gestural pull-apart input.

The fourth stage 120 illustrates the GUI 100 after the user has completed the multi-touch gestural input begun in the second stage 110. The time scale has been further modified compared to the third stage 115 such that the calendar layout 145 only displays less than an hour and a half of the user's schedule, with only the representation 165 displayed in the layout. The appointment representation 165 displays, in addition to the appointment name, a list of the attendees of the meeting (other than the user of the calendar application). Some embodiments do not display additional information beyond the title and location of the appointment. On the other hand, some embodiments display more information as the appointment representation is enlarged, including the attendees or invitees, any notes about the meeting, the number of invitees who have accepted or declined the meeting, etc.

In the fifth stage 125, the user provides a different touch input (a double tap, specifically) over the calendar layout 145. This causes the application, as shown in stage 130, to return the calendar layout 145 display to its default time scale, similar to that shown in the first stage 105. As a result, all of the appointment representations 150-170 are now displayed within the GUI 100, at the same size as in the first stage 140.

In this figure, as well as throughout this document, various specific touch inputs are illustrated and described. However, one of ordinary skill in the art will recognize that different embodiments may use different types of input (either multi-touch inputs, single-touch inputs, near-touch inputs, or non-touch inputs such as inputs from cursor controllers, physical buttons, etc.) to perform the operations shown in the figures. Thus, inputs other than the pull-apart multi-touch gesture and the double-tap touch input might be used to modify the time scale and return to a default time scale, just as inputs other than those shown in the subsequent figures could be performed rather than the gestures shown in the subsequent figures.

In some embodiments, the user may change the time scale of the calendar layout, then change the day for which the calendar is displayed in the layout. In some such embodiments, the calendar application keeps the time scale for the newly selected day. That is, the application makes the new time scale for the calendar layout "sticky" across the schedules for different time periods.

Figure 2:
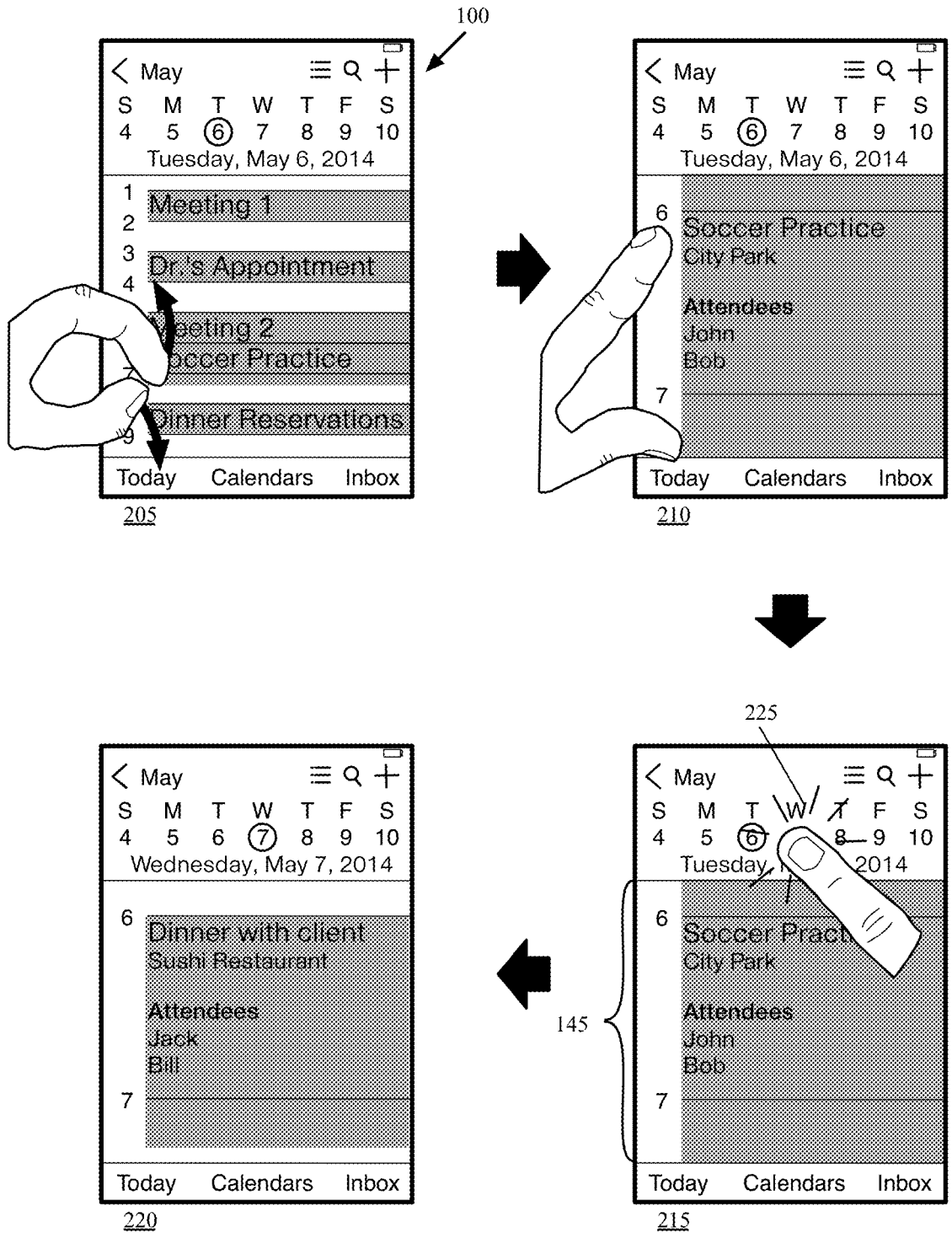
FIG. 2 illustrates the maintaining of a modified time scale for different days of a calendar layout.

FIG. 2 illustrates the maintaining of a modified time scale for different days of a calendar layout over four stages 205-220 of the GUI 100. The first stage 205 illustrates the GUI 100 in the same state as in the first and second stages 105 and 110 of the previous figure. Additionally, at this stage, the user performs the same gestural input as in the stages 110 and 115 of FIG. 1, with the resultant second stage 210 being the same as stage 120 of that figure. At this point, the time scale has been modified such that the calendar layout displays slightly less than an hour and a half of the schedule for May 6, from a bit before 6 PM up to nearly 7:30 PM.

In the third stage 215, the user selects a selectable item 225 representing Wednesday, May 7. In this case, the user makes this selection via a tap gesture over the selectable item. As this is the next day after the currently displayed day, some embodiments allow the same calendar navigation via a leftward swipe gesture over the calendar layout 145.

The resultant stage 220 displays the user's schedule for Wednesday, May 7. Because the user had modified the time scale before changing the displayed day, the application maintains the modified time scale (as well as the portion of the day's schedule shown in the calendar layout). Thus, the calendar layout 145 now displays the portion of the user's schedule from shortly before 6 PM to almost 7:30 PM, which includes an appointment representation 230 for an appointment "Dinner With Client". Because the representation 230 occupies a large portion of the calendar layout 145, the application displays the location and attendees for the appointment (or other information in other embodiments).

In addition to modifying the time scale to enlarge the portion of the calendar layout represented by one hour, the application of some embodiments also allows users to modify the time scale of the calendar layout in the opposite direction. That is, through gestural input the user can modify the time scale of the calendar layout such that each hour occupies a smaller portion of the calendar layout and more time of the day is displayed within the layout.

Figure 3:
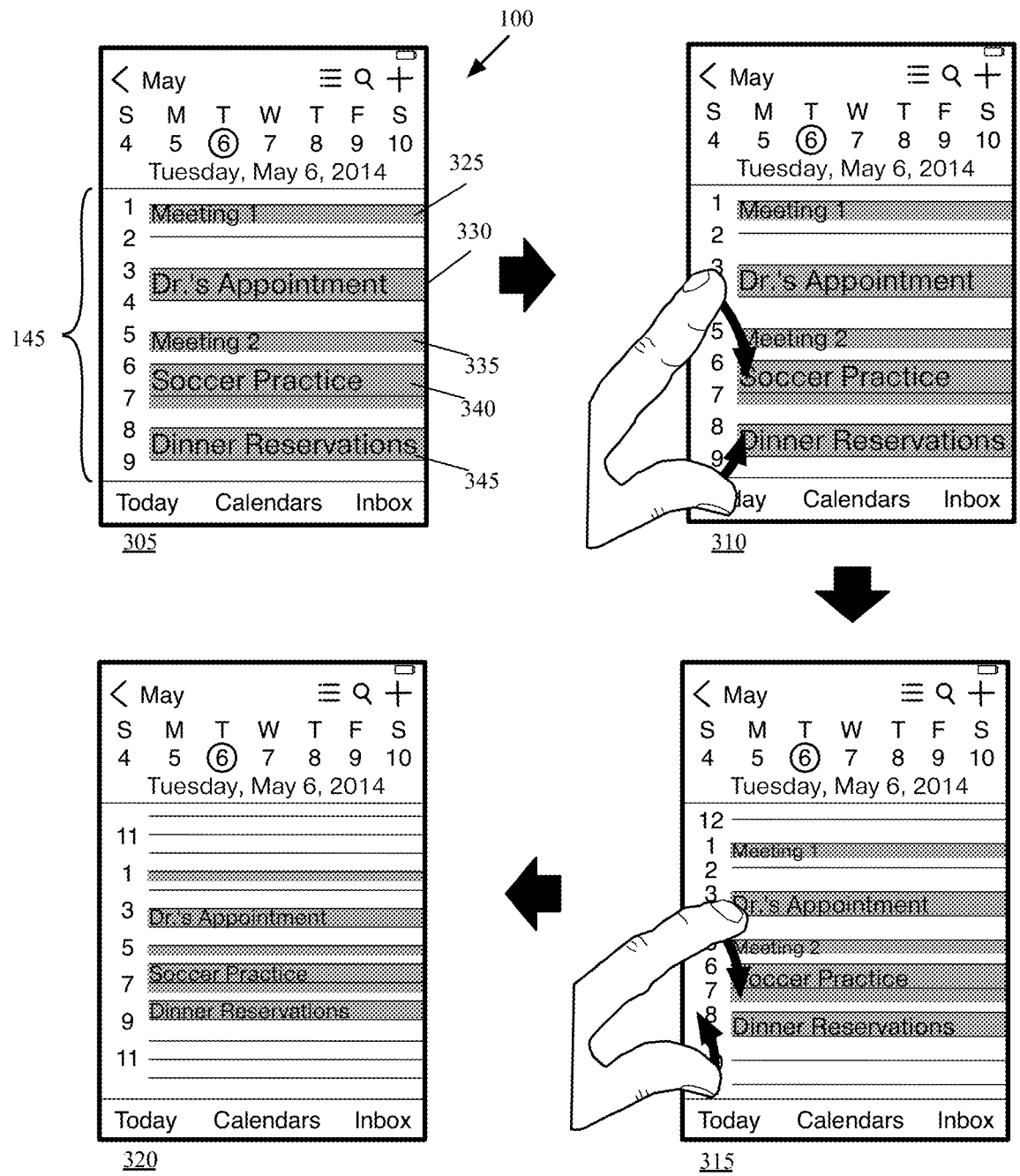
FIG. 3 illustrates the GUI as the user decreases the time scale (i.e., decreases the portion of the layout occupied by a unit of time).

FIG. 3 illustrates the GUI 100 as the user decreases the time scale (i.e., decreases the portion of the layout occupied by a unit of time) over four stages 305-320. The first stage 305 illustrates the calendar layout 145 in a default time scale. The schedule illustrates five appointment representations 325-345, which are similar to the appointment representations 150-170 in the example above. However, in this case, the appointments "Meeting 1" and "Meeting 2" are each only a half hour long, and thus their corresponding representations in the calendar layout 145 are smaller.

In the second stage 310, the user begins providing multi-touch gestural input through the touchscreen display over the calendar layout 145. Whereas the previous figures illustrate the user inputting a pull-apart gesture with two fingers, in this case the user provides a pinching gesture to cause the calendar application to modify the time scale of the calendar layout.

Specifically, as shown in the third stage 315, the application decreases the portion of the calendar layout 145 represented by each hour, such that a larger portion of the schedule is shown within the layout. That is, the application zooms out from a portion of the calendar layout centered near 7 PM. As in the previous figures, this zoom operation is only in the vertical direction; the horizontal aspect of the calendar layout 145 is unchanged. Some embodiments zoom out about the center of the layout 145 (which would be near 5 PM in the present example), while other embodiments zoom out about the center of the gestural input (as shown in this case). Furthermore, some embodiments also may modify the center of the zoom due to the time boundaries of the selected day. That is, the application of some embodiments does not continue into the schedule of the previous or subsequent day, and thus may increase the time shown in the calendar layout at either only the top or only the bottom of the layout once 12 AM is reached on either side. As a result of the modification to the time scale, the appointment representations 325-345 have decreased in size in correspondence with the time scale of the calendar layout. Furthermore, the size of the text for each of the appointment representations has decreased so as to fit within the appointment representations. In this third stage 315, the user continues the multi-touch gestural pinch input.

The fourth stage 320 illustrates the GUI 100 after the user has completed the multi-touch gestural input begun in the second stage 310. The time scale has been further modified compared to the third stage 315 such that the calendar layout 145 now displays the user's schedule from approximately 9:30 AM to midnight on the selected day, May 6. Once midnight is reached at the end of the selected day, further decreasing of the time scale causes only earlier times to appear at the top of the UI. In addition, the text for appointment representations 330, 340, and 345 has continued to decrease in size.

The application has also removed the text for appointment representations 325 and 335, which are shorter meetings of only half an hour. Some embodiments, once the appointment representation becomes smaller than a threshold size, remove the text altogether rather than displaying difficult or impossible to read information text. This threshold may be based on a size of the representation, a length in time of the appointment for certain time scales, etc. In some embodiments, the text is replaced with a graphical indicator that informs the user that text is replaced. In order to view the text, the user can select the event (to cause the application to display an event details GUI) or provide gestural input to modify the time scale. For instance, just as shown in FIG. 1 for increased time scales, the user may provide input to return to the default time scale after decreasing the time scale (e.g., double tap input). Furthermore, after decreasing the time scale, the user could provide input to cause the calendar application to switch the day for which it displays the schedule, and the decreased time scale would be used for the newly displayed schedule as well.

The calendar layout GUI 100 shown in the previous three figures is the GUI shown when the mobile device on which the application operates is oriented in the portrait orientation. Some embodiments display a different calendar layout GUI for landscape orientation, with similar resizing properties to the portrait orientation GUI.

Figure 4:
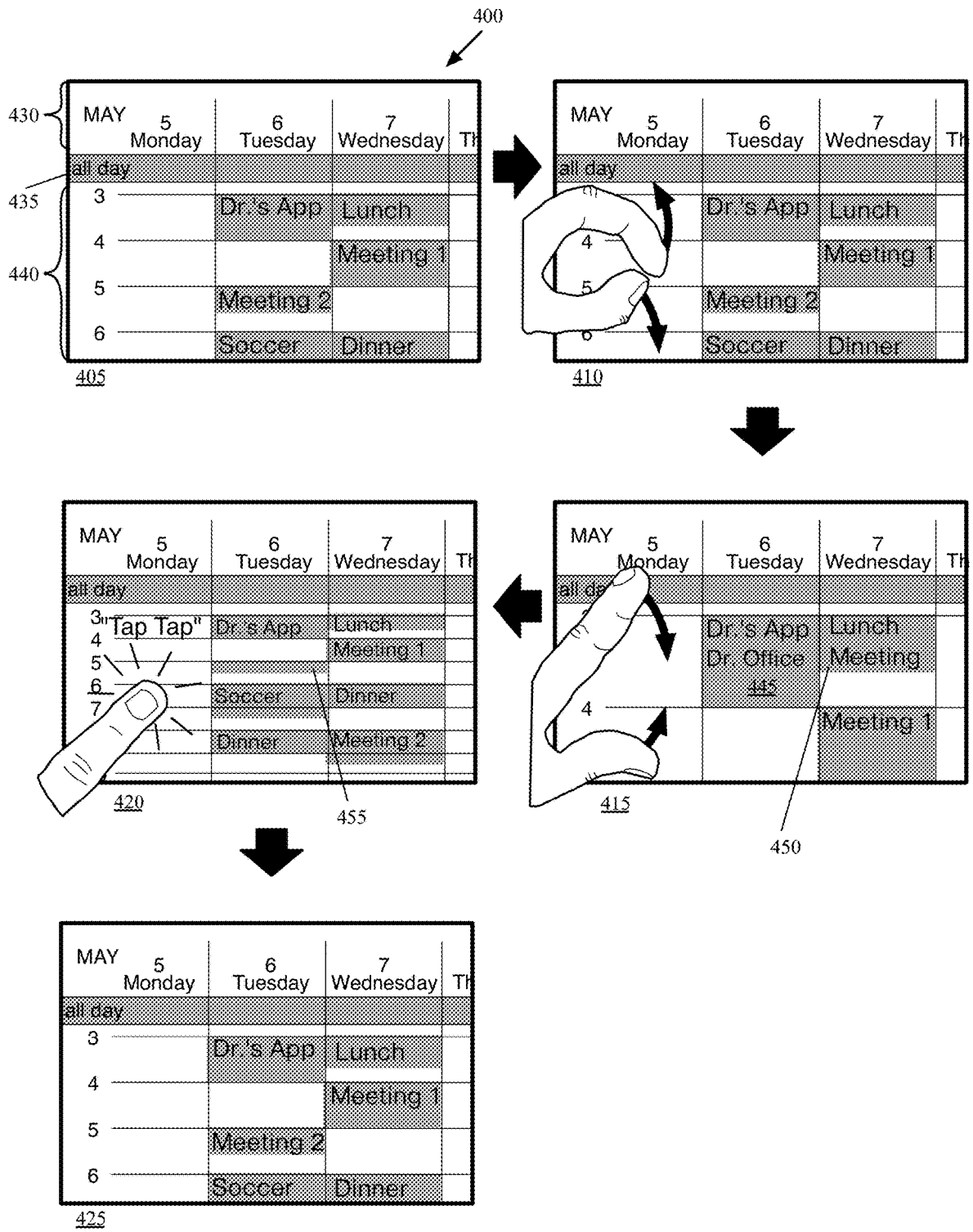
FIG. 4 illustrates a landscape orientation GUI of a calendar application of some embodiments as a user increases the time scale, then decreases the time scale, then returns to the default time scale by providing various touch inputs.

FIG. 4 illustrates such a landscape orientation GUI 400 of a calendar application of some embodiments as a user increases the time scale, then decreases the time scale, then returns to the default time scale by providing various touch input over five stages 405-425. Specifically, in the second stage 410 the user provides multi-touch gestural input to increase the time scale, in the third stage 415 the user provides multi-touch gestural input to decrease the time scale, and in the fourth stage 420 the user provides a different touch input to return to the default time scale.

The first stage 405 illustrates the landscape orientation calendar layout GUI 400 of some embodiments. The GUI 400 includes a header row 430, an all-day event row 435, and a calendar layout 440. The header row 430 displays several days of the week, as well as the month to which the days of the week belong. While this figure illustrates the GUI 400 as displaying slightly more than three days of the week, some embodiments format the width such that five days (i.e., one work week) are displayed. In some embodiments, the number of days displayed within the landscape orientation layout is a variable that the user may modify. In addition, some embodiments highlight the current day of the week (e.g., with a circle around its number) when that day is displayed within the GUI 400.

The all-day event row 435, in some embodiments, is displayed in some embodiments only when one of the days in the currently displayed week has an all-day event (even if that day is not currently displayed within the calendar layout. Such events might be pre-programmed events such as holidays, as well as scheduled appointments (e.g., conferences).

The calendar layout 440 is similar to the layout 145, except that the layout 440 spans multiple days. The calendar layout 440 also has time markers on the left side running vertically, and includes appointment representations within the displayed schedule that represent the user's appointments during the displayed days.

In the second stage 410, the user provides a multi-touch gestural input through the display screen over the calendar layout 440. Specifically, the user inputs a pull-apart two-finger gesture, which causes the application to increase the time scale of the calendar layout 440. As a result, the third stage 415 illustrates that the calendar layout 440 displays only two hours of the user's schedule for these three days rather than the four and a half hours of the previous stage. In addition, the appointment representation 445 for a doctor appointment now shows the location of that appointment, and the appointment representation 450 shows the full title of the appointment ("Lunch Meeting").

The third stage 415 also illustrates that the user is now providing a multi-touch pinch gestural input over the calendar layout, in order to decrease the time scale of the calendar layout 440. The fourth stage 420 illustrates the resultant calendar layout 440, with approximately eight hours of the user's schedule illustrated in the layout. The text size of some of the appointment representations has decreased, and for the appointment representation 455 (for "Meeting 2"), the application has removed the text completely. In both of the third and fourth stages 415-420, the all-day event row 435 does not change in height. However, in other embodiments, the application correspondingly increases or decreases the height of this all-day event row (if present). The user also provides a double tap input in the fourth stage 420, and in the fifth stage 425, the application has returned the calendar layout 440 to the default time scale from the first stage 405.

Figure 5:
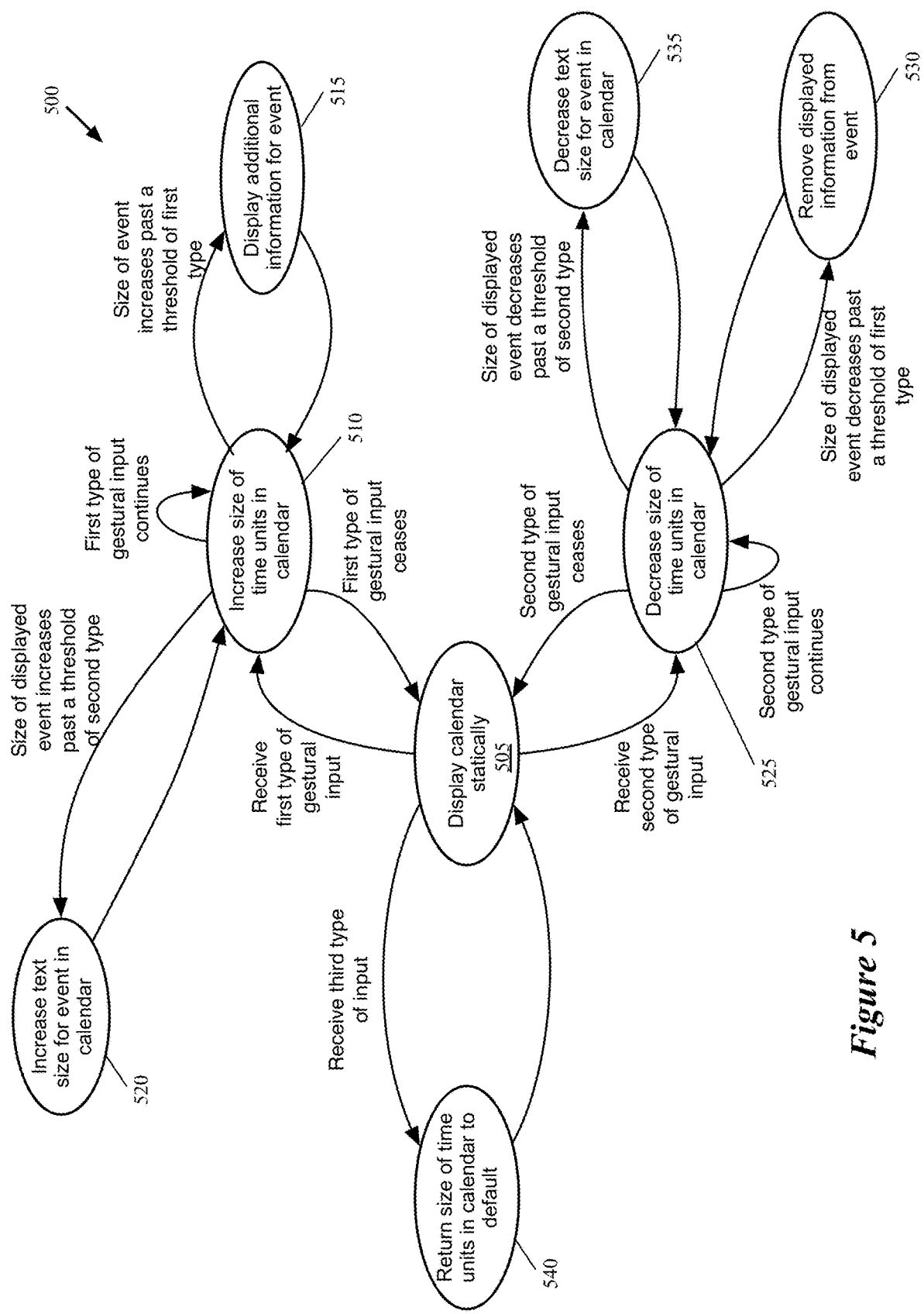
FIG. 5 conceptually illustrates a state diagram that shows states and changes between states for the calendar layout GUI of some embodiments.

FIG. 5 conceptually illustrates a state diagram 500 that shows states and changes between states for the calendar layout GUI of some embodiments. One of ordinary skill in the art will recognize that this state diagram does not cover every possible interaction with the calendar layout. For instance, the state diagram does not describe changing the day (or days, in the landscape orientation) for which the application displays a user's schedule, or scrolling up and down within a day's schedule. Instead, the state diagram 500 is restricted to modifications to the time scale of the calendar layout. In each of the states shown in the state diagram 500, the operations of the calendar application are controlled by one or more application processes that are responsible for handling the user interaction with the calendar application GUI.

When the user is not interacting with the calendar layout 500, the GUI is in state 505, at which the calendar application displays the calendar layout statically. That is, when no input is received (and the application is displaying the calendar layout GUI), the application displays this GUI statically.

When a first type of gestural input is received (e.g., the pull-apart multi-touch gesture shown in FIG. 1), the application transitions to state 510 to increase the size of the time units of the calendar layout. That is, the application increases the portion of the calendar layout that each hour (or half hour, or other time unit) occupies as the gestural input is received, as shown in FIG. 1. As this input continues, the application remains in the state 510 until either a threshold is passed (causing a transition to state 515 or 520) or the gestural input ceases (causing a transition back to state 505).

As shown, when the size of an appointment representation reaches a first type of threshold, the application transitions to state 515 to display additional information for the event, then returns to the state 510 to continue increasing the time scale. For example, as shown in FIG. 1, the application might display the location of an appointment within its representation (although this may sometimes be displayed by default for the appointment), the attendees to the appointment, any notes regarding the appointment, indications as to which invitees have accepted, declined, or replied that they are unsure of attendance, or any other information stored about the appointment.

When the size of an appointment representation reaches a second type of threshold, the application transitions to state 520 to increase the text size for an event in the calendar. In some embodiments, the second type of threshold only exists when the time scale has been decreased from the default time scale (i.e., the hours are smaller than at the default scale). That is, the application does not transition to the state 520 and increase the size of the text beyond a default text size, but may increase the size of text that has previously been decreased from the default. For example, if the user provided the pull-apart gestural input after the fourth stage 320 of FIG. 3, then the application would increase the text size of some of the appointment representations.

When, instead of receiving the first type of gestural input, the application instead receives a second type of gestural input (e.g., the pinch multi-touch gesture shown in FIG. 3), the application transitions to the state 525 to decrease the size of the time units of the calendar layout. That is, the application decreases the portion of the calendar layout that each hour (or half hour, or other time unit) occupies as the gestural input is received, as shown in FIG. 3. As this input continues, the application remains in the state 525 until either a threshold is passed (causing a transition to state 530 or 535) or the gestural input ceases (causing a transition back to state 505).

As shown, when the size of an appointment representation decreases past a threshold of the first type, the application transitions to state 530 and removes information from the appointment representation, then returns to state 525 to continue decreasing the time scale. For example, as shown in FIG. 4, the application might remove the location from the displayed appointment representation. Similarly, if the user were to provide a pinch gesture after the last stage 130 of FIG. 1, then after a threshold was passed the application would remove the attendees from the appointment representation 165. In addition, as shown in FIG. 3, the application will remove the text altogether from appointment representations once those representations become smaller than a certain threshold.

When the size of an appointment representation in the calendar layout decreases past a second type of threshold, the application transitions to state 535 to decrease the text size for an event in the calendar. As mentioned above, in some embodiments this second type of threshold only exists when the displayed time scale is below the default time scale (i.e., the hours are smaller than at the default time scale). That is, the application only modifies the text size as the appointment representations are below the default size for their time length, as shown in FIG. 3.

In some embodiments, the application may also transition directly from the state 510 to the state 525 (or vice versa) if the user fluidly transfers from the first type of gestural input to the second type of gestural input (or vice versa). However, this can also be viewed as an instantaneous or near-instantaneous transition through the state 505 as well.

When the application receives a third type of input, which may or may not be gestural input in different embodiments, the application transitions to the state 540 to return the size of the time units in the calendar to the default time scale, then returns to the state 505. In some embodiments, as shown in FIGS. 1 and 4, this input is a double-tap input. The application, at state 540, may also return all font sizes and displayed event information text to the default as well.

II. Handling Time Zones for Appointments

Some embodiments of the invention allow users to specify a time zone for an appointment. When users specify this time zone information for an appointment, the calendar application of some embodiments incorporates this information into the representation of the appointment in the calendar layout. When creating an event, the user may specify a time zone for the event (e.g., the time zone in which the event will take place), as well as a start time, end time, etc. in that time zone. The calendar application, in some embodiments, displays representations of the user's appointments according to the time zone in which the mobile device running the application is located. As a result, in some cases the calendar application displays the calendar in a first time zone, while displaying a representation for an appointment for which a second time zone is specified. In such cases, some embodiments display the representation at its corresponding time in the first time zone, but indicate within the representation the second time zone and the specified time in that second time zone for the appointment.

Figure 6:
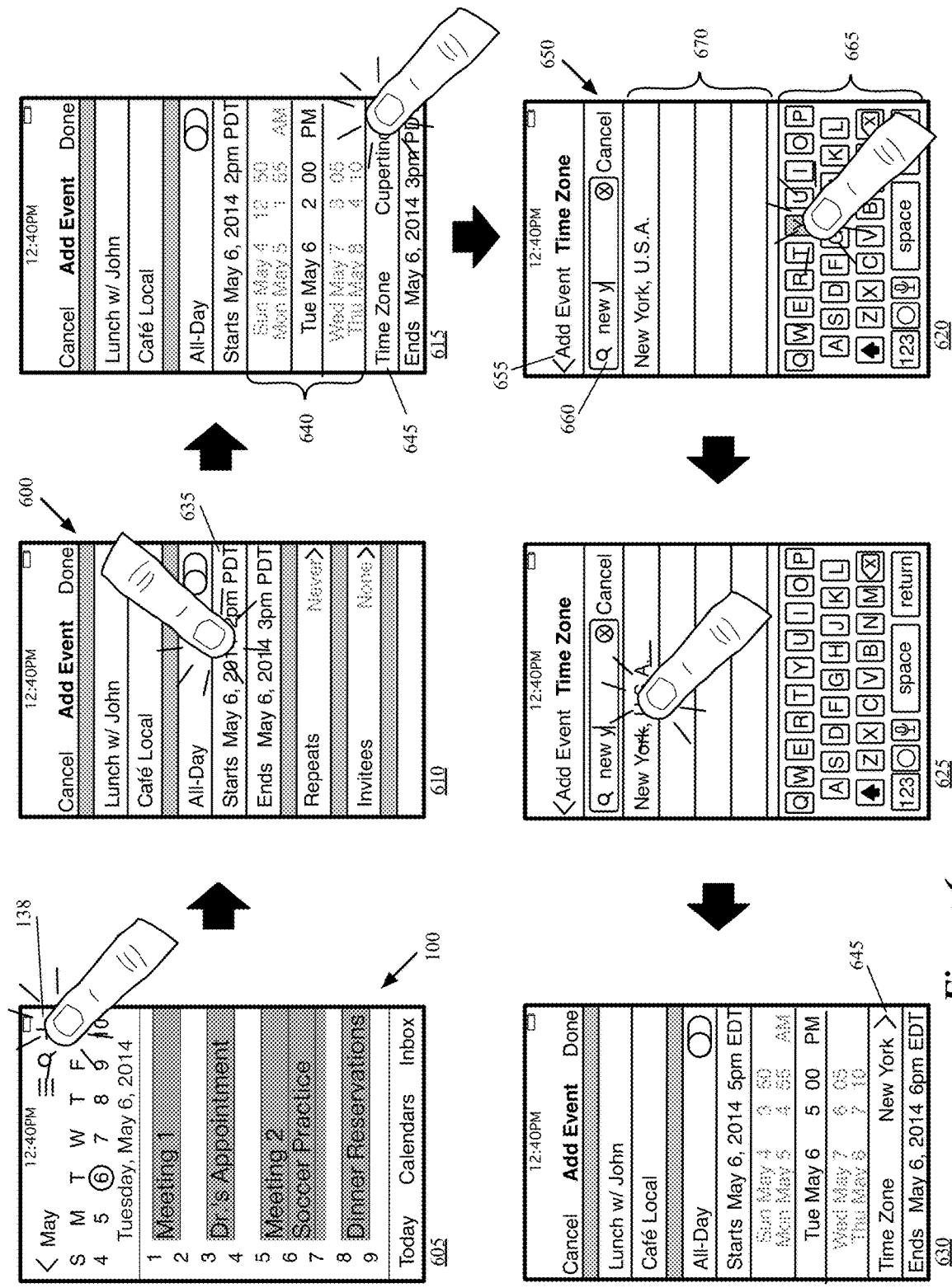
FIG. 6 illustrates a user modifying the time zone for a new event.

FIG. 6 illustrates a user modifying the time zone for a new event over six stages 605-630. The first stage 605 illustrates the calendar layout GUI 100, described in Section I. The user selects the new event creation item 138 during the first stage 605, in order to create a new event.

The second stage 610 illustrates a new appointment creation GUI 600. In some embodiments, when the calendar application receives input to create a new appointment, the application displays the appointment creation GUI 600. Through this GUI, the user can define various parameters for a new appointment (i.e., appointment characteristics). The user can enter a title (name) for the event, a location of the event, set start and end times, set various parameters such as recurrence, travel time, alerts, etc., and enter invitees for the event. The second stage 610 illustrates the new appointment creation GUI 600 after the user has entered a title ("Lunch w/ John") and location ("Café Local) for the new appointment. In some embodiments, selecting the recurrence ("Repeats") or invitees options cause the application to display additional dialogs through which the user can select a recurrence option or enter invitees. In addition, the application provides mechanisms for the user to easily select start and end times. As shown, the user selects the start time row 635 in this stage in order to edit the start time.

The third stage 615 illustrates the resultant start time entry dialog 640 that results from the selection of the start time row 635. As shown, the start time entry dialog 640 allows the user, through gestural touch input (swiping up and down) to modify the day, hour, and minute, as well as select either morning or afternoon. In addition, upon selection of the start time row 635, the application displays a time zone selection row 645.

While shown in the GUI 600 as accessible via the start time row 635 (i.e., as part of the start time entry dialog), in other embodiments, the time zone selection row 645 is provided as part of the standard new appointment creation GUI (e.g., below the end time row). This time zone selection row 645, in some embodiments, initially displays a default time zone for a new event. In some embodiments, the default time zone is the time zone in which the mobile device on which the calendar application operates is located. Thus, in this example, the mobile device is located in the pacific time zone, and thus the times are given in Pacific Daylight Time (PDT) and the selected locality is a default for the time zone ("Cupertino"). Some embodiments use the city or other locality in which the mobile device is located rather than a default locality for the time zone. In addition, in some embodiments, the default time zone is a user-specified setting for the mobile device rather than the time zone in which the mobile device is located. In the third stage 615, the user selects the time zone selection row 645.

As a result of this selection, the fourth stage 620 illustrates a time zone selection GUI 650. The time zone selection GUI 650 includes a return to appointment item 655 (which allows the user to return to the new appointment creation GUI 600 without modifying the time zone, a text field 660, a touchscreen keyboard 665, and a list of selectable locality options 670. As the user uses the touchscreen keyboard 665 to enter text into the text field 660, the list of selectable options 670 displays the most likely localities based on the entered text. The most likely localities may be determined based on match or near-match (taking into account likely typographical errors) with the text, popularity among users of the application generally, past history of the user, and proximity to the current location of the mobile device.

In this case, the user has entered the text "new y" by stage 620, prompting the application to display "New York, U.S.A." as an option in the list of selectable options 670. The fifth stage 625 illustrates that the user selects the "New York" option at this juncture. As a result, the sixth stage 630 illustrates that the application returns to the new appointment creation GUI 600. The time zone selection row 645 now indicates that the selected locality for time zone purposes is New York, and the start and end times are now given in Eastern Daylight Time (EDT) rather than PDT. As in this example, some embodiments automatically adjust the start and end times for the appointment based on the time zone adjustment. Accordingly, 2 PM PDT became 5 PM EDT, with a similar change for the end time. On the other hand, some embodiments do not adjust the times, leaving such adjustments up to the user.

Figures 7, 8:
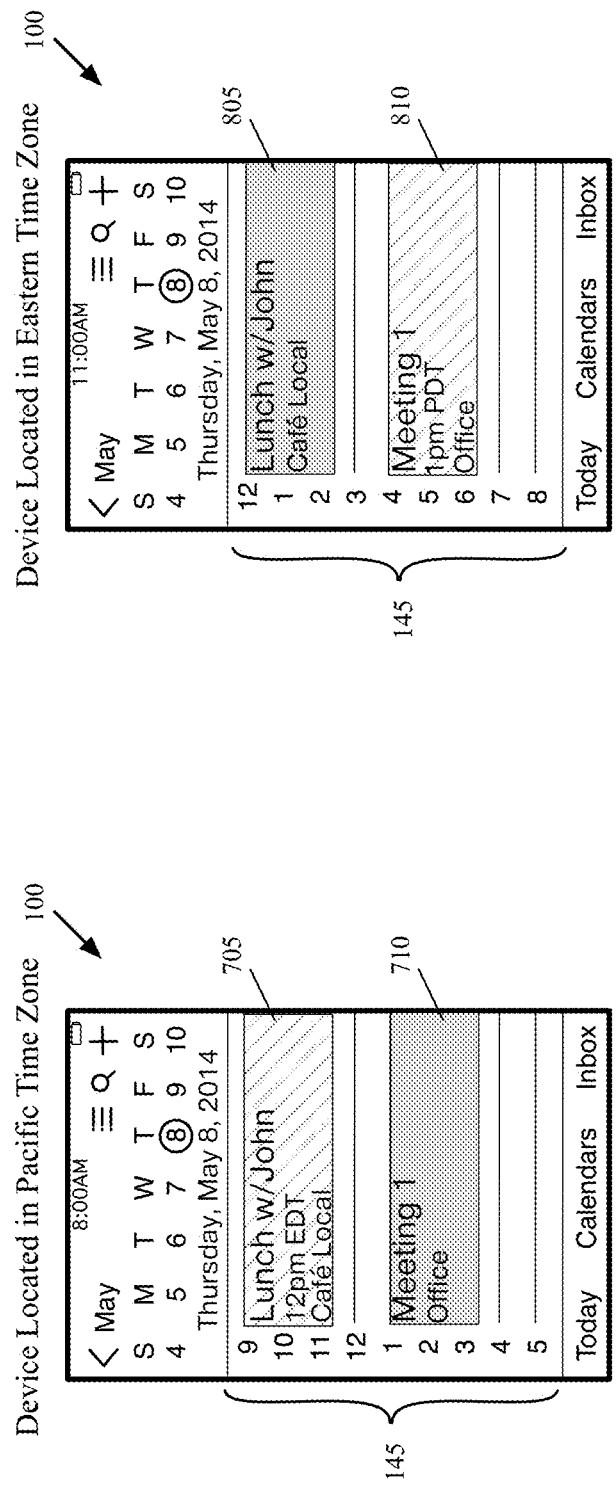
FIGS. 7 and 8 illustrate the calendar layout GUI of some embodiments in two different circumstances for the same calendar.

FIGS. 7 and 8 illustrate the calendar layout GUI 100 of some embodiments in two different circumstances for the same calendar. Specifically, FIG. 7 illustrates the calendar layout GUI 100 when the mobile device is located in the Pacific time zone, while FIG. 8 illustrates the calendar layout GUI 100 for the same schedule when the mobile device is located in the Eastern time zone. In this case, after changing the time zone for the new appointment ("Lunch w/ John") in FIG. 6, the user modified the time for that appointment to be May 8, 12 PM EDT. In addition, the user has scheduled a separate meeting for 1 PM PDT on the same day.

In FIG. 7, the calendar layout 145 includes two appointment representations 705 and 710. The first appointment representation 705 is for the appointment "Lunch w/ John", created for the Eastern time zone as described above. The second appointment representation 710 is for a meeting ("Meeting 1"), set for 1 PM in the Pacific time zone. The first appointment representation 705 is displayed in the user's schedule at 9 AM, the time in PDT that corresponds to the 12 PM EDT specified time for this appointment. In addition, the first appointment representation 705 includes text indicating the meeting name and location, as well as the specified time and time zone for the appointment ("12 pm EDT"). On the other hand, the second appointment representation 710 includes text only indicating the meeting name and location, but does not include an indication of the specified time zone (because the calendar layout displays the schedule in the time zone specified for the appointment). Furthermore, as shown, some embodiments display the two appointment representations differently (e.g., different colors, different shades, different patterns, etc.). In addition, other embodiments might indicate that an appointment is set for a different time zone in other manners.

In FIG. 8, the calendar layout 145 also includes two appointment representations 805 and 810. Again, the first appointment representation 705 is for the appointment "Lunch w/ John" in the Eastern time zone, while the second appointment representation 710 is for the appointment ("Meeting 1") in the Pacific time zone. Because the user device is located in the Eastern time zone in this example, the application displays the first appointment representation 705 in the schedule at 12 PM and the second appointment in the schedule at 4 PM, which corresponds to its specified time at 1 PM PDT. Whereas in FIG. 7 the first appointment representation 705 included extra text indicating that the appointment was specified for Eastern time, in this case the first appointment representation 805 includes no such text. Instead, the second appointment representation 810 includes similar text indicating that its appointment was scheduled for 1 PM Pacific time. In addition, the appearance used for the appointment representation 705 is now used for the second appointment representation 810, while the default appearance used for representation 710 is now used for representation 805.

In some embodiments, if the user's schedule for May 8 included additional appointments for the Eastern time zone, then the calendar layout in FIG. 8 would include additional appointment representations having the same appearance as that of the representation 805 (the representation for appointments in the current time zone). On the other hand, if the schedule included another Pacific time zone appointment, some embodiments would display the representation for this appointment using the same appearance as that of the representation 810. If the schedule included another appointment in a third time zone (e.g., Central Daylight Time), then some embodiments of the application would also display this third representation using the same appearance as that of the representation 810 (in addition to indicating the specified time in CDT). On the other hand, other embodiments use a different appearance for each different time zone, and would thus use a third appearance for a representation of an appointment for which CDT was the specified time zone.

Figure 9:
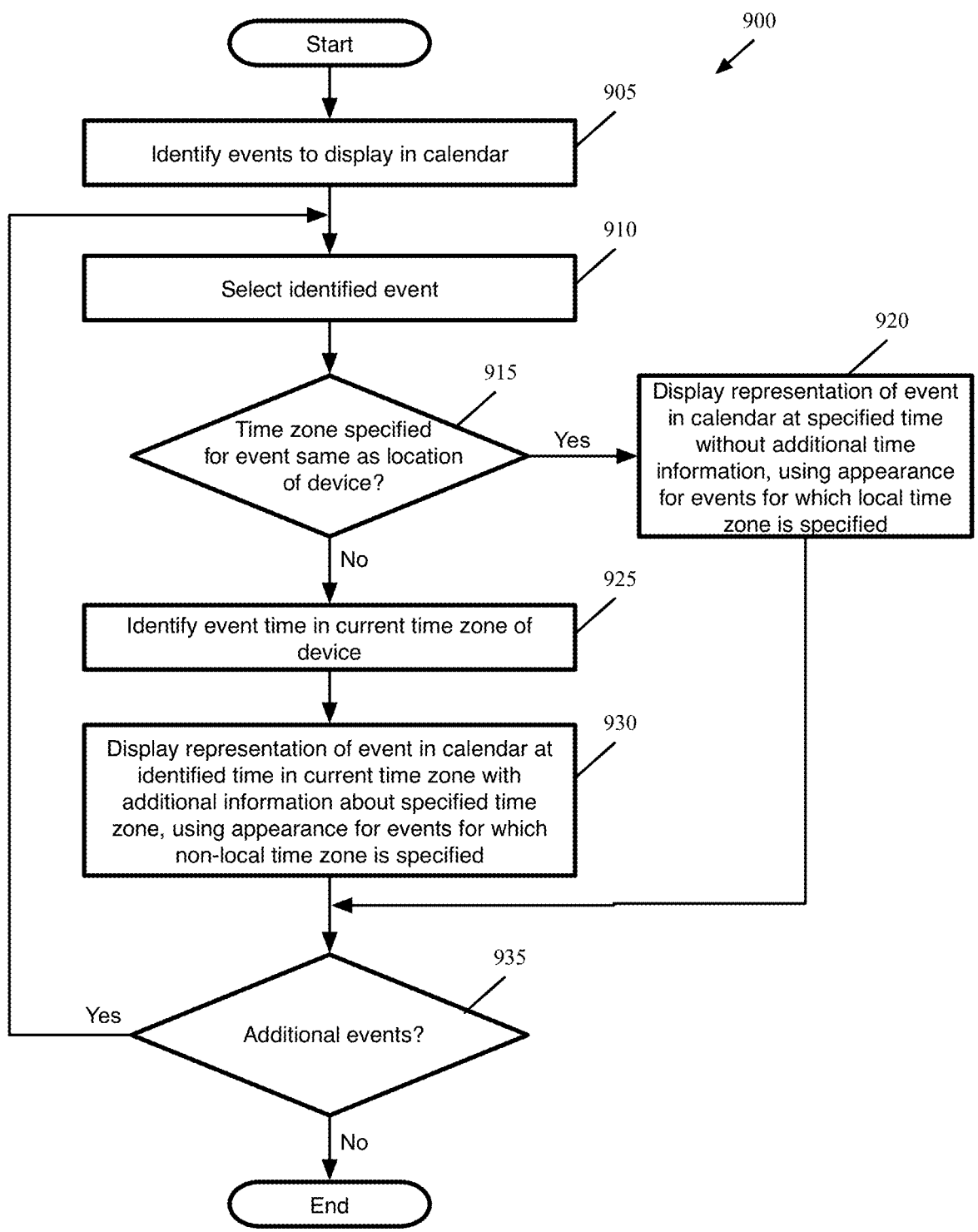
FIG. 9 conceptually illustrates a process of some embodiments for displaying appointment representations in a calendar layout.

FIG. 9 conceptually illustrates a process 900 of some embodiments for displaying appointment representations in a calendar layout. Specifically, the process relates to the display of appointment representations for appointments with time zones specified, as shown in FIGS. 7 and 8. In some embodiments, the process 900 is performed by a calendar application operating on a mobile device. One of ordinary skill in the art will recognize that the process 900 is part of a larger process for displaying a calendar layout in some embodiments, which may also include processes relating to the state diagram 500, described above, as well as other aspects of the display.

As shown, the process 900 begins by identifying (at 905) events, or appointments, to display in the calendar layout. The calendar application of some embodiments accesses a user's schedule or, in some cases, multiple schedules. For example, a user might have multiple calendars associated with different e-mail addresses, which the calendar application aggregates. In different embodiments, the calendar application might store the schedule of appointments locally on the user device, access the user's schedule in a network storage (e.g., a user's network storage account), or a combination thereof. These appointments include appointments organized by the user as well as appointments organized by a different individual to which the user is invited and has accepted. When identifying appointments to display in the calendar layout, the application of some embodiments identifies the portion of the schedule that will actually be displayed (i.e., the day(s) and hours to currently display in the calendar application GUI. However, some embodiments perform the process to generate appointment representations for other portions of the user's schedule (e.g., upcoming hours or days) that the user may request the application display.

Next, the process 900 selects (at 910) one of the identified events. Some embodiments perform the subsequent looped operations for the user's appointments in scheduling order, a random or pseudo-random order, etc. In addition, one of ordinary skill in the art will recognize that some embodiments may perform the operations 915-930 for several appointments in parallel, rather than generating appointment representations one at a time. For purposes of explanation, however, the process 900 is described as a linear process.

The process then determines (at 915) whether the time zone specified for the selected event is the same as the time zone in which the device is currently located. In some embodiments, the device on which the application operates connects to network stations (e.g., WiFi router, cellular network tower, etc.) which provide time information, including the date, time zone, local time, etc. In some embodiments, the calendar application automatically displays the schedule in the local time. Thus, even if the default time zone for the device is Pacific time, if the user In addition, at least some of the appointments include specified time zone information. As shown in FIG. 6, when the user of the calendar application creates a new appointment, the user may choose a specific time zone for the event or use a default time zone, which is stored with the event in either case. Appointments to which the user is invited by others will generally have a time zone associated as well.

When the specified time zone for the appointment and the current time zone of the device are the same, the process displays (at 920) a representation of the appointment in the calendar layout at the specified time without additional time zone information. For the representation, the process uses an appearance designated for appointments for which the current local time zone is specified. That is, the application displays the appointment representation with a default appearance (e.g., color, shade, border, fill pattern, etc.) used when the specified time zone information for the appointment is the same as the local time zone. For instance, the appointment representations 710 in FIGS. 7 and 805 in FIG. 8 are displayed in this manner. The process 900 then proceeds to 935, described below.

On the other hand, when the specified time zone for the appointment is different than the time zone in which the device is located (and therefore the time zone for which the schedule is displayed), the process 900 identifies (at 925) the appointment time in the current time zone of the device. That is, the application converts the specified time in the first time zone into a second time in the current time zone. For example, an event specified for noon in the Eastern time zone will be converted into 9 AM when the device is operating in Los Angeles, whereas an event specified for noon in the Pacific time zone will be converted into 3 PM when the device is operating in New York.

The process then displays (at 930) a representation of the appointment in the calendar at the identified time in the current time zone (as opposed to the specified time in the specified time zone) along with additional information about the specified time zone. For the representation, the process uses an appearance designated for appointments for which a time zone other than the local time zone is specified. That is, the application displays the appointment representation using a different appearance (e.g., color, shade, border, fill pattern, etc.) than that used for appointments for which the current time zone is specified. Some embodiments have one appearance used for all time zones different from the current time zone, whereas other embodiments use different appearances for appointments with different specified time zones. For instance, the appointment representations 705 in FIGS. 7 and 810 in FIG. 8 are both displayed with a different appearance than the appointment representations for the events specified in the local time zone. In some embodiments, as in these figures, the additional information displayed for non-local events is the specified time zone and time in text within the appointment representation (e.g., the "12 pm EDT" shown in appointment representation 705. Other embodiments may include additional or different indicators, such as a selectable graphical indicator that the user can select in order to cause the application to display additional time and time zone information about the appointment.

After displaying the representation for the selected event, the process determines (at 935) whether additional events remain to be displayed. When the operations 915-930 have not yet been performed for all appointments in the displayed schedule, the process returns to 910 to select the next appointment. Otherwise, when all identified appointments have been processed, the process ends.

III. Commenting on Invitations

The above sections describe various features of the calendar layout GUI of some embodiments. The following section describes a calendar message user interface (inbox) of some embodiments, and its use to accept or decline appointment invitations, as well as to comment on such appointment invitations. In some embodiments, when a user of the calendar application declines an appointment (through an invitation message in the same inbox in some embodiments), the application automatically provides the user with the ability to add a comment to a communication that will be sent to the organizer of the appointment, rather than sending the communication right away. The user can then type in a comment (e.g., through a touchscreen keyboard), and accept or decline other invitations present in the inbox. The calendar application holds off on sending the communications indicating acceptance/declining of an invitation until the user provides input indicating that she has completed actions in the inbox (e.g., by returning to the calendar layout).

Figure 10:
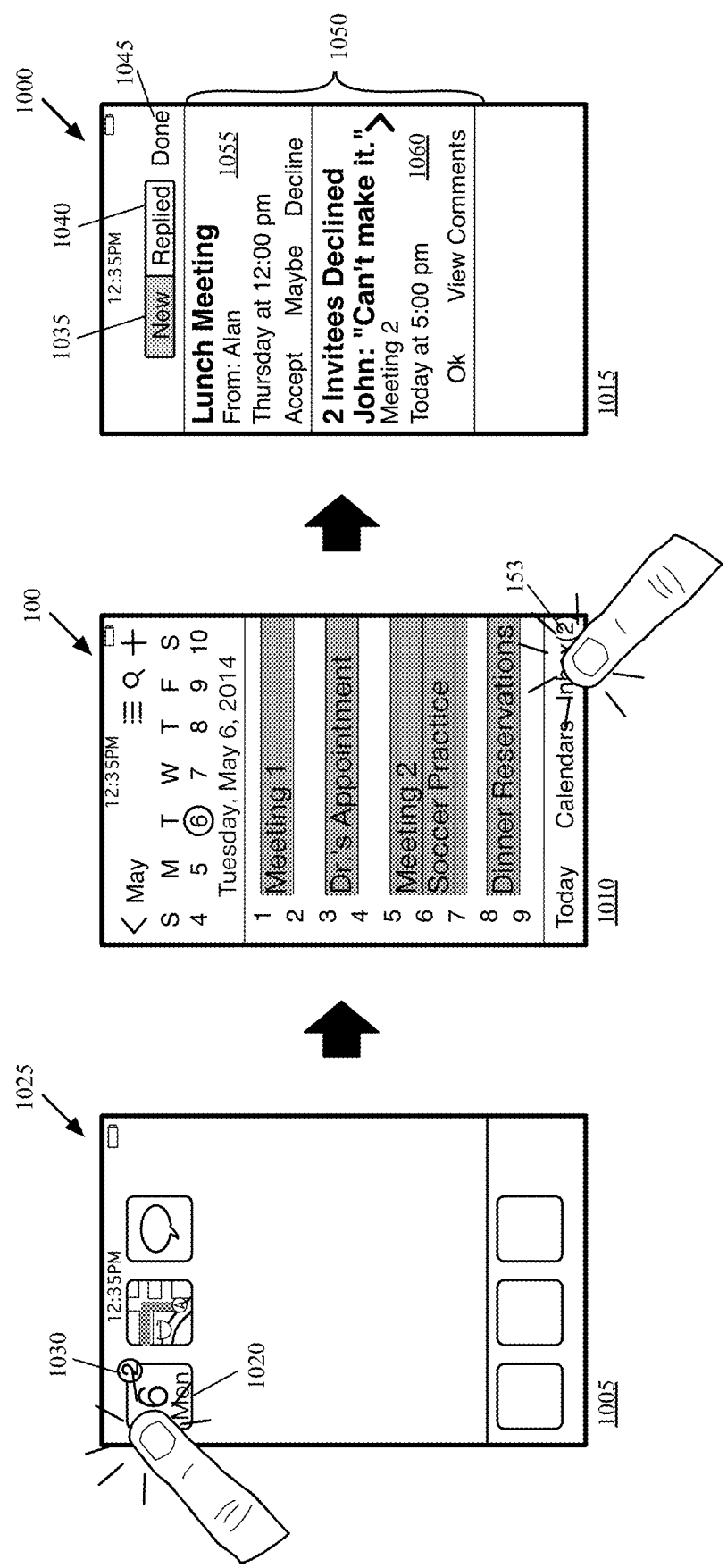
FIG. 10 illustrates a user accessing the calendar message user interface of some embodiments.

FIG. 10 illustrates, over three stages 1005-1015, a user accessing the calendar message user interface 1000 of some embodiments, also referred to within this document as an inbox. Specifically, in the first stage 1005, the user opens the calendar application, then selects the inbox access item in the second stage 1010 in order to view the calendar message user interface 1000 in the third stage 1015.

The first stage 1005 illustrates a home screen UI 1025. In this UI 1025, the mobile device presents various selectable user interface items, each representing a different application. These applications may be provided by the manufacturer of the device (e.g., a standard e-mail application, mapping and navigation application, messaging application, etc.), or by third party application providers (e.g., service-specific applications such as streaming video, social media, etc. applications). In some embodiments, the calendar application is an application provided by the manufacturer of the device. At the first stage 1005, the user selects a selectable item 1020 representing the calendar application. This selectable item includes a small badge 1030 with the number "2", which indicates that the user has received two new calendar messages.

As a result, the second stage 1010 illustrates that the device has opened the calendar application, which displays the calendar layout GUI 100. The inbox access item 153 includes the number "2", so as to also indicate that the user has received two new calendar messages. In the second stage 1010, the user selects the inbox access item 153.

The third stage illustrates the resulting calendar message user interface 1000 of some embodiments. The calendar message UI 1000 includes a set of tabs, with a new messages tab 1035 and a replied messages tab 1040. In addition, the calendar message UI includes an activities completed item 1045, and a messages display area 1050. The new messages tab 1035 and the replied messages tab 1040 enable the user to select which sets of messages are displayed in the messages display area 1050. Presently, the new messages tab 1035 is selected, and therefore new messages are displayed in the messages display area 1050. Selection of the activities completed item 1045 causes the application to (i) perform any actions specified by the user through the messages display area (e.g., accept or decline invitations, send comments, etc.) and (ii) return to the calendar layout GUI 100.

The messages display area 1050 displays information about communications that the calendar application has received regarding appointments. These messages may be replies to appointment invitations that the user of the calendar application has previously sent out, or appointment invitations sent to the user of the calendar application by others to invite that user to an appointment. In some embodiments, when the new messages tab 1035 is selected, the messages display area displays new communications that the user has not yet interacted with. For instance, for appointment invitations received from others, the user can respond by accepting the appointment, declining the appointment, or indicating that she is unsure as to availability (responding with "maybe") for the appointment. The first message item 1055 shown in the messages display area 1050 is an example of such an invitation. The invitation displays the meeting name, the organizer of the meeting who sent the invitation, and the time of the meeting. Some embodiments may include other information about the meeting, such as any notes or attachments specified by the organizer of the meeting. The invitation also displays three selectable options (accept, maybe, and decline). In some embodiments, once the user selects one of the options and the application sends a communication to the organizer regarding the user's response, the message will then be available via the replied messages tab 1040.

The new messages inbox also displays communications received from invitees in response to appointment invitations sent to the invitees by the user of the calendar application. These may replies indicating acceptance, decline, or a "maybe" response to an invitation, as well as comments regarding the appointment. When multiple invitees have commented on and/or declined the appointment, some embodiments aggregate these communications into a single entry in the user interface. For instance, the second message item 1060 shown in the messages display area 1050 is an example of a set of such aggregated communications received in response to an appointment invitation sent by the user of the calendar application. Specifically, the user of the application organized the appointment "Meeting 2" and sent the appointment out to several invitees. The message item 1060 indicates that two of these invitees have declined the invitation. In some embodiments, only responses declining an appointment or commenting on an appointment are displayed in the new messages inbox. In this example, two invitees have declined, one of whom also commented. In some embodiments, when the comment does not fit on one line, the application truncates the comment.

In some embodiments, the user can select one of these message items to view further detailed information about the appointment, including information indicating (i) whether invitees have responded, (ii) what the invitees' responses indicated, and (iii) whether the invitees had comments about the appointment. In addition, some embodiments provide a separate selectable item for each of the message item (the "View Comments" item within the message item 1060)) to access a page with more detailed information about the invitees of the appointment. This page, in some embodiments, also provides indication as to which invitees have responded, as well as indicators (e.g., graphical indicators) about whether responding invitees indicated they will attend. In addition, the page provides the full text of any comments the invitees may have had regarding the appointment. Rather than combining the first type of communications (e.g., the invitation 1055) and the second type of communication (the comment and/or declining of an appointment 1060), some embodiments provide a third tab for messages relating to appointments organized by the user of the calendar application.

As indicated, when a user of the calendar application of some embodiments declines an appointment through the invitation message item, the application automatically provides the user with the ability to add a comment to a communication that will be sent to the organizer of the appointment, rather than sending the communication right away. The user can then type in a comment (e.g., through a touchscreen keyboard), and accept or decline other invitations present in the inbox. The calendar application holds off on sending the communications indicating acceptance/declining of an invitation until the user provides input indicating that she has completed actions in the inbox (e.g., by returning to the calendar layout).

Figure 11:
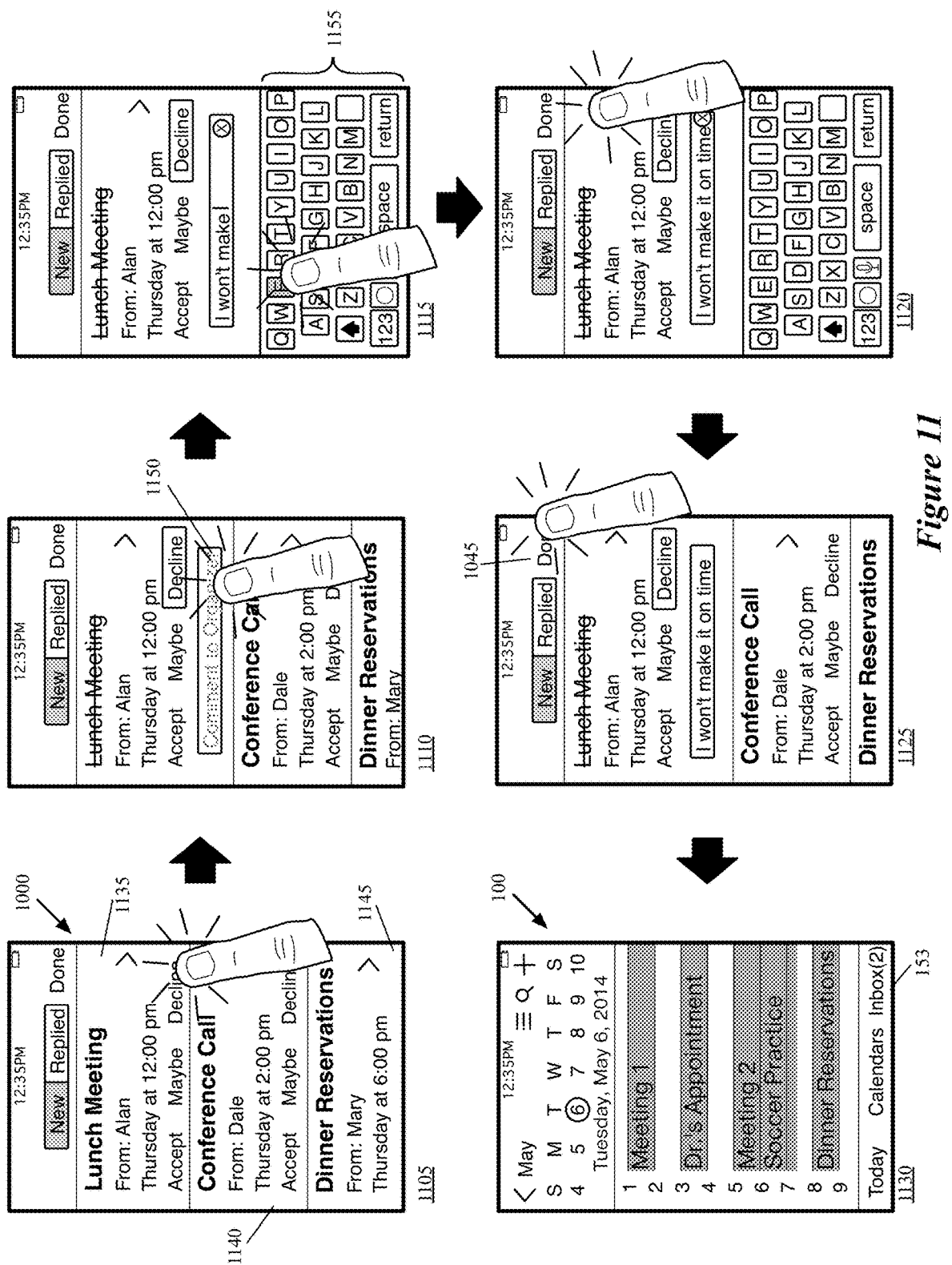
FIG. 11 illustrates an example of a user declining an appointment and commenting on the appointment in the calendar message user interface of some embodiments.

FIG. 11 illustrates an example of a user declining an appointment and commenting on the appointment in the calendar message user interface 1000 of some embodiments over six stages 1105-1130. Specifically, the user selects the decline option for an appointment, then selects a text field automatically displayed for the declined appointment, enters a comment into the text field, and completes user activities within the calendar messages UI.

As shown, the first stage 1105 illustrates the calendar messages GUI 1000, with three message items 1135-1145 displayed, all three of which are for new invitations for appointments to which the user of the calendar application is invited. In some embodiments, the first message item 1135 is an invitation to a meeting Thursday at noon, the second message item 1140 is an invitation to a conference call at 2 PM on Thursday, and the third message item 1145 is an invitation to dinner at 6 PM on Thursday. Each of these message items 1135-1145 lists event details (title, organizer, and date/time), and provides the accept, maybe, and decline selectable options. In the first stage, the user selects the decline option for the message item 1135 by tapping the touchscreen at the location of the "Decline" text.

The second stage 1110 illustrates that the calendar messages GUI 1000 registers the selection of the decline option in three ways. First, the calendar application lightens the display of the meeting name (e.g., by removing a bold styling applied to the text, by decreasing the font size, etc.) and applies a strikethrough to the meeting name. Secondly, the application displays the "Decline" option as selected at the bottom of the message item. Third, the application displays a text field 1150 within the message item 1135, with background text "Comment to Organizer". The techniques used in this example to indicate that the user has selected to decline an appointment invitation are only one example of such UI features, and different embodiments may use different techniques to indicate a user's choice.

In some embodiments, when the user selects either "Accept" or "Maybe", the selectable option is highlighted in a similar fashion to that shown for the "Decline" option in stage 1110. However, the calendar application neither modifies the meeting title nor displays a text field for the other two options. In other embodiments, though, the calendar application automatically displays the text field when the user selects any of the three response options. As indicated by the background text of the comment field, the user may use the comment field to enter a comment regarding the appointment with the response that will be sent to the organizer of the appointment (e.g., the comment "Can't Make it." shown in the message item 1060 of FIG. 10). The second stage 1110 illustrates the user selecting the comment field (e.g., with a tap input on the location of the comment field).

The selection of the comment field causes the application to display a touchscreen keyboard 1155, as shown in the third stage 1115. The touchscreen keyboard 1155, in some embodiments, is a GUI construct provided by the operating system of the touchscreen device to which the various applications are allowed access. When the user selects the comment field, the background text automatically disappears and the application displays a text cursor blinking in the comment field. As shown at this stage, the user has begun typing the comment "I won't make . . . " into the comment field, using the touchscreen keyboard.

The fourth stage 1120 illustrates that the user has completed the text input through the touchscreen keyboard, and provides touch input outside of the comment field 1150 and touchscreen keyboard 1155 in order to indicate completion of the text entry, at least for the time being. As a result, the fifth stage 1125 illustrates that the application has removed the touchscreen keyboard 1155 from the display. The user also selects the activities completed item 1045 in order to leave the calendar messages GUI. As shown, this causes the calendar application to return to the calendar layout GUI 100 of some embodiments in the sixth stage 1130.

The inbox access item 153 in the calendar layout GUI 100 now indicates that the user only has two new messages in the inbox rather than three. In some embodiments, when the user selects the activities completed item 1045, as shown in the fifth stage 1125, the calendar application sends out messages based on the response selections entered by the user. Thus, when the user selects the decline option in the second stage 1110, the application does not yet send out any communications to the organizer Even after the user completes entering a comment into the text field and selects elsewhere in the GUI in the fourth stage 1120, the application does not send either the decline response or the comment to the organizer of the appointment. This allows the user to respond to multiple appointments within the calendar messages inbox, edit comments, etc., before any responses are sent out to the organizers of the respective appointments.

Figure 12:
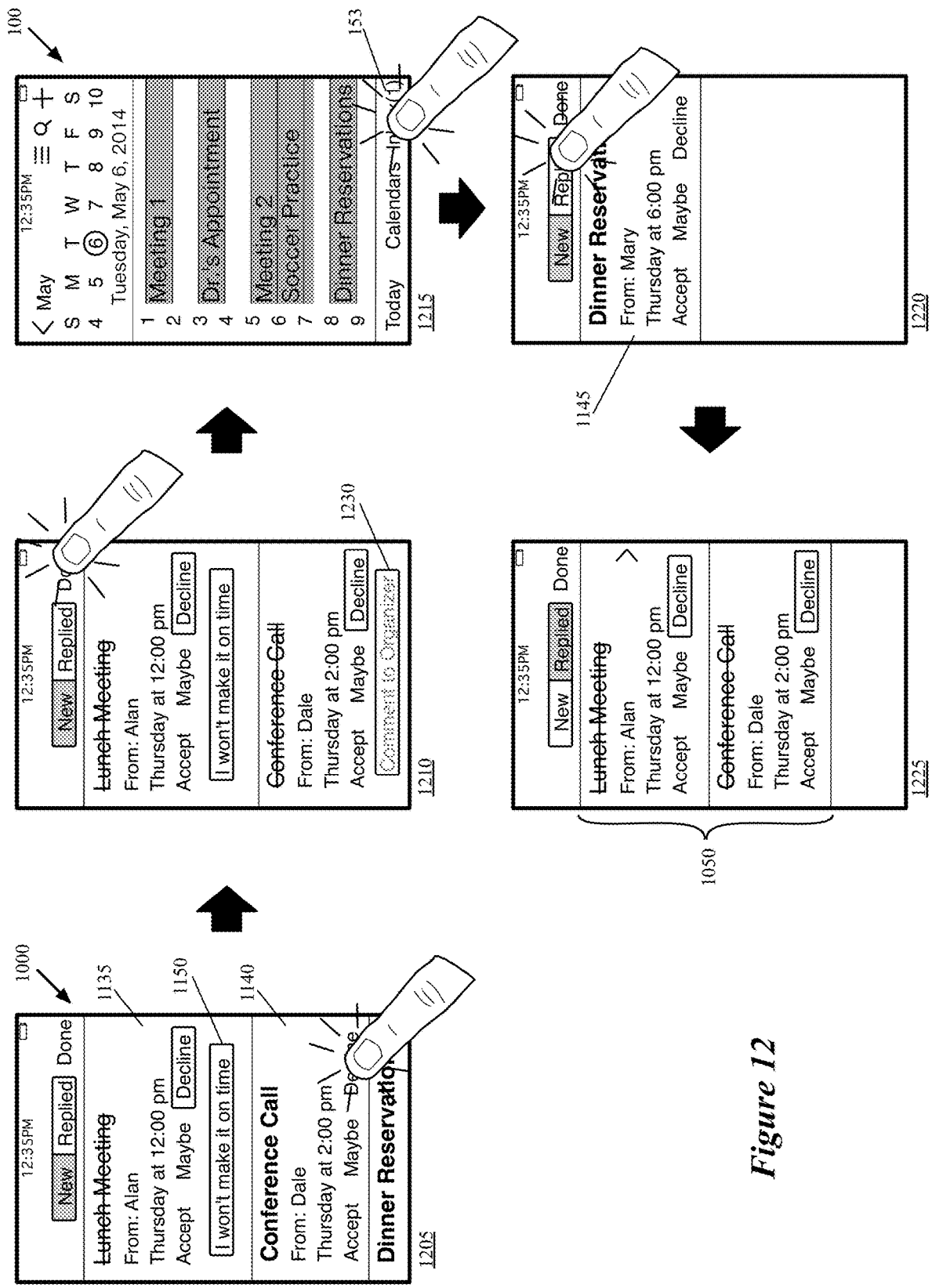
FIG. 12 illustrates a user declining multiple appointments in the calendar messages GUI.

FIG. 12 illustrates a user declining multiple appointments in the calendar messages GUI 1000 over five stages 1205-1225. Specifically, the user declines multiple events, completes calendar activities in the messages GUI, then returns to the calendar messages GUI with the completed activities reflected in the replied messages inbox rather than the new messages inbox.

The first stage 1205 illustrates the calendar messages GUI 1000 in the same state as the fifth stage of FIG. 11. That is, the user has declined a first appointment through the decline option in the selectable message item 1135, and has entered a comment into the text field 1150. At this stage, the user selects the decline option for the second message item 1140, in order to decline the conference call appointment. As a result, the application provides a second text field 1230 in the second stage 1210, to allow the user to enter a comment regarding the conference call appointment. However, rather than entering a comment, the user selects the activities completed item 1045.

The third stage 1215 illustrates the calendar layout GUI 1000. The calendar application at this point will have sent communications to the organizers of the two declined appointments, indicating that the user has declined these appointments (along with a comment to the organizer of the lunch meeting). As a result of the user declining two appointments, the inbox access item 153 indicates that only one new message remains. The user selects this item in the third stage 1215 in order to return to the calendar messages GUI 1000.

As such, the fourth stage 1220 illustrates the calendar messages GUI 1000, with the new messages tab again selected. However, because the calendar application has replied to the message items 1135 and 1140, only the message item 1145 remains in the new messages inbox. At the fourth stage 1220, the user selects the replied messages tab. The fifth stage 1225 therefore illustrates the replied messages in the message display area 1050 of the calendar messages GUI 1000. The message items 1135 and 1140, for the appointments that the user declined in the previous stages, are now displayed in the replied messages inbox.

Figure 13:
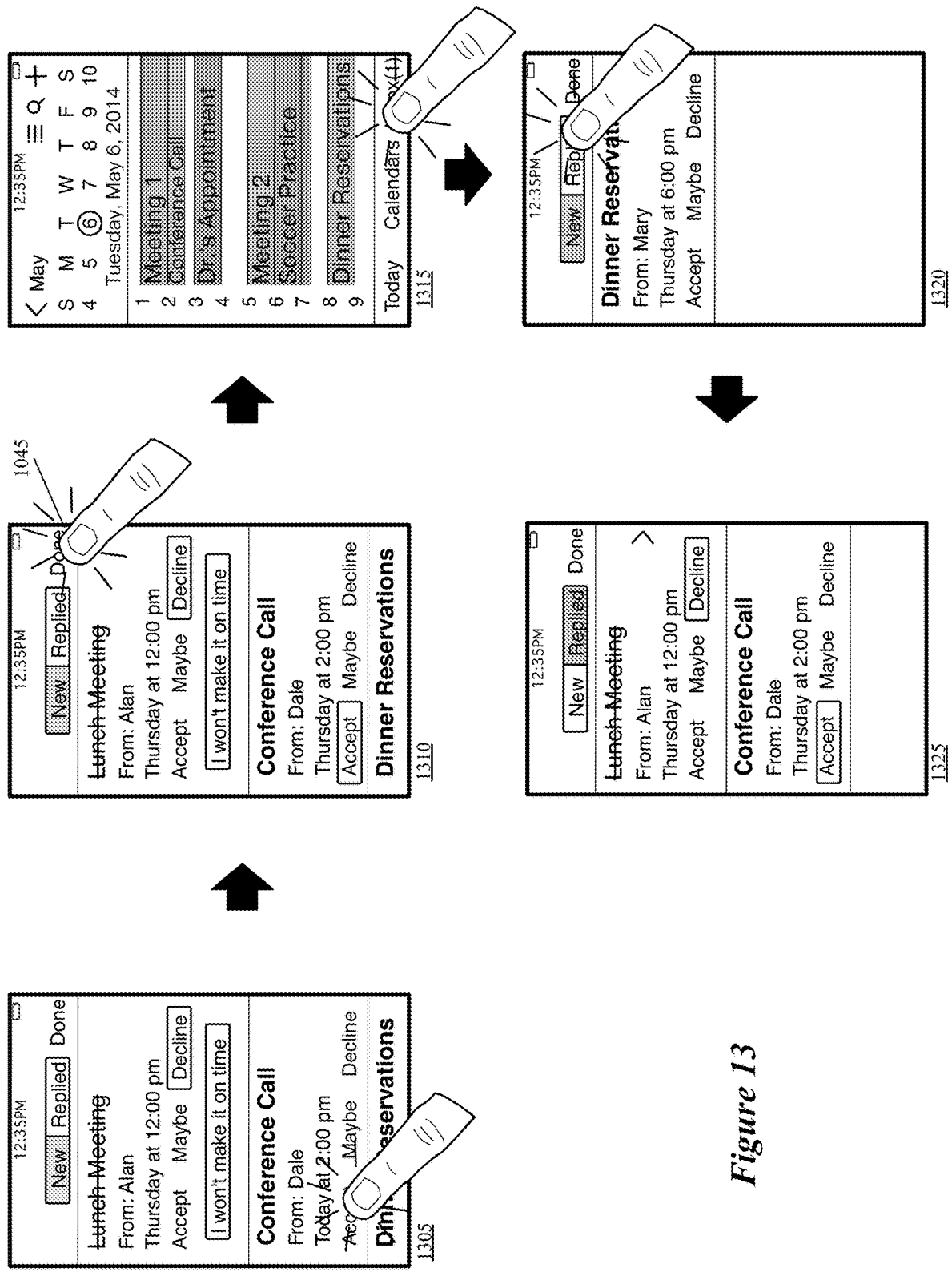
FIG. 13 illustrates the same flow as FIG. 12, except that the user accepts one of the invitations rather than declining it.

FIG. 13 illustrates the same flow over five stages 1305-1325 as the previous figure, except that the user accepts the conference call invitation rather than declining it. Specifically, in the first stage 1305, the user selects the accept option within the message item 1140. Thus, in the second stage 1310, the accept option is highlighted for the conference call message item 1140, and the appointment title has not been crossed out. In the fifth stage 1325, the message item for the accepted appointment also appears with the accept option highlighted. When the user selects the activities completed item 1045 in the second stage 1310, the calendar application sends a first message to the organizer of the lunch meeting to decline that appointment and a second message to the organizer of the conference call appointment to accept that appointment.

Figure 14:
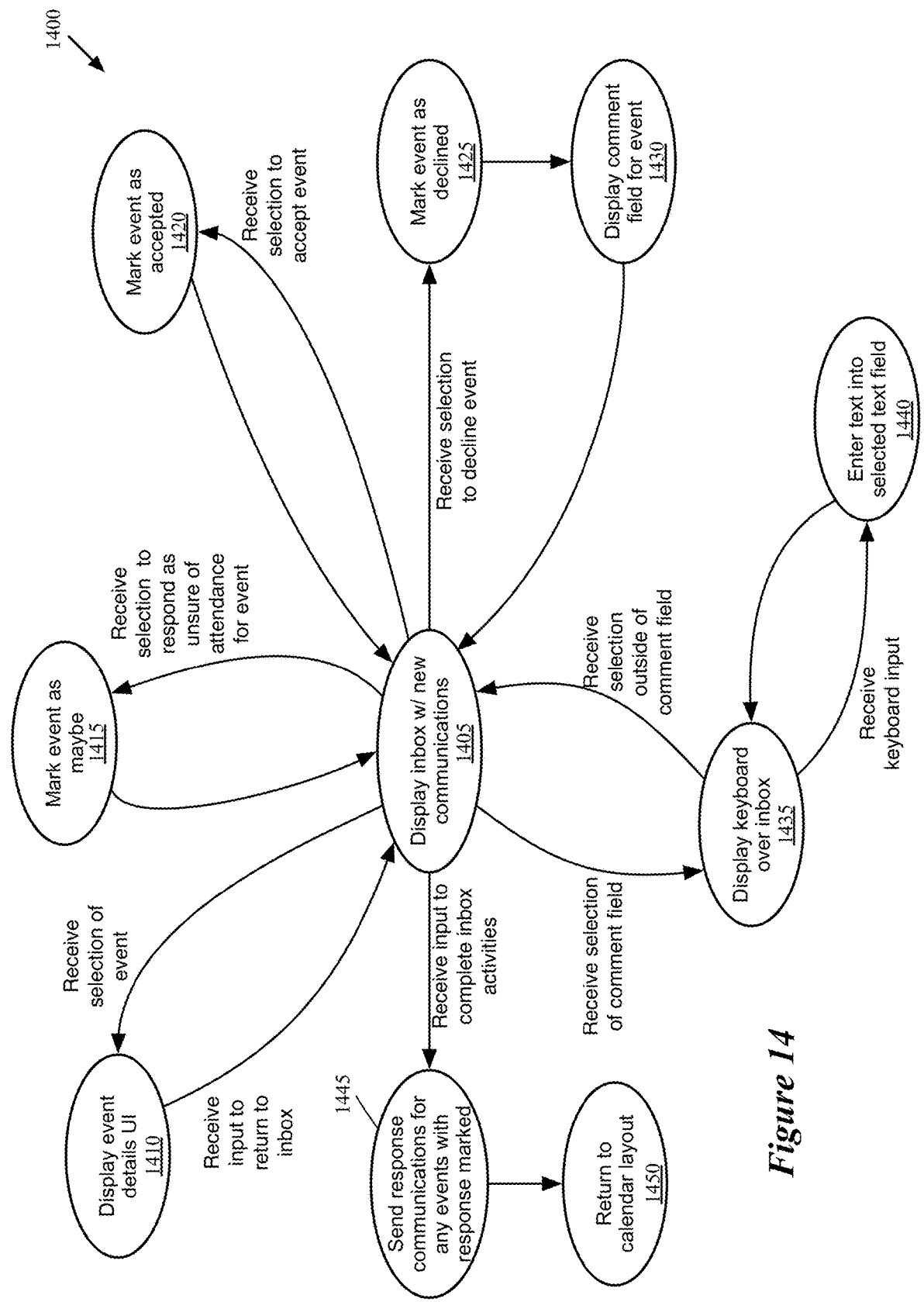
FIG. 14 conceptually illustrates a state diagram that shows states and changes between states for the calendar message GUI of some embodiments.

FIG. 14 conceptually illustrates a state diagram 1400 that shows states and changes between states for the calendar message GUI of some embodiments. Specifically, the state diagram 1400 pertains to the calendar message GUI when the new messages tab of some embodiments is selected. One of ordinary skill in the art will recognize that this state diagram does not cover every possible interaction with the calendar message GUI, or even the messages display area. For instance, the state diagram does not describe scrolling through the messages when the number of message items is too numerous to all fit within the display area at once. Furthermore, the state diagram does not describe interactions to toggle between the new messages inbox and the replied messages inbox, nor does the state diagram describe interactions with message items for responses to appointments organized by the user (e.g., message items such as item 1060 of FIG. 10). For such message items, in some embodiments the user may view appointment details, view an invitees GUI with comments from the invitees, and acknowledge the message item in order to cause the application to remove the message item from the new messages inbox. In each of the states shown in the state diagram 1400, the operations of the calendar application are controlled by one or more application processes that are responsible for handling the user interaction with the calendar application GUI.

When the calendar messages GUI is open but the user is not interacting with it, the GUI is in the state 1405, at which the calendar application displays the new messages display area (the inbox) with all new (unreplied-to) communications. Examples of this state include stage 1015 of FIG. 10 or stage 1105 of FIG. 11 (prior to the user selecting the decline appointment option).

When the application receives the selection of an appointment (shown as an event in the figure), the application transitions to state 1410 to display an appointment details GUI. This GUI, described in greater details below by reference to FIG. 23, displays various information about an appointment (either an appointment organized by the calendar application user or an appointment to which the calendar application user is invited). The appointment details, in some embodiments, indicate the appointment time, location, and invitee data, as well as other information. In addition, the appointment details GUI of some embodiments includes a return to previous GUI item. Thus, if accessed from the calendar messages GUI, the appointment details GUI includes an item for returning to the calendar messages GUI. Thus, when the application receives a selection of this item (or other input for returning to the calendar messages GUI), the application transitions back to the state 1405 to again display the calendar messages GUI.

When the application receives a selection for a particular message item that the user is unsure of attendance of the appointment (e.g., the "Maybe" option), the application transitions to state 1415 to mark the appointment as a maybe response, then transitions back to the default state 1405. Similarly, when the application receives a selection for a particular message item that the user accepts the appointment, the application transitions to the state 1420 to mark the event as accepted, then transitions back to the default state 1405. In both of these events, the application does not actually respond to the selected appointment invitation by sending any communications to the organizer. The first and second stages 1305 and 1310 of FIG. 13 illustrate an example of the user accepting an invitation, and the resulting change in the GUI.

When the application receives a selection for a particular message item that the user declines the appointment, the application transitions to the state 1425 to mark the event as declined. Before transitioning back to the state 1405, the application also transitions to the state 1430 to display a comment text field for the appointment. For instance, in FIG. 11, when the user selects the decline option in the first stage 1105, the GUI 1000 highlights the decline option, crosses through the appointment title, and displays the comment field 1150 within the selectable message item for the declined appointment in the second stage 1110.

So long as at least one appointment with a message item displayed in the calendar messages GUI has been declined, the user can select the comment text field for the item (e.g., by tapping the touchscreen at the location of the text field). When the application receives such a selection of a text field for comments, the GUI transitions to state 1435 and displays a touchscreen keyboard over a portion of the messages display area. In some embodiments, when the selected comment field is located at the bottom of the display, the application automatically scrolls the message item containing the selected text field up to the top of the messages display area. With the touchscreen keyboard displayed, as the user enters keyboard input, the application transitions to the state 1440 to enter text into the selected text field. The user may repeatedly enter text, and with each character entered (or removed) the application transitions to the state 1440 and then back to the state 1435. When the application receives a selection outside of the comment field, the application removes the keyboard from the display in order to transition back to the default state 1405 (e.g., as shown in the fourth and fifth stages 1120 and 1125 of FIG. 11).

Finally, when the application receives input to complete calendar messaging activities (e.g., selection of the activities completed item 1045 or an equivalent input), the calendar application transitions to the state 1445, at which the application generates and sends response communications for any events from the new messages inbox with responses marked by the user. That is, if the user has selected response options (accept/maybe/decline) for any of the appointment invitations in the new messages inbox, the application sends the response messages for these appointments to their respective organizers once the user leaves the calendar messages GUI. In addition, some embodiments allow the user to modify her responses to appointments through the items in the replied messages inbox, and these updated response communications are sent as well at this time.

The application then transitions to the state 1450 to return to the calendar layout GUI, in some embodiments. One of ordinary skill in the art will recognize that the application may return to the calendar layout before actually sending the messages, or perform these actions at the same time. In addition, though not shown, the application may transition from state 1450 back to the state 1405 if the user selects an inbox access item or provides equivalent input while the application displays the calendar layout GUI.

IV. Participant Availability

Whereas the above section primarily described replying to appointments organized by others, the following section relates to features of the calendar application of some embodiments for organizing appointments. Specifically, the calendar application of some embodiments provides information regarding the availability of proposed participants for a new appointment, to aid in scheduling the appointment. In some embodiments, when a user enters a new invitee for an appointment (for which the user is the organizer), the application automatically accesses the invitee's calendar (e.g., by accessing a server) and displays an indicator (e.g., a graphical indicator) that indicates whether or not the invitee is available at an initially scheduled time for the appointment. When the application cannot access a particular invitee's calendar (e.g., because the server is inaccessible or the application does not have the required permissions), then the application displays an indicator that the invitee's availability is unknown.

Once the user has finished adding invitees for the appointment, the application identifies any scheduling conflicts and proposes additional new times at which the invitees are available. Some embodiments display (i) the invitees that are not available at the currently scheduled time for the appointment, (ii) at least one upcoming time at which all invitees (and the organizer of the meeting), and (iii) upcoming times at which various subsets of the invitees are available. The application presents selectable items for each of these upcoming times, enabling the organizer to select the time as a new time for the appointment, or to view the appointment in her calendar at the upcoming time.

Figure 15:
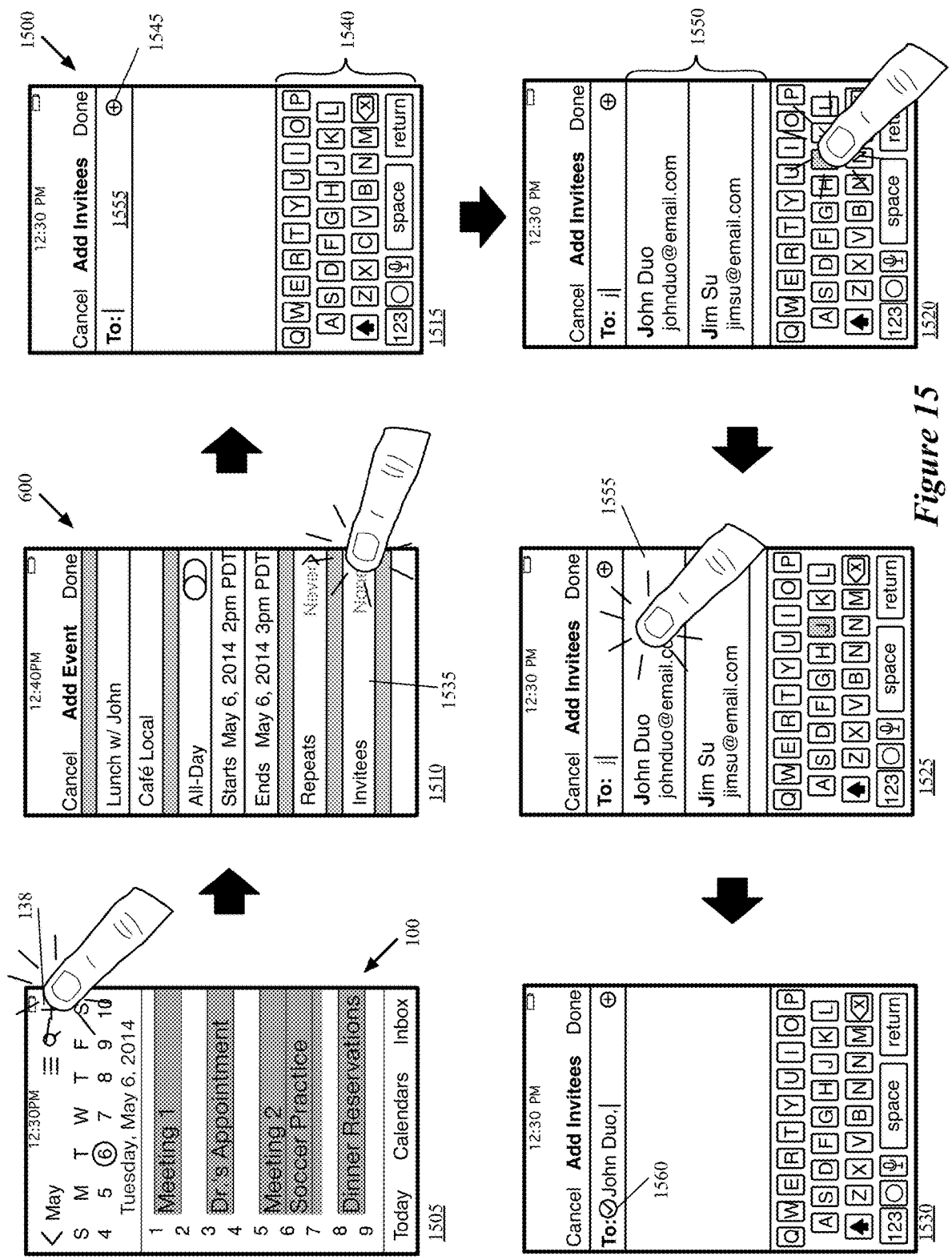
FIGS. 15 and 16 illustrate the creation of an appointment, and specifically the addition of invitees to an appointment while creating the appointment.
Figure 16:
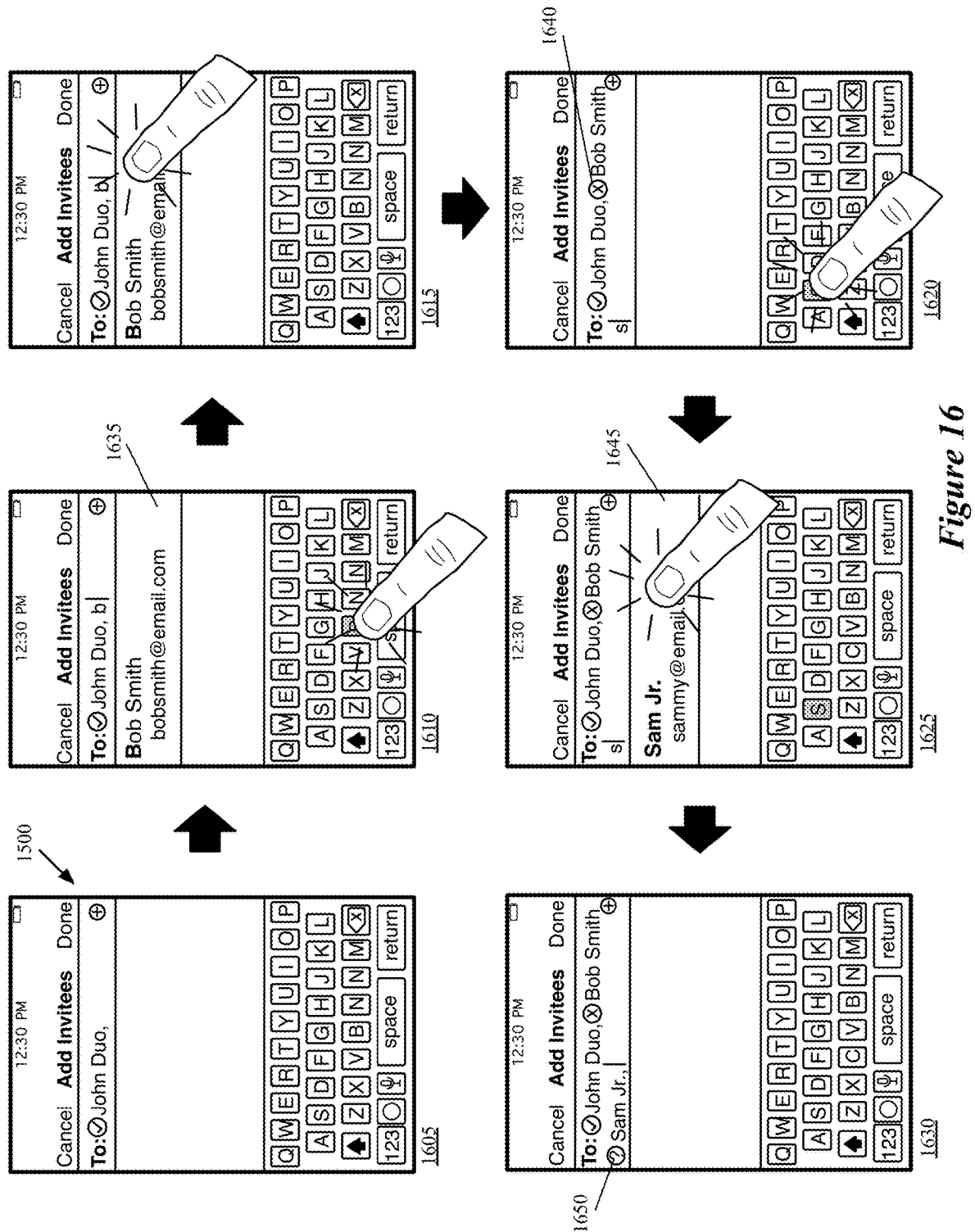

FIGS. 15 and 16 illustrate the creation of an appointment, and specifically the addition of invitees to an appointment while creating the appointment. FIG. 15, over six stages 1505-1530, illustrates the creation of a new appointment and the addition of a first invitee to the appointment. As shown, the first stage 1505 illustrates the calendar layout GUI 100, with a user selecting the new appointment creation item 138. As a result, the second stage 1510 illustrates the new appointment creation GUI 600, described above by reference to FIG. 6. At this stage, the user selects the invitees row 1535.

As illustrated in the third stage 1515, selection of the invitees row causes the application to open an invitee addition GUI 1500. The invitee addition GUI 1500 provides users with two mechanisms to add invitees to the new appointment. First, as shown, the GUI displays a text field 1555 and touchscreen keyboard 1540. Using the touchscreen keyboard 1540, the user can type identifying information for an invitee (e.g., e-mail address, name, etc.) into the text field

1555. In addition, the GUI includes an add contact selectable item 1545 which, when selected, causes the application to open a list of the contacts stored for the user (e.g., on the mobile device, in a network storage, etc.), so that the user can search through the list of contacts to find an invitee for the appointment.

The fourth stage 1520 illustrates that the user has typed a "j" using the touchscreen keyboard 1540, in order to begin entering contact identification information. As a result, the application searches through the user's contact information (e.g., the contact list, e-mail addresses from which communications have been received, etc.). The application displays, in a potential invitee display area 1550, a list of possible matches for the typed text string. In this case, the application displays a first selectable item 1555 for John Duo and a second selectable item 1560 for Jim Su.

In the fifth stage 1525, the user selects the selectable item 1555 to add John Duo as an invitee to the new appointment. As such, the sixth stage 1530 displays John Duo in the text field 1555. In addition, next to the invitee name, the application displays a graphical indicator 1560. When the calendar application of some embodiments receives an invitee for an appointment, the application attempts to access the schedule of the invitee (e.g., by accessing a server or network storage). If the user of the calendar application has been granted access to the invitee's schedule and that schedule is accessible, the calendar application identifies whether the invitee is available or busy at the time of the appointment. The check mark graphical indicator 1560 indicates that the invitee John Duo is available from 2 PM to 3 PM on Tuesday May 6, the currently scheduled time of the appointment.

FIG. 16 illustrates the continued addition of invitees to the new appointment over six stages 1605-1630. The first stage 1605 is the same as the sixth stage 1530 of FIG. 15, with John Duo added as a first invitee to the appointment. In the second stage 1610, the user types a "b", and the application presents a selectable item 1635 for the possible invitee Bob Smith, which the user selects in the third stage 1615.

The fourth stage 1620 illustrates that the invitee list now includes Bob Smith, with a different graphical indicator 1640 next to his name in the text field 1555. The graphical indicator 1640 is an X, indicating that the application was able to access Bob Smith's schedule, and that he is not available during at least a portion of the scheduled time for the new appointment (2-3 PM). In addition, at the fourth stage 1620, the user begins typing a name of a third invitee.

The fifth stage 1625 illustrates that the application presents a selectable item 1645 for the possible invitee Sam Jr., which the user selects. In the final stage 1630, the invitee list in the text field 1555 now includes three invitees. For the third invitee, Sam Jr., the application displays a third graphical indicator 1650, which indicates that the invitee's schedule was inaccessible (e.g., because the user of the calendar application does not have permissions to access Sam Jr.'s schedule). Thus, the application of some embodiments displays one of three different graphical indicators for each invitee, depending on whether the invitee is available, busy, or has an inaccessible schedule.

Figure 17:
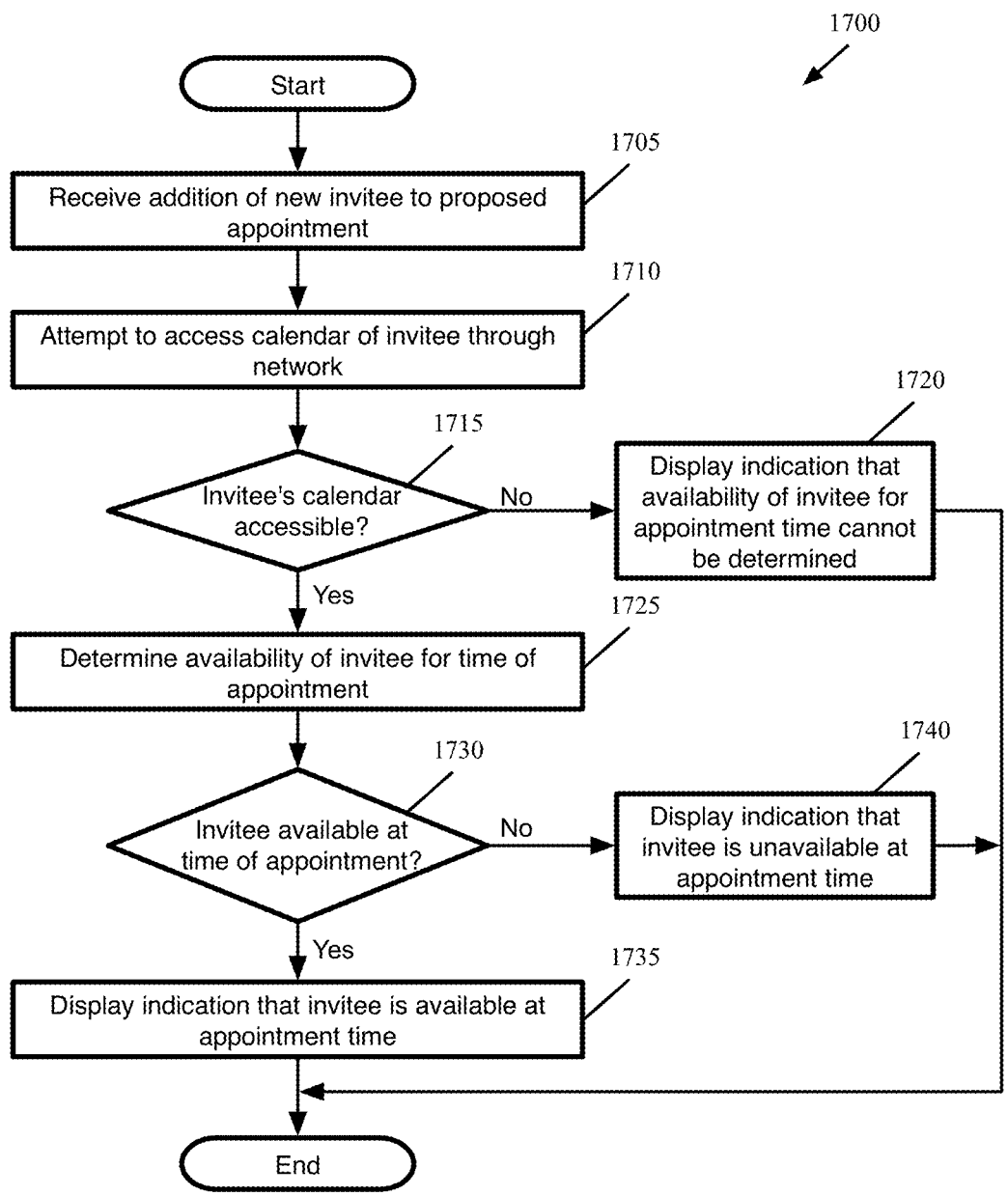
FIG. 17 conceptually illustrates a process for displaying a graphical indicator when an invitee is added to an appointment.

FIG. 17 conceptually illustrates a process 1700 for displaying such a graphical indicator when an invitee is added to an appointment. In some embodiments, the calendar application performs the process 1700 (or a similar process) each time the user adds an invitee to a new appointment. In addition, in some embodiments, the application may perform a similar process when generating other displays regarding the appointment at a later time, in case the schedule of one or more of the invitees has changed.

As shown, the process 1700 begins (at 1705) when the application receives the addition of a new invitee to a proposed appointment. As described by reference to FIG. 15, in some embodiments the user can add a new invitee by typing the invitee name or e-mail address, or by opening up a contact list and selecting a contact from that list. In some embodiments, each invitee is actually an e-mail address. That is, while a person may have multiple e-mail addresses (e.g., a work e-mail address, a personal e-mail address, etc.), only one of these addresses is selected as an invitee. In some embodiments, an appointment is always assigned a start and end time when initially created, and the organizer may edit the time of the appointment.

The process then attempts (at 1710) to access a calendar of the invitee (i.e., a schedule) through a network connection. The device on which the calendar application operates connects to at least one network in some embodiments (e.g., a cellular network, broadband network, etc.). The calendar application either attempts to connect directly with a device associated with the invitee, or to a server that stores schedule information for the invitee. For example, in a work environment, an Exchange® server or similar type of e-mail and calendar server that stores employee's calendars may be accessible. For personal e-mail addresses (e.g., mac.com, gmail.com, etc.), some embodiments contact the servers associated with those e-mail domains to access invitee schedules.

Next, the process 1700 determines (at 1715) whether the invitee's calendar is accessible. In some cases, the user of the calendar application may not have permission to access the schedule of the invitee. These permissions, in some embodiments, are granted to the e-mail address of the user which is associated with the appointment, or the device on which the calendar application runs). In other cases, the server that stores the invitee's schedule may be inaccessible at the time, or the invitee may not actually use a scheduling functionality.

When the invitee's calendar is not accessible for any reason, the process displays (at 1720) an indication that the availability of the invitee for the scheduled time of the appointment cannot be determined. Some embodiments use a graphical indicator, such as the question mark graphic 1650 shown in the sixth stage 1630 of FIG. 16. Other embodiments may use different graphical indicators, or non-graphical indicators.

When the invitee's calendar is accessible, the process determines (at 1725) the availability of the invitee at the scheduled appointment time. Some embodiments classify an invitee as unavailable if the invitee has a different appointment scheduled for any portion of the duration of the new appointment. Other embodiments, however, classify an invitee as available if the overlap between scheduled appointments in the invitee's calendar and the new appointment is small (e.g., less than a threshold duration, or less than a threshold percentage of the duration of the new appointment). In addition, some embodiments use travel time information, or use a mapping application to calculate travel time between appointments to determine whether an invitee will be able to attend an appointment.

The process then determines (at 1730) whether or not the invitee is available at the time of the appointment. When the invitee is available at the scheduled time, the application displays (at 1735) an indication of this availability. Some embodiments use a graphical indicator, such as the check mark graphic shown in the sixth stage 1530 of FIG. 15. On the other hand, when the invitee is not available at the scheduled time, the application displays (at 1740) an indication of this unavailability. Some embodiments use a graphical indicator, such as the X graphic 1640 shown in the fourth stage 1620 of FIG. 16. Other embodiments may use different graphical indicators for these two indications, or use non-graphical indicators. After displaying one of the three indicators, the process 1700 ends.

In addition to displaying indicators regarding availability, the calendar application of some embodiments attempts to solve scheduling conflicts. Specifically, some embodiments identify and display (i) the invitees that are not available at the currently scheduled time for the appointment, (ii) at least one upcoming time at which all invitees (and the organizer of the meeting), and (iii) upcoming times at which various subsets of the invitees are available. The application presents selectable items for each of these upcoming times, enabling the organizer to select the time as a new time for the appointment, or to view the appointment in her calendar at the upcoming time.

Figure 18:
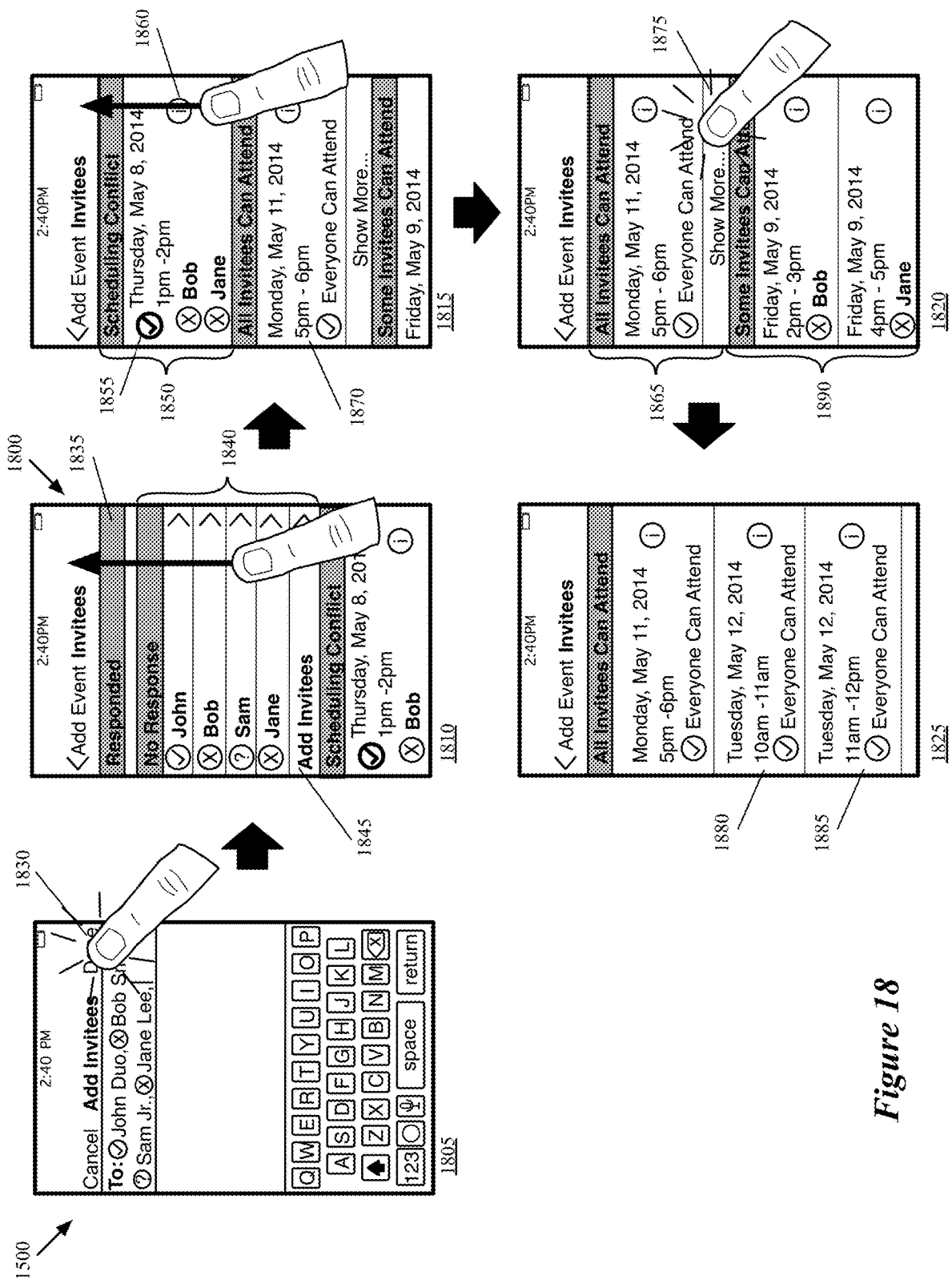
FIGS. 18 and 19 illustrate an invitee scheduling GUI of some embodiments for displaying scheduling conflicts and alternate times for a new appointment.
Figure 19:
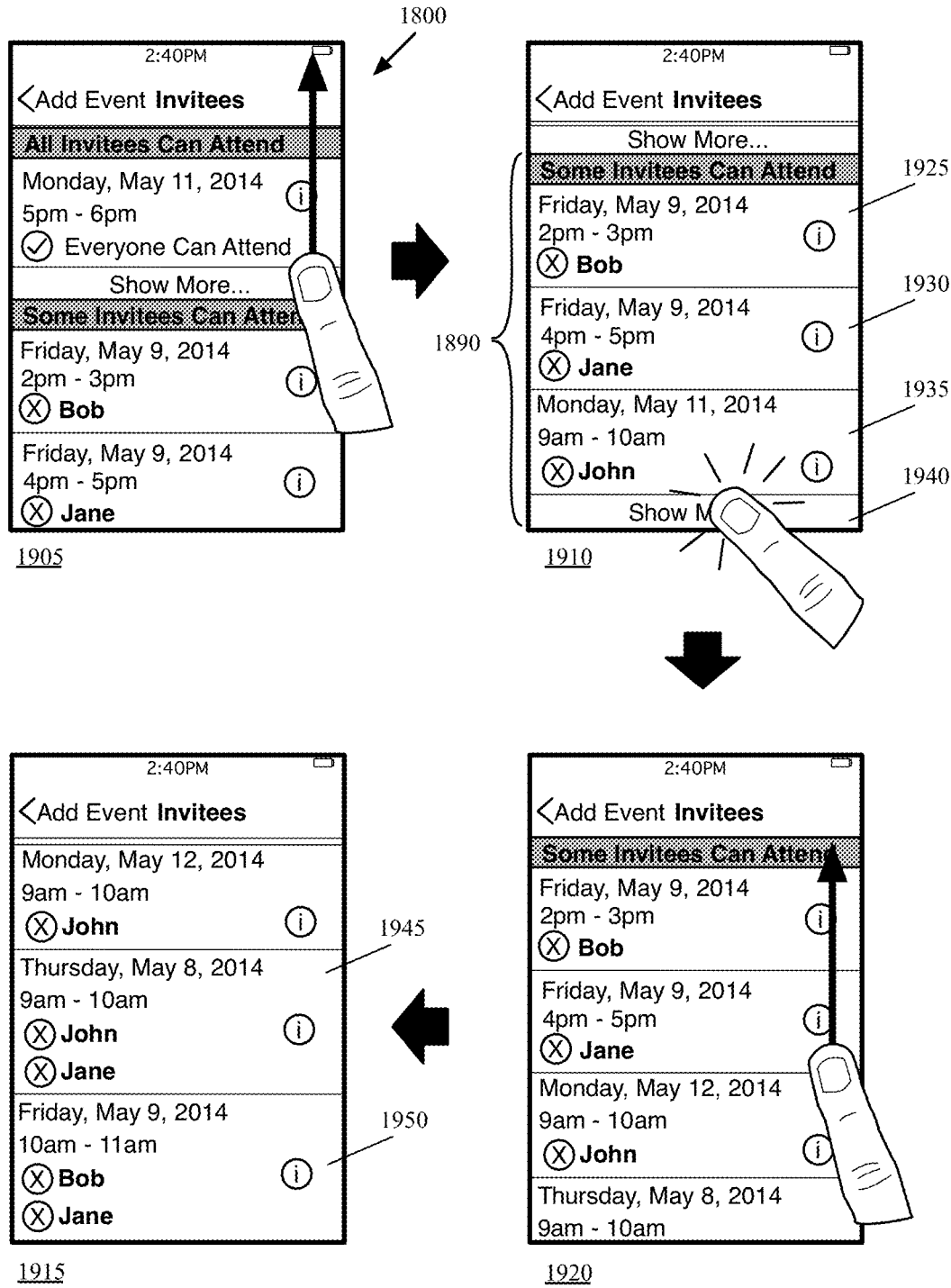

FIGS. 18 and 19 illustrate an invitee scheduling GUI 1800 of some embodiments for displaying scheduling conflicts and alternate times for a new appointment. FIG. 18 illustrates five stages 1805-1825, in which the user completes the addition of invitees to an appointment, navigates the scheduling GUI 1800, and requests additional times at which all invitees are available. FIG. 19 illustrates four stages 1905-1920 in which the user continues navigating the scheduling GUI 1800 and requests additional times at which subsets of the invitees are available.

The first stage 1805 of FIG. 18 illustrates the invitee addition GUI 1500 after the user has added four invitees for a new appointment. Of these invitees, John Duo is available at the scheduled time, Bob Smith and Jane Lee are unavailable at the scheduled time, and Sam Jr.'s schedule is inaccessible. The new appointment, though not shown at this stage, has an initial scheduled time of 1 PM to 2 PM on Thursday, May 8, 2014. At this stage, the user (the organizer of the appointment) selects an activities completed item 1830 to indicate that all of the invitees have been added for the appointment.

The calendar application, as a result, displays an invitee scheduling GUI 1800 of some embodiments in the second stage 1810. In some embodiments, the GUI 1800 first lists all of the invitees, divided into two sections 1835 and 1840 based on whether the invitee has responded to an invitation from the organizer. At this stage, as the calendar application has not yet sent an invitation, all four invitees are in the no response category. Next to the invitee names are graphical indicators, similar to those displayed in the previous invitee addition GUI 1500, to indicate the availability of the invitees based on their schedules. In some embodiments, when the invitees have responded, similar graphical indicators are used based on their responses (i.e., check marks for invitees that have accepted the invitation, question marks for invitees that have responded with a maybe response, and Xs for invitees that have declined the invitation. Each of the listed invitees is a selectable item, which when selected causes the application to display contact information for the invitee in some embodiments. In addition, below the no response section 1840 of the GUI is a row 1845 that enables the user to access the invitee addition GUI 1500 and add more invitees to the appointment.

The second and third stages 1810 and 1815 illustrate the user scrolling through the GUI 1800, and these two stages will be described in conjunction with the fourth stage 1820 to describe the GUI as a whole. In some embodiments, the font used within the GUI is smaller, and more of the GUI can fit on the display screen at once. Below the listed invitees is a scheduling conflict section 1850. The scheduling conflict section 1850 of some embodiments indicates the initial proposed appointment time (i.e., Thursday, May 8, 2014, from 1 PM to 2 PM in this example) and the users that cannot attend at that proposed time. This provides a succinct display to the organizer of the appointment as to which users are unavailable for the appointment at its currently scheduled time. Although shown one below the other, and with first names only, some embodiments display the full names of the invitees (e.g., "Bob Smith"), and display the invitees in two columns. One of ordinary skill will recognize that various different organizations of the invitees are possible within each section and subsection. Within the scheduling conflict section 1850 is a check mark indicator 1855, used to indicate that this is the currently selected time for the appointment. In some embodiments, this check mark indicator 1855 is displayed differently from the graphical indicators that indicate when an invitee is available for a proposed appointment time. In addition, the scheduling conflict section 1850 includes a selectable item 1860 for viewing the appointment in the organizer's calendar.

The GUI next includes a section 1865 for displaying selectable items representing times when all invitees can attend. In some embodiments, as shown, this section 1865 initially displays one selectable item 1870 for a time when all of the invitees can attend. Some embodiments use the earliest time starting from the current time, while other embodiments use the earliest time starting from the proposed time of the appointment. Yet other embodiments use the time closest to the proposed time of the appointment, irrespective of whether this time is before or after the proposed appointment. In addition, some embodiments only search for times during business hours (e.g., 9-6 Monday-Friday, or a different definition of business hours). Other embodiments do not mandate such restrictions, but rely on the invitees (or the organizer) to have marked off their respective calendars for availability only during certain hours. In this example, the application cannot access Sam's calendar. To handle such situations, some embodiments discount invitees whose calendar is inaccessible, and only search for times at which all of the other invitees (and the organizer) can attend.

In this example, the first time at which all invitees can attend that falls within the allowed times is Monday, May 11, 2014. The selectable item 1870 displays the date and time, as well as a check mark indicating that all invitees can attend and a selectable item for viewing the appointment in the organizer's calendar. Furthermore, the section 1865 includes a show more selectable item 1875, the selection of which causes the application to display additional proposed times at which all invitees can attend.

The fourth stage 1820 illustrates the selection of this item 1875, causing the calendar application display additional selectable items 1880 and 1885 for times at which all invitees are able to attend. Though not shown in the fifth stage 1825, some embodiments display selectable items for all of the time slots (of the same length as the initial proposed time) at which all invitees are able to attend for a pre-specified period of time (e.g., one week, two weeks, one month, etc.). The user can scroll through these selectable items in the GUI 1800, and choose one of the items in order to specify a new time.

As shown in the third and fourth stages 1815 and 1820, below the section 1865 is a section 1890 for displaying selectable items representing times at which different subsets of the invitees can attend. The GUI section 1890 will be described in greater detail by reference to FIG. 19, the first stage 1905 of which illustrates the GUI 1800 in the same state as in the fourth stage 1820 of FIG. 18. At this stage 1905, the user provides a gestural scrolling input to scroll the GUI upwards and view more of the section 1890 for selectable items representing times at which different subsets of the invitees can attend, shown in the second stage 1910.

In some embodiments, as shown, this section 1890 initially displays three selectable items 1925-1935 for different times when some of the invitees can attend the appointment. Other embodiments only display one selectable item initially, or display a different number (e.g., two, five, etc.) of selectable items for times at which subsets of invitees can attend.

Different embodiments sort these times differently. Some embodiments first propose appointment times with the fewest number of unavailable invitees. For appointment times with equal number of unavailable invitees (for example, all three selectable items 1925-1935 propose times with one unavailable invitee), some embodiments order based on the time (e.g., earliest starting from current time, earliest starting from the proposed time, closest to the proposed time, or a different time-based ordering). Other embodiments use a form of time-based ordering as an initial criteria, but avoid having the same invitee or combination of invitees unavailable for more than one of the initial proposed times (unless there are fewer invitees than the number of proposed times). Still other embodiments use different ordering for the proposed appointment times (e.g., a solely-time based ordering, without concern for the number of available invitees). In some embodiments, the application only proposes times at which the organizer (i.e., the user of the calendar application) is available. In addition, some embodiments only search for times during business hours (e.g., 9-6 Monday-Friday, or a different definition of business hours). Other embodiments do not mandate such restrictions, but rely on the invitees (or the organizer) to have marked off their respective calendars for availability only during certain hours. As with the proposed times at which all invitees can attend, some embodiments discount invitees whose calendar is inaccessible, and only search for times at which subsets of the other invitees (and the organizer) can attend.

In this example, the first three times displayed are 2 pm-3 pm and 4 pm-5 pm on Friday, May 9 (with Bob and Jane unavailable, respectively), and Monday, May 11, at 9 am (with John unavailable). Each of the selectable items 1925-1935 displays the proposed date and time, as well as the names of each unavailable invitee, along with a graphical indicator that denotes their unavailability, and a selectable item for viewing the appointment in the organizer's calendar. Furthermore, the section 1890 includes a show more selectable item 1940, the selection of which causes the application to display additional proposed times at which various subsets of invitees can attend.

The second stage 1910 illustrates the selection of this item 1940, causing the calendar application display additional selectable items for times at which all invitees are able to attend. The third stage 1915 illustrates the display of additional selectable items for proposed times at which different subsets of the users can attend. The third stage 1915 also illustrates the user scrolling to reveal additional proposed times, shown in the fourth stage 1920, a continuation of the section 1890 of the GUI 1800. Some embodiments display selectable items for all of the time slots (of the same length as the initial proposed time) at which different subsets of invitees are able to attend for a pre-specified period of time (e.g., one week, two weeks, one month, etc.). The user can scroll through these selectable items in the GUI 1800, and choose one of the items in order to specify a new time.

In this example, the additional selectable items with proposed times include a selectable item 1945 proposing a time from 9 am-10 am on May 8 (at which time both John and Jane are unavailable) and a selectable item 1950 proposing a time from 10 am-11 am on May 9 (at which time both Bob and Jane are unavailable). These times are closer to the initially proposed time of 1 pm-2 pm on May 8 than the proposed times at which only one invitee is unavailable, but are listed after them because more of the invitees are not available.

Figure 20:
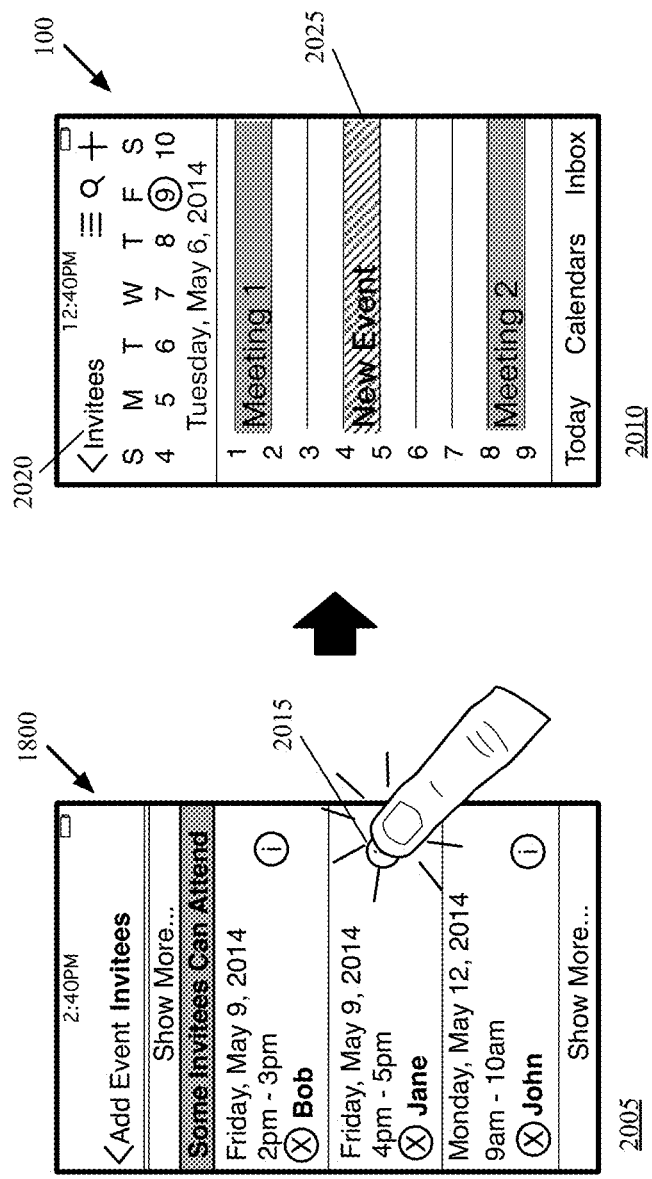
FIG. 20 illustrates the use of a selectable item for viewing a proposed alternate time in the user's calendar.

FIG. 20 illustrates the use of a selectable item for viewing a proposed alternate time in the user's calendar over two stages 2005-2010. In the first stage 2005, the invitee scheduling GUI 1800 in the same state as at the second stage 1910 of FIG. 19. Specifically, the stage 2005 illustrates three selectable items 1925-1935 for three different proposed alternate times for an appointment with a scheduling conflict. Each particular one of these selectable items 1925-1935 contains a selectable item to view the proposed time for the particular selectable item in the user's calendar. The first stage 2005 illustrates the user selecting the item 2015 for a proposed time of 4-5 pm on Friday, May 9.

Thus, the second stage 2010 illustrates the calendar layout GUI 100 of some embodiments, with the new appointment slotted into the user's calendar from 4 pm-5 pm. As shown, some embodiments present a representation 2025 of the new appointment with a different appearance (e.g., a different color, fill pattern, border, etc.) from the other appointment representations in the schedule. In this case, the user does not have any appointments abutting the proposed time for the new appointment. In some cases, the user might have meetings that either end at the start time of the new appointment or start at the end time of the new appointment. In such cases, the user is in the best position to determine whether the appointments have a good chance to run long, and therefore whether the proposed time is a good time for the new appointment. The calendar layout GUI 100, when accessed from the invitee scheduling GUI 1800, includes a return to previous GUI selectable item 2020, which when selected returns to the invitee scheduling GUI 1800. Other embodiments include an activities completed item (e.g., an item reading "Done"). In addition, some embodiments do not display the entire calendar layout GUI, but instead only display the calendar layout display area along with a selectable item for returning to the scheduling GUI 1800.

Figure 21:
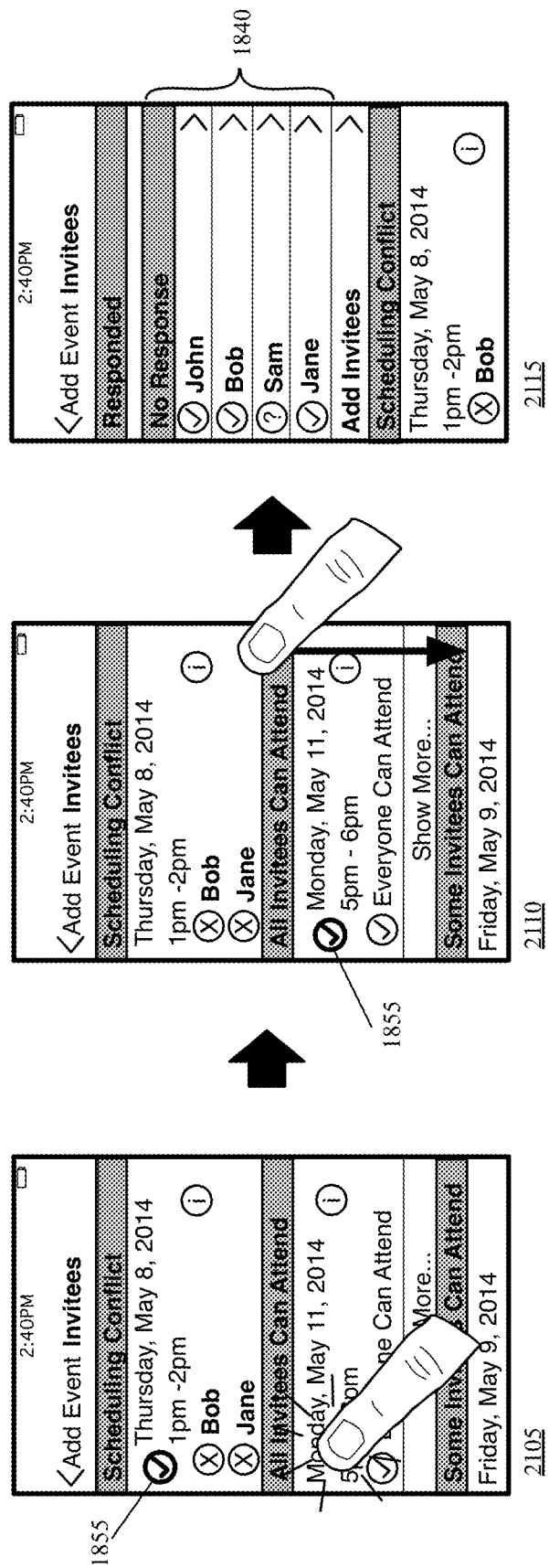
FIG. 21 illustrates the selection of an alternate proposed time, and the effect thereof on the invitee scheduling GUI.

FIG. 21 illustrates the selection of one of the alternate proposed times, and the effect thereof on the invitee scheduling GUI 1800, over three stages 2105-2115. The first stage 2105 illustrates the invitee scheduling GUI 1800 in the same state as the third stage 1815 of FIG. 18, with the scheduling conflict section 1850 and the section 1865 for proposed times at which all invitees can attend. As shown by the graphical indicator 1855, the originally proposed time of 1 pm-2 pm on May 8 is the currently selected time for the appointment. At this stage 2105, the user provides a tap input on the selectable item 1870 for the proposed appointment time of 5 pm-6 pm on May 11.

The resultant second stage 2110 illustrates that the check mark indicator 1855 is now displayed in the recently selected item 1870, to indicate that the currently selected time for the appointment is now 5 pm-6 pm on May 11. In addition, the user scrolls the GUI down to reveal, in the third stage 2115, the no response section 1840 after the item 1870 was selected. As shown at this third stage 2115, the calendar application of some embodiments updates the graphical indicators for the invitees in this section based on the newly selected time. As such, for the three invitees whose calendar is accessible (John, Bob, and Jane), the application displays a check mark indicator to indicate that the invitee is available at that time. Because Sam's calendar is not accessible, the application continues to display the question mark indicator for him.

Figure 22:
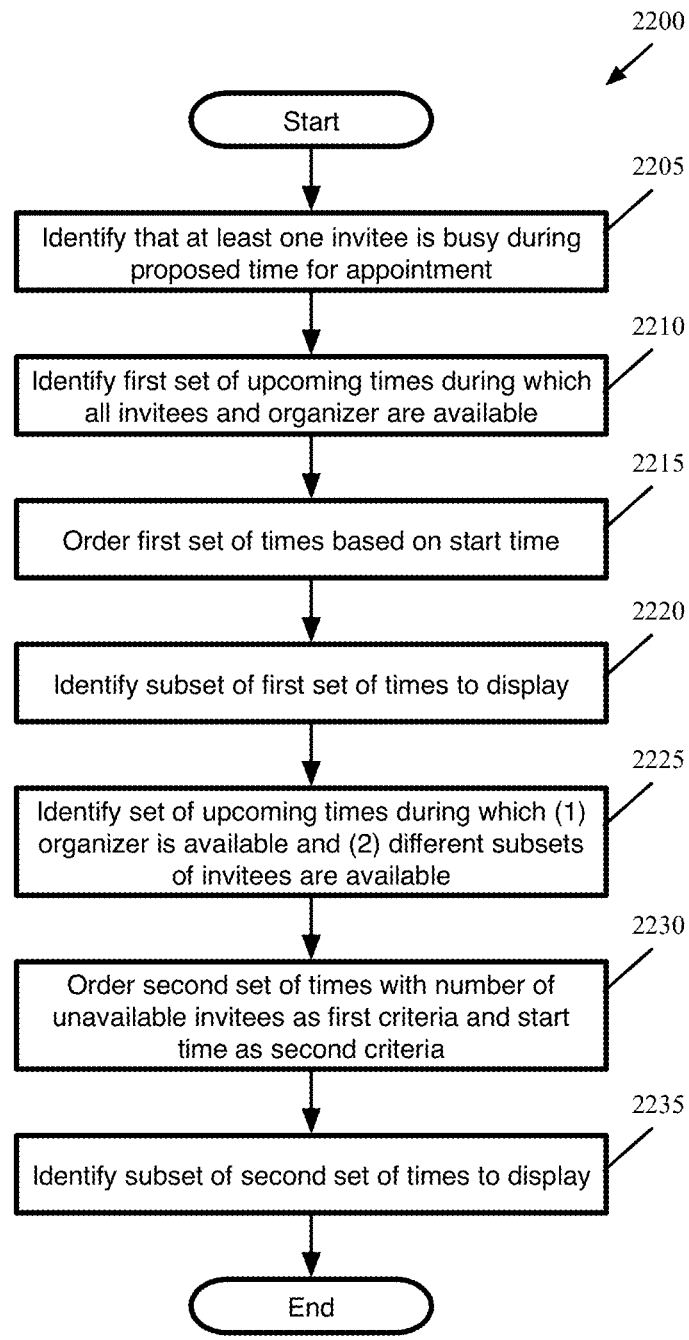
FIG. 22 conceptually illustrates a process of some embodiments for generating and preparing proposed times for display in the scheduling GUI.

FIG. 22 conceptually illustrates a process 2200 of some embodiments for generating and preparing proposed times for display in the scheduling GUI. In some embodiments, the calendar application performs the process 2200 upon receiving a list of invitees for a new appointment, during the appointment creation flow. The application performs the process 2200 to generate the scheduling GUI, although only a portion of the GUI may displayed on the display screen at a given time due to space constraints.

As shown, the process 2200 begins by identifying (at 2205) that at least one invitee is busy during a proposed time for a new appointment. In some embodiments, if all invitees for a new appointment either do not have accessible calendars or all have the proposed time for the new appointment open on their calendars, then the application does not perform the process 2200. In such embodiments, the application only displays the list of invitees with check mark and/or question mark indicators, and does not display the scheduling conflict section or the lists of proposed alternative appointment times.

However, if the calendar of at least one invitee indicates that the invitee is unavailable, then the application identifies (at 2210) a first set of upcoming times during which all invitees and the organizer are available. For example, some embodiments analyze the various invitees' calendars to identify all time slots, of the same length as the initial proposed time, within a particular time period during which all invitees and the organizer (i.e., the user of the calendar application) are available. Some embodiments begin the particular time period from the current time, while other embodiments begin the particular time period from the initial proposed time for the appointment. Still other embodiments use a time period both before and after the initial proposed time for the appointment (so long as the proposed alternate times are not prior to the current time). In any of these cases, various different embodiments may use different time periods (e.g., 1 week, 1 month, two days, etc.). In addition, some embodiments restrict the times for proposed appointments to working hours (e.g., 9-5, 9-6, 8-6, etc., M-F, depending on the definition of working hours). Other embodiments rely on the organizer and invitees to have marked their calendars with their available times in order to impose such restrictions.

The process then orders (at 2215) the first set of times based on their start time. Some embodiments order the first set of times from earliest to latest, while other embodiments order the first set of times based on proximity to the initial proposed time, whether before or after this initial proposed time. For example, if the initial proposed time is 1 pm-2 pm on Thursday, then an available 12 pm-1 pm time would come before a 3 pm-4 pm time, which would come before an available 10 am-11 am time.

Next, the process identifies (at 2220) a subset of the first set of times to display. For instance, some embodiments begin by only displaying one time at which all invitees are available. Other embodiments initially display more such times, and in some cases none of the times are displayed initially (if there are a large number of invitees such that the other portions of the GUI occupy the entire display initially). Furthermore, after the user has selected the "show more" GUI item, additional times from the first set of times will be displayed.

The process 2200 performs a similar set of operations for times at which subsets of the invitees are available. As shown, the process identifies (at 2225) a second set of upcoming times, at which both the organizer and at least one invitee are available. Some embodiments analyze the various invitees' calendars to identify all time slots, of the same length as the initial proposed time, within a particular time period during which the organizer (i.e., the user of the calendar application) and at least one invitee are available. Some embodiments begin the particular time period from the current time, while other embodiments begin the particular time period from the initial proposed time for the appointment. Still other embodiments use a time period both before and after the initial proposed time for the appointment (so long as the proposed alternate times are not prior to the current time). In any of these cases, various different embodiments may use different time periods (e.g., 1 week, 1 month, two days, etc.). In addition, some embodiments restrict the times for proposed appointments to working hours (e.g., 9-5, 9-6, 8-6, etc., M-F, depending on the definition of working hours). Other embodiments rely on the organizer and invitees to have marked their calendars with their available times in order to impose such restrictions.

The process then orders (at 2230) the second set of times using the number of unavailable invitees as a first criteria and the start time as the second criteria. Some embodiments first order the second set of times such that the alternate times with only one unavailable invitee are at the beginning of the order (assuming there is at least one such time), then the alternate times with two unavailable invitees, and so on. For proposed times with the same number of unavailable invitees, different embodiments may use the different orderings described above for the first set of alternate times (e.g., proximity to initial proposed time, earliest to latest starting at current time, earliest to latest starting at initial proposed time, etc.). In addition, some embodiments further refine the order so as to avoid repeating the same sets of unavailable invitees. For example, if there are four invitees, some embodiments ensure that the first four proposed alternate times include one time at which each of the invitees is unavailable. After this, some embodiments remove other times at which one invitee is unavailable, while other embodiments use the next set of times for each unavailable invitee.

Lastly, the process 2200 identifies (at 2235) a subset of the second set of times to display. For instance, some embodiments begin by displaying three times at which all invitees are available. Other embodiments initially display fewer or more times (e.g., depending on the number of invitees), and in some cases none of the times are displayed initially (if there are a large number of invitees such that the other portions of the GUI occupy the entire display initially). Furthermore, after the user has selected the "show more" GUI item, additional times from the second set of times will be displayed.

The process 2200 then ends. One of ordinary skill in the art will recognize that this is a conceptual process, and the operations may not necessarily be performed in the order shown. For instance, the calendar application might perform the operations 2225-2235 regarding the second set of times prior to the operations 2210-2220 regarding the first set of times, or perform the two sets of operations in parallel.

The above figures describe the actions of the calendar application of some embodiments for handling invitee availability when creating new appointments. After the appointment details are fully determined by the organizer, the application of some embodiments generates and sends a communication to each of the invitees informing of the meeting and enabling the invitees to provide a response to the invitation.

Figure 23:
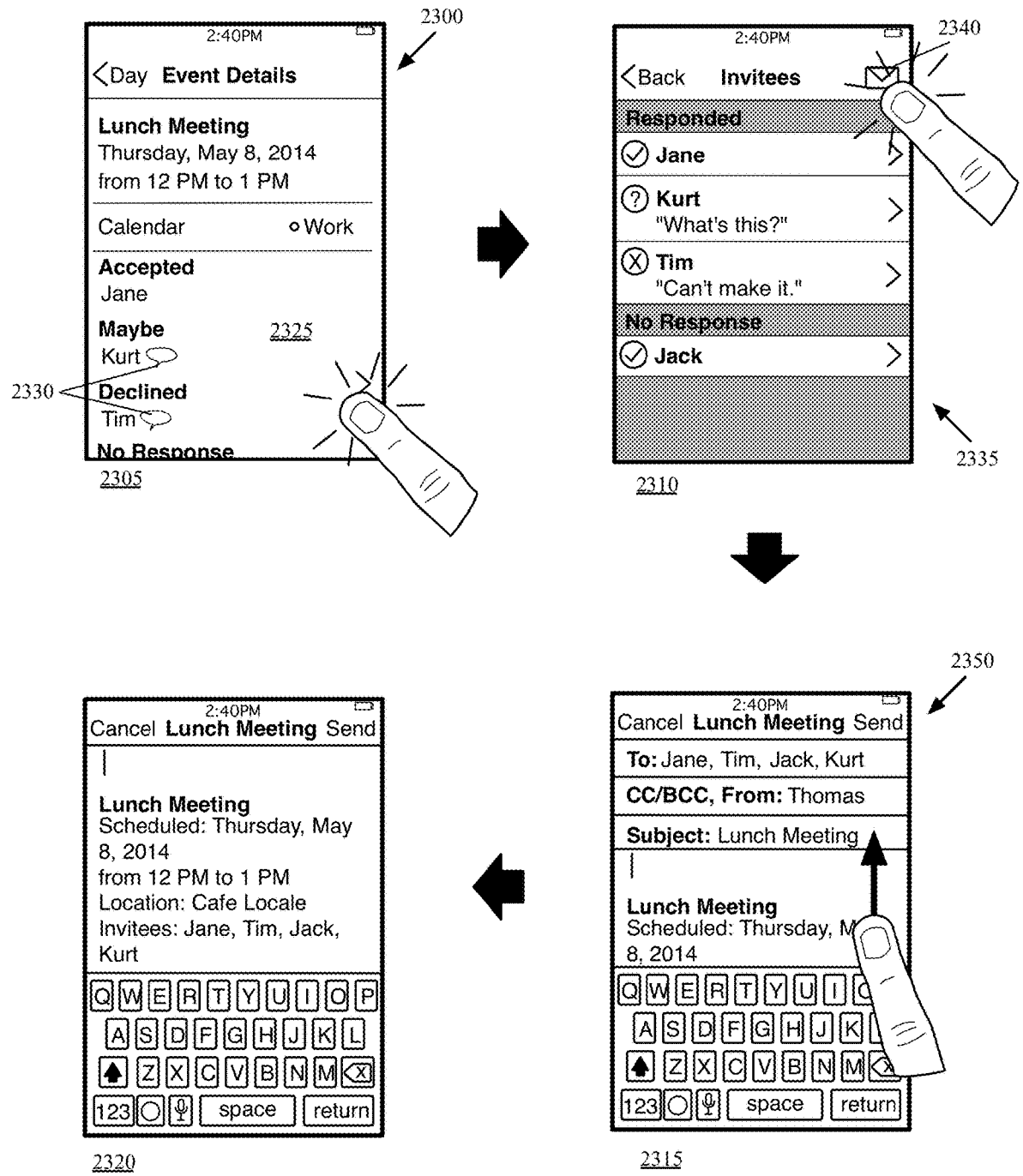
FIG. 23 illustrates an appointment organizer e-mailing all of the invitees of an appointment.

In addition, after the appointment has been created, the calendar application of some embodiments provides an easy way for the organizer to e-mail all invitees of the appointment. FIG. 23 illustrates an appointment organizer e-mailing all of the invitees over four stages 2305-2320 of the calendar application GUIs.

The first stage 2305 illustrates an appointment details GUI 2300 for an existing appointment. In some embodiments, the user accesses this appointment details GUI 2300 by selecting an appointment in the calendar layout, or in various other manners. The appointment details GUI, in some embodiments, first displays the appointment name and time information. In addition, the appointment details GUI includes an invitee section 2325. As shown, the invitee section 2325 of some embodiments divides the invitees into those who have accepted the appointment invitation, those who have responded that they are unsure of attending the appointment, those who have declined, and those who have not responded to the appointment. In addition, some embodiments display a comment indicator 2330 to indicate that a user has commented on an invitation. The appointment details GUI 2300 of some embodiments also displays additional information, such as the pertinent calendar for the appointment, any alerts or travel time information, etc. In the first stage 2305, the user selects the invitee section 2325.

As a result, in the second stage 2310 the calendar application displays an invitee GUI 2335. The invitee GUI 2335 is similar to the invitee scheduling GUI 1800, without the additional information regarding scheduling conflicts and proposed alternative times. Instead, the invitee GUI 2335 displays the invitees in two sections, a first group for invitees who have responded and a second group for invitees who have not yet responded. The first group includes three invitees in this case, with graphical indicators to indicate each invitees' response. Furthermore, each invitee that has commented on the appointment has their comment displayed below their name. At the top, the invitee GUI includes a selectable item 2340, which the user selects in the second stage 2310.

The selectable item 2340, shown in this example in the shape of an envelope associated with e-mail, causes the calendar application to generate an e-mail to send to all invitees. In some embodiments, the calendar application provides appointment and invitee data to an e-mail application operating on the same device, and the e-mail application prepares an e-mail for the user to send after entering any desired text. For instance, the user might want to inform the invitees to bring certain items to the appointment, or that the event will be starting slightly late, etc.

The third and fourth stages 2315 and 2320 illustrates the e-mail GUI 2350 that results from the user's selection of the item 2340. As shown, the e-mail subject (displayed in the subject line and the top of the GUI) is the name of the appointment for which the e-mail was generated. In addition, the to line of the e-mail is populated with the e-mail addresses of the invitees (showing the invitees' names when the information is known), and the cc/bcc/from line populated with the organizer's name (the user of the calendar application and e-mail application). The body of the e-mail includes one or more blank lines in some embodiments (e.g., four blank lines), then includes different appointment details in different embodiments. Specifically, in this case, the e-mail body is populated with the appointment name, date and time, location, and list of invitees. The user can then type in the desired message above the appointment details and select the send item in order to send the e-mail to the invitees. In addition, if the organizer wishes to omit one or more invitees from the e-mail, she can edit the to field of the e-mail.

V. Intelligent Suggestions for New Appointments

While the above section describes a calendar application feature for identifying scheduling conflicts and attempting to resolve those conflicts once a set of invitees and a time have been determined for a new appointment, the calendar application of some embodiments automatically proposes new appointments based on analysis of a user's past calendar history. Specifically, some embodiments identify patterns (e.g., recurring meetings) in the user's past calendar history, then propose appointments that continue such patterns. For example, if the user has had an appointment with the same name at the same time on the same day of the week for the past several weeks, then the application proposes an appointment with that name at the same time on the next occurrence of the particular day of the week. If the recurring time is occupied by a different appointment, then the application of some embodiments identifies a nearby time (e.g., just before or just after) and proposes the new appointment at the nearby time. If additional details (e.g., the location, invitee list, etc.) are the same or similar throughout the recurrences, the application uses these additional details for the proposed appointment. Similarly, the application might identify appointments held every other week, every day, on the same day of the month for several months, etc. The application might identify other patterns, such as the same set of invitees at numerous appointments (with numerous different times and appointment names), and propose a new appointment for the set of invitees at the next available time.

In addition, some embodiments allow the user to enter a text string describing an aspect of the appointment, and identify proposed appointments based on searching through the calendar history for matches on the text string. The text string might match the name of an appointment, a day on which the appointment was held, the name of an invitee or set of invitees for the appointment, etc. Once the user selects a proposed appointment in either case, the application adds this appointment to the calendar of the user, and the user can edit the details (e.g., change the time, invitees, location, etc.) before sending invitations to the appointment to the finalized list of invitees.

The following section initially describes some embodiments that automatically generate proposed appointments upon the selection of a new appointment creation option, by reference to FIGS. 24-28. Following this, the section next describes embodiments that generate proposed appointments upon receiving text input describing a desired new appointment, by reference to FIGS. 29-33.

Figure 24:
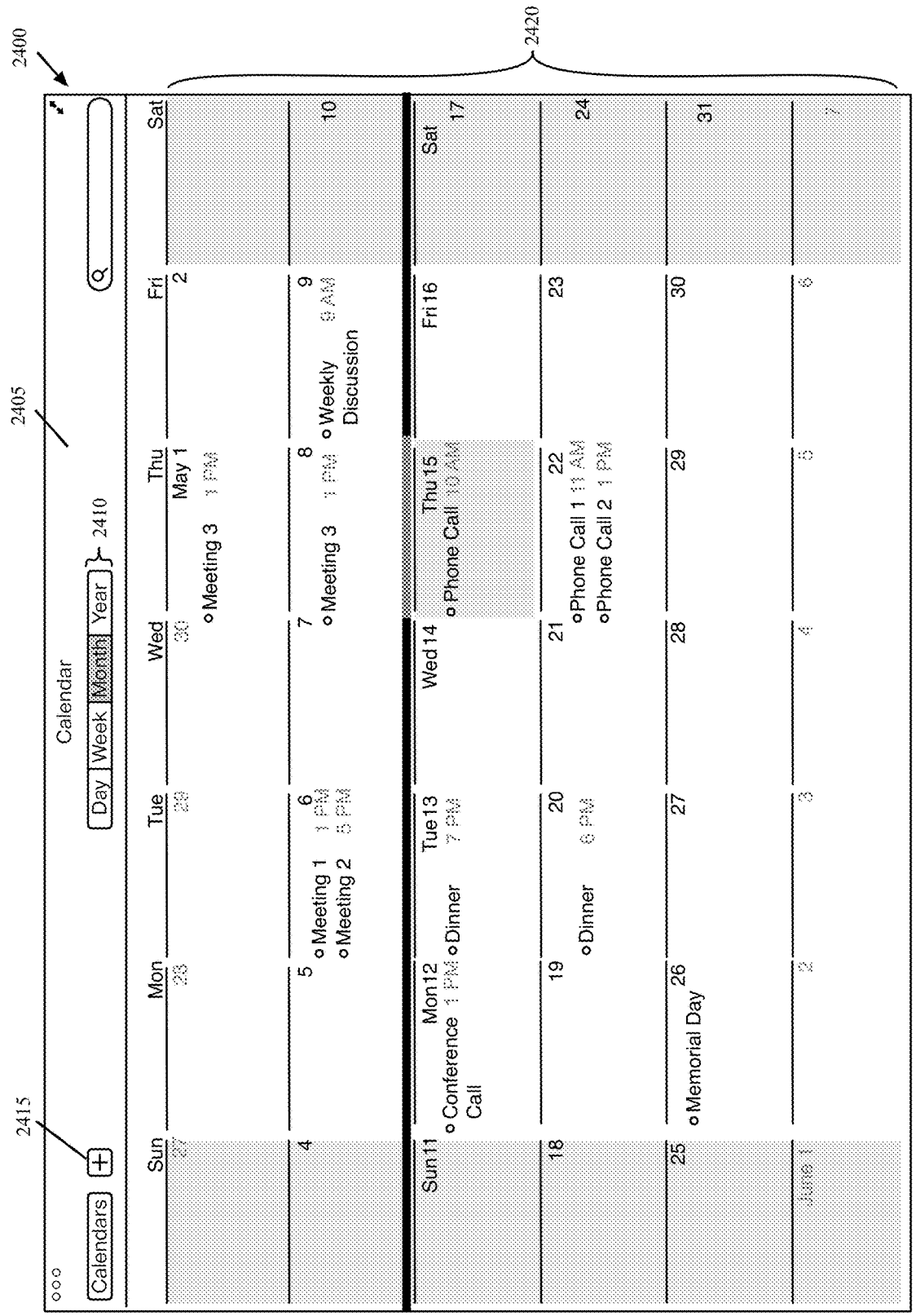
FIG. 24 illustrates a monthly view GUI of a user's schedule.
Figure 25:
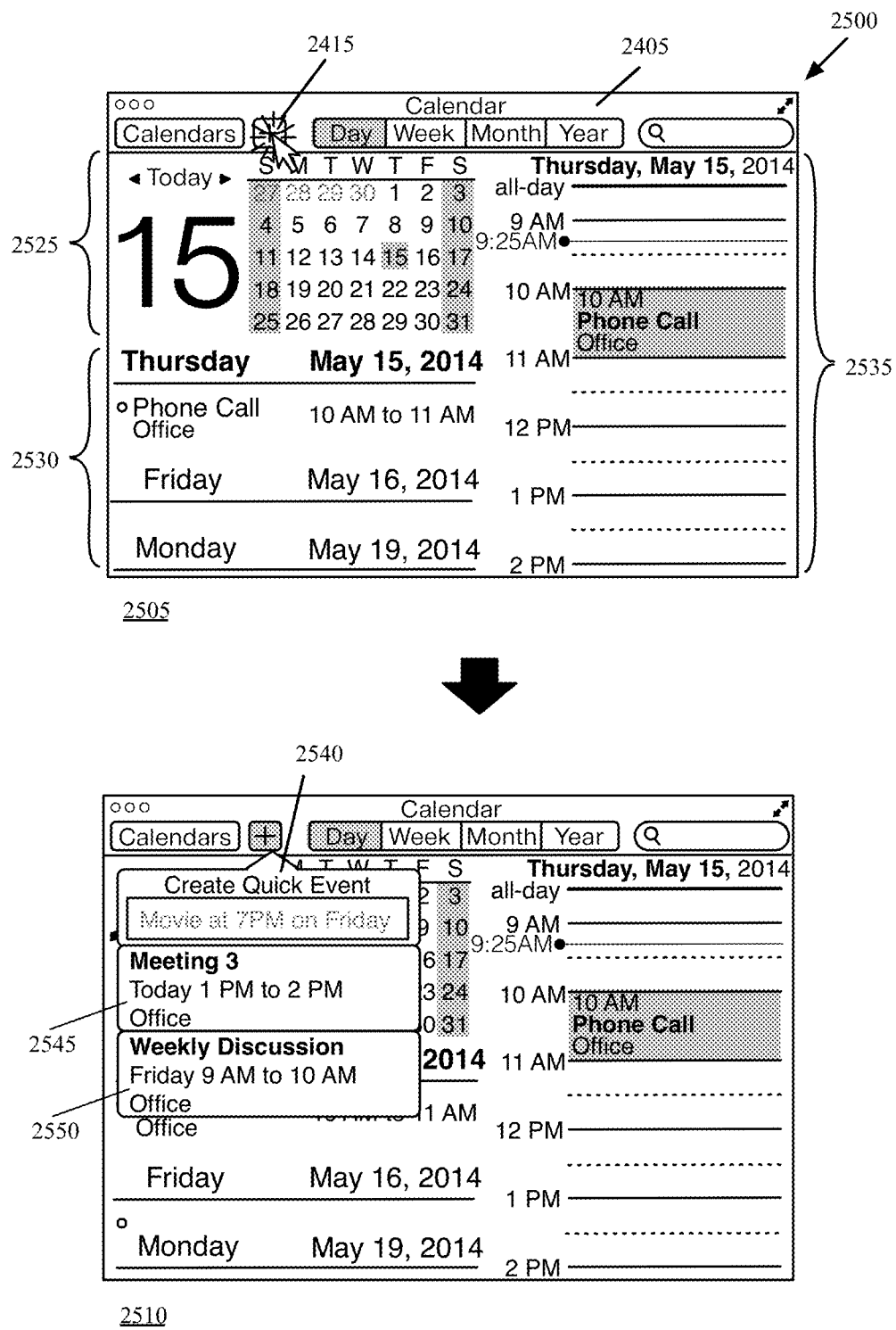
FIGS. 25 and 26 illustrate the generation of new appointment options in a daily view GUI of some embodiments.
Figure 26:
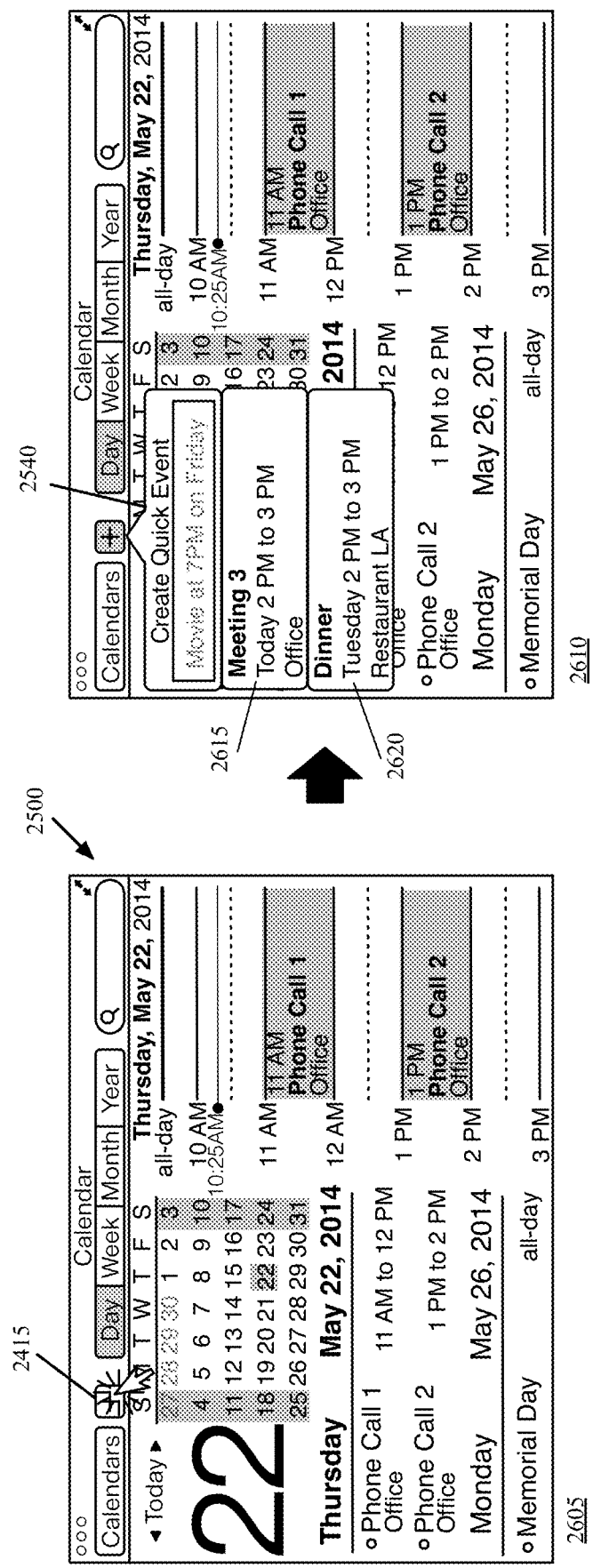

FIG. 24 illustrates a monthly view GUI 2400 of a user's schedule which will be used as a reference for the subsequent FIGS. 25-27. Specifically, the monthly view GUI 2400 includes a top bar 2405 that includes several tabs 2410 for different calendar views, a search bar, a calendar toggle item, and a new event creation item 2415. The tabs 2410 allow the user to switch between different views of the user's schedule, including the monthly view shown in this figure and the daily view shown in FIGS. 25-27, as well as a weekly view and a yearly view.

The new appointment creation item 2415, in some embodiments, causes the calendar application to display a dialog for creating a new appointment in the user's calendar. In some embodiments, the new appointment creation dialog provides a text field into which the user can enter a name of a new appointment. Upon receiving an additional input (e.g., pressing the "Enter" key or an equivalent input to indicate completion of the appointment description), the application creates a new appointment in the next available time slot (e.g., the next half hour time slot, next hour-long time slot, next hour-long time slot beginning on the hour, etc.). The user can also enter additional details into the text field (e.g., text clearly indicative of a time and/or date), and the calendar application will account for this information when creating the new appointment (e.g., if the text input includes "7 PM Friday" then the new appointment will be created at 7 pm on Friday rather than in the next available time slot). In some embodiments, in addition to this text field, the application generates proposed appointments based on analysis of the user's calendar history, as described by reference to the subsequent figures.

Below the top bar 2405 is the user's monthly calendar 2420. As shown, the user of the calendar application displayed in FIG. 24 has a variety of meetings in the past several weeks, including "Meeting 3" held both of the previous two Thursdays (the current date, May 15, is selected in the monthly schedule 2420). In addition, various phone calls and other appointments are scheduled.

FIG. 25 illustrates the generation of new appointment options in a daily view GUI 2500 of some embodiments. Specifically, FIG. 25 illustrates two stages 2505-2510 of the GUI 2500. The first stage 2505 illustrates the daily view GUI 2500 of some embodiments. The calendar layout GUI 2500 is the GUI for a calendar application that operates on a laptop or desktop computer, in some embodiments, although the GUI 2500 may also be displayed by a calendar application operating on a mobile device (e.g., a tablet computer, a smart phone, etc.).

The GUI 2500 includes the top bar 2405 that includes several tabs 2410 for different calendar views (with the daily tab now selected), the search bar, the calendar toggle item, and the new event creation item 2415. The GUI 2500 also includes a miniaturized month view 2525, an upcoming appointments view 2530, and a schedule view 2535. The miniaturized month view 2525 shows the current day in the calendar and can be used to select a day for the other two calendar views 2530 and 2535. The upcoming appointments view 2530 displays upcoming appointments for the user's schedule, starting with the day selected in the miniaturized month view 2525. The schedule view 2535 displays the user's schedule for the day selected in the miniaturized month view. In some embodiments, the schedule view 2535 shows the current time (and automatically begins at the current time), and is scrollable. The schedule view 2535 displays appointment representations for the scheduled appointments in the user's calendar. In the first stage 2505 of FIG. 25, the user selects the new event creation item 2415 (e.g., with a mouse click, a tap on a touchpad or touchscreen, or other selection mechanism).

The second stage 2505 illustrates the result of the selection of the new event creation item 2415. The calendar application automatically displays a fillable text field 2540 with background example text. The user may enter text input into this text field 2540 to name a new appointment. Upon receiving an additional input (e.g., pressing the "Enter" key or an equivalent input to indicate completion of the appointment description), the application creates a new appointment in the next available time slot (e.g., the next half hour time slot, next hour-long time slot, next hour-long time slot beginning on the hour, etc.). The user can also enter additional details into the text field (e.g., text clearly indicative of a time and/or date), and the calendar application will account for this information when creating the new appointment (e.g., if the text input includes "7 PM Friday" then the new appointment will be created at 7 pm on Friday rather than in the next available time slot).

In addition, below the fillable text field 2540, the application proposes one or more new appointments based on the past appointments in the user's calendar history. In some embodiments, the calendar application identifies patterns in the user's past calendar history, then proposes appointments that continue such patterns. For example, if the user has an appointment with the same name at the same time on the same day of the week for several weeks, then the application may propose an appointment with that name at the next occurrence of the particular day of the week. Similarly, the application might identify appointments held every other week, every day, every other day, on the same day of the month for several months, etc. If additional details (e.g., the location, invitee list, etc.) are the same or similar throughout the recurring appointments, the application uses these additional details in the proposed appointment.

Some embodiments also identify other recurring characteristics of appointments and propose new appointments with the recurring characteristics. For example, some embodiments identify common sets of invitees to appointments (which may not follow a regular pattern of naming or occurrence), and propose appointments at an arbitrary time (e.g., the next available time slot on the user's calendar) with the set of invitees. Once the user selects one of the proposed appointments, the application adds this appointment to the calendar of the user, and the user can edit the details (e.g., change the time or location, add or remove invitees, etc.) of the appointment.

In the example of FIG. 25, the application proposes two appointments based on the analysis of the user's calendar, and displays selectable items 2545 and 2550 for these. The first selectable item 2545 proposes an appointment titled "Meeting 3" for 1 PM on the current day (a Thursday), because the previous two Thursdays (and possibly additional prior Thursdays) have had a "Meeting 3" at 1 PM. The selectable item 2545 also indicates a location "Office", which could be the location of the previous two meetings with this title. Some embodiments provide additional details within the selectable items, such as the list of invitees for the proposed appointment, and/or other details regarding the appointment. If the previous iterations of "Meeting 3" include different sets of invitees or different locations, some embodiments generate separate selectable items for the different permutations. Other embodiments use an algorithm that determines, for each characteristic, which values to use. For instance, some such embodiments first identify, among the recurring appointment instance, which value of the characteristic appeared most often. If there is a tie for the most often occurrence of the value, then the application uses the value for the characteristic from the most recent occurrence of the recurring appointment. For instance, if "Meeting 3" had a first set of three invitees in the first week of May and a second set of four invitees in the second week of May, some embodiments use the second set of four invitees for the proposed appointment, while other embodiments propose two separate appointments with all of the details the same except for the set of invitees.

The second selectable item 2550 proposes an appointment titled "Weekly Discussion" for 9 AM the next day (Friday). Some embodiments use contextual clues in the appointment titles, and the user's calendar includes an appointment on the previous Friday with the same title. As this appointment indicates in its title that it is weekly in nature, the application proposes the appointment for the same time in the following week, at the same location and with the same additional characteristics.

The second example, FIG. 26, illustrates a similar action performed on the subsequent Thursday, May 22, over two stages 2605-2610. In the first stage 2605, the user again selects the new appointment creation item 2415, and the second stage 2610 again illustrates the resulting proposed appointments based on analysis of the user's calendar history. In this case, the user has held a "Meeting 3" on Thursday May 15 at 1 PM, but did not have another "Weekly Discussion" on Friday May 16.

The second stage 2610 illustrates that the application again displays the text field 2540, again with two selectable items 2615 and 2620 for two proposed appointments. The first selectable item 2615 proposes a new appointment on the current day for "Meeting 3", similar to that in the previous figure. However, in this case, the user already has an appointment "Phone Call 2" scheduled from 1 pm-2 pm, the time slot usually used for "Meeting 3". Thus, the application identifies the next available time slot, 2 pm-3 pm, and proposes the appointment during that time slot. Some embodiments identify the next available time slot after the time slot determined based on recurrence, while other embodiments also look for time slots prior to the time slot determined from the recurring appointments. For example, if the user of the calendar application also had an appointment from 2 pm-3 pm, some embodiments would propose an appointment from 12 pm-1 pm with the selectable item 2615.

In both of these examples, the application displays two selectable items for two proposed appointments. Some embodiments always display at least a minimum number of selectable items for proposed appointments (e.g., at least one, at least two, etc.). Some embodiments also have a maximum number of selectable items that may be displayed (e.g., five proposed appointments). When there is a maximum number, some embodiments assign scores to each proposed appointment (e.g., based on the number of past occurrences of the appointment, the extent of similarity between the appointment characteristics of the various occurrences, etc.), and display selectable items for the proposed appointments with the highest scores. When determining the order of the selectable items, some embodiments order the proposed appointments based on their start time (earliest to latest), while other embodiments order the proposed appointments from highest score to lowest score.

Figure 27A:
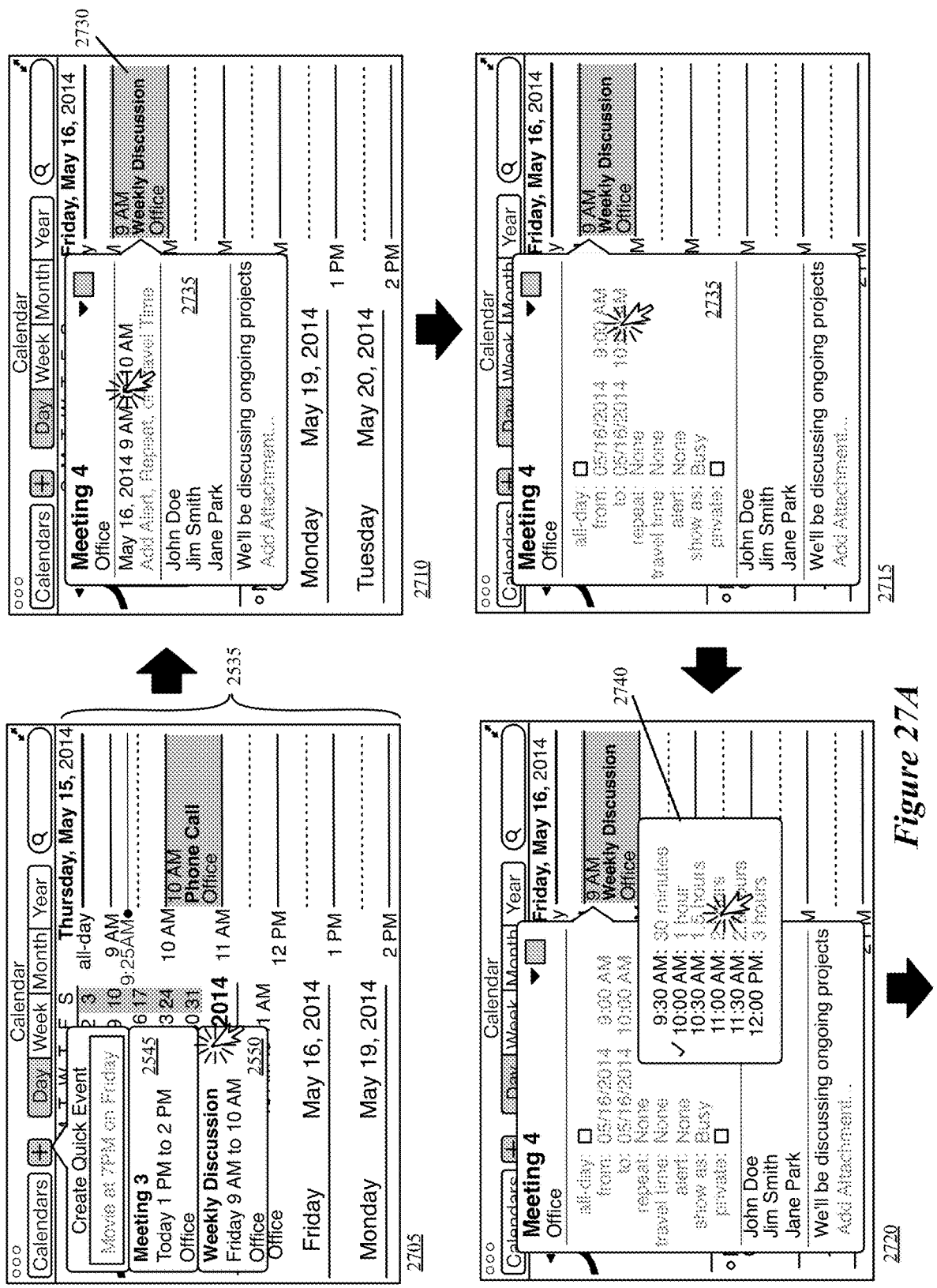
FIGS. 27A-B illustrate the selection of one of the proposed appointment options and the subsequent creation of a new appointment in the user's calendar.
Figure 27B:
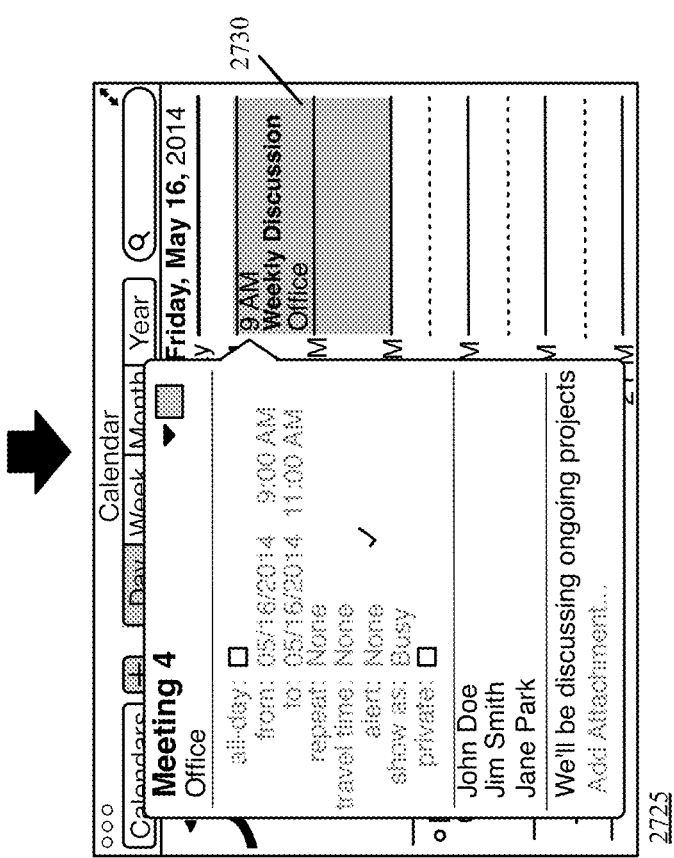

FIGS. 27A-B illustrate the selection of one of the proposed appointment options and the subsequent creation of a new appointment in the user's calendar over five stages 2705-2710. The first stage 2705 illustrates the GUI 2500 in the same state as the second stage 2510 of FIG. 25, with two selectable items 2545 and 2550 for two proposed appointments generated based on the user's calendar history. At this stage, the user selects (by placing a location indicator over the selectable item in the GUI and providing selection input, although other mechanisms for selection are possible) the second selectable item 2550 in order to create a new appointment with the characteristics specified by the appointment.

The second stage 2710 illustrates that the new appointment is created from 9 am-10 am on Friday, May 15. When the application creates the new appointment, some embodiments automatically select the calendar daily view to the day of the newly created appointment. Thus, as shown, the upcoming appointments view 2530 now starts with Friday, May 16, and the schedule view 2535 displays the schedule for May 16, which includes an appointment representation 2730 for the newly created appointment titled "Weekly Discussion". In addition, the application automatically displays an appointment details dialog 2735 that displays the characteristics of the appointment and allows the user to modify these characteristics. For this appointment, the application automatically generated a title, time, location, set of invitees (John Doe, Jim Smith, and Jane Park), and notes on the appointment ("We'll be discussing ongoing projects"). In this case, the automatically generated appointment does not include any alerts, travel time information, recurrence data, or attachments, though the user is able to add any of this information if desired. The user selects the appointment time information at this stage 2710.

The third stage 2715 illustrates that the application expands the appointment details dialog 2735 to include all of the time-related options, including start and end time, recurrence options, travel time, etc. The user selects the end time, and the resulting fourth stage 2720 displays various end time options 2740, allowing the user to choose a length and corresponding end time for the appointment. The user selects the "11:00 AM: 2 hours" option, and the fifth stage 2725 displays the result of this selection. The appointment is now 2 hours long, with the appointment representation 2730 modified accordingly.

Figure 28:
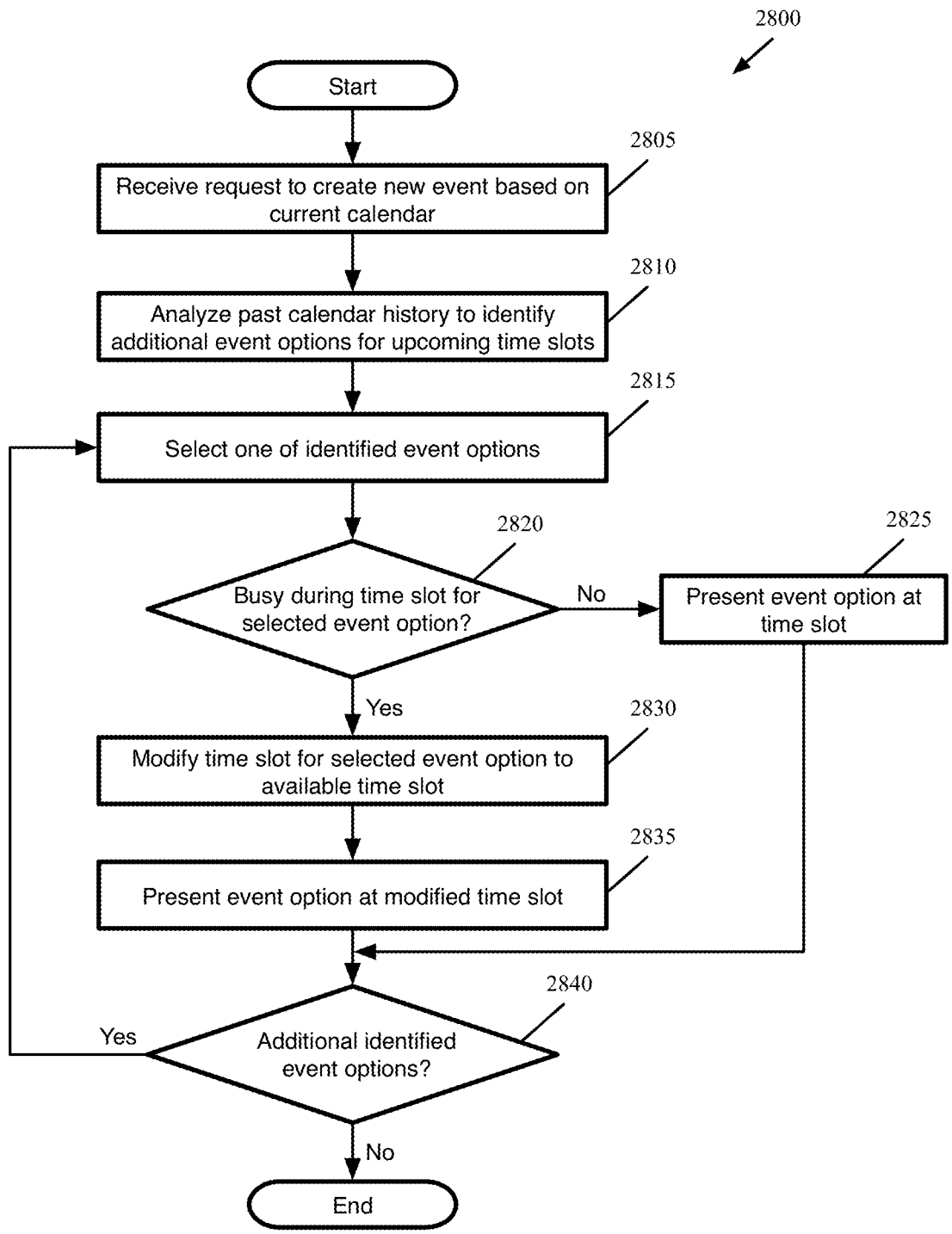
FIG. 28 conceptually illustrates a process of some embodiments for automatically generating proposed appointments upon receipt of an input to create a new appointment.

FIG. 28 conceptually illustrates a process 2800 of some embodiments for automatically generating proposed appointments upon receipt of an input to create a new appointment. In some embodiments, this process is performed by a calendar application operating on a desktop or laptop computer, a mobile device, etc., when the user selects a "new event" or "new appointment" option.

The process 2800 begins when the application receives (at 2805) a request to create a new appointment based on a user's current calendar. In some embodiments, the user selects a user interface feature for creation of a new appointment (e.g., the selectable GUI item 2415 shown as selected in FIGS. 25 and 26. In other embodiments, the user selects from a drop-down menu, or performs other interaction to create a new appointment.

Upon receiving the request, the process analyzes (at 2810) the user's past calendar history to identify appointment options for upcoming time slots. In some embodiments, the user of the calendar application may have multiple calendars (e.g., a work calendar, personal calendar, etc.). Some embodiments analyze all of the schedules together, whereas other embodiments only analyze a currently selected schedule. In some embodiments, analyzing the past calendar history to identify appointment options entails identifying patterns in the user's past calendar history, then identifying appointments that continue such patterns. For example, if the user has an appointment with the same name at the same time on the same day of the week for several weeks, then the application may identify a possible appointment with that name at the next occurrence of the particular day of the week. Similarly, the application might identify appointments held every other week, every day, every other day, on the same day of the month for several months, etc. If additional details (e.g., the location, invitee list, etc.) are the same or similar throughout the recurring appointments, the application uses these additional details in the proposed appointment.

Some embodiments also identify other recurring characteristics of appointments and propose new appointments with the recurring characteristics. For example, some embodiments identify common sets of invitees to appointments (which may not follow a regular pattern of naming or occurrence), and propose appointments at an arbitrary time (e.g., the next available time slot on the user's calendar) with the set of invitees.

If the previous iterations of a recurring appointment include different sets of invitees or different locations (or variations in other characteristics), some embodiments generate separate possible appointments for the different permutations. Other embodiments use an algorithm that determines, for each characteristic, which values to use for a single proposed appointment based on a recurring set of appointment instance. For instance, some such embodiments first identify, among the recurring appointment instance, which value of the characteristic appeared most often. If there is a tie for the most often occurrence of the value, then the application uses the value for the characteristic from the most recent occurrence of the recurring appointment. For instance, if an appointment held at the same time for each of the past several weeks had a first set of three invitees in one of the weeks a second set of invitees in a second one of the weeks, some embodiments use the most recent set of invitees for the proposed appointment, while other embodiments propose two separate appointments with all of the details the same except for the set of invitees.

In addition to identifying recurring appointments, some embodiments also identify contextual clues in, e.g., the appointment titles. For instance, if the previous week or month included an appointment titled "Weekly Discussion" or "Monthly Review", some embodiments identify this as a possible desired new appointment for the next week or month. Some embodiments also identify similar contextual clues in the appointment notes, or identify possible recurring appointments in other ways.

Some embodiments always identify at least a minimum number of selectable items for proposed appointments (e.g., at least one, at least two, etc.). Some embodiments also have a maximum number of proposed appointments that will be displayed to the user. When there is a maximum number, some embodiments assign scores to each proposed appointment (e.g., based on the number of past occurrences of the appointment, the extent of similarity between the appointment characteristics of the various occurrences, etc.), and display proposed appointments with the highest scores. When determining the order of the proposed appointments for display, some embodiments order the proposed appointments based on their start time (earliest to latest), while other embodiments order the proposed appointments from highest score to lowest score.

With the appointment options identified, the process 2800 performs a scheduling check to make sure that the application does not propose appointments that overlap with existing appointments in the user's calendar. Thus, the process selects (at 2815) one of the identified appointment options. The application may perform the subsequent operations on each of the proposed appointment options in random order, from earliest to latest, etc. One of ordinary skill in the art will also recognize that some embodiments may not perform the operations in a linear process, one appointment option at a time. Instead, some embodiments perform these operations in parallel for the various appointment options.

For the selected appointment option, the process determines (at 2820) whether the user is busy during the time slot assigned to that appointment option. For instance, if the calendar application identifies a recurring appointment on Fridays from 1 pm-2 pm, but the user has a different appointment scheduled at this time (or at other time slots that partially or wholly overlap with the identified time, such as 12:30 pm-1:30 pm, or 1:30 pm-2 pm), then the user would be busy during the identified time slot. Some embodiments examine both the calendar of the user that is selected and to which the appointment will be assigned if created, as well as any other calendars of the user. Other embodiments only examine the currently selected calendar for overlapping appointments.

When the time slot is available, the process 2800 presents (at 2825) the appointment option for the identified time slot. On the other hand, when the time slot is not available, the process modifies (at 2830) the time slot for the selected appointment option to an available time slot. The process then presents (at 2835) the appointment option for the modified time slot. In some embodiments, presenting an appointment options entails displaying a selectable item in the GUI of the calendar application, which the user can select in order to create a new appointment in her calendar with the identified characteristics. FIGS. 25-27 above illustrate examples of such proposed appointment options, though some embodiments provide additional details within the selectable items, such as the list of invitees for the proposed appointment and/or other details regarding the appointment.

When required to modify a time slot for an appointment due to the existence of a previously-scheduled appointment overlapping or partially overlapping the time slot identified based on recurrence, some embodiments identify the next available time slot after the time slot determined based on recurrence. Other embodiments also look for time slots prior to the time slot determined from the recurring appointments.

After presenting the option (although one of ordinary skill in the art will recognize that some embodiments actually present all of the options to the user at once as selectable items), the process 2800 determines (at 2840) whether additional appointment options were identified that have not been checked for scheduling. If additional appointment options remain, the process returns to 2815 to select another of the identified appointment options. Otherwise, the process 2800 ends.

The above description describes the automatic generation of proposed appointments by the calendar application based solely on analysis of the user's calendar history. In some embodiments, as the user enters text into the new appointment creation text field (e.g., the text field 2540 of FIG. 25), the application searches the user's past calendar history for appointments with characteristics that match the text string (e.g., searching titles, invitee names or e-mail addresses, locations, etc.). The application then proposes new appointments (similar to the proposed appointments discussed above) based on the identified matching past appointments. These possible new appointments are proposed on days and times based on the days and times of the matching past appointments.

Some embodiments of the calendar application propose appointments based solely on the calendar history in the manner described above by reference to FIGS. 25-28, while other embodiments require text input in order to propose appointments based on matching the text input to past calendar appointments. Yet other embodiments initially propose appointments in the manner described above, but then also search for matching appointments and propose appointments in the manner subsequently described by reference to FIGS. 30-33 once the user begins entering text input.

Figure 29:
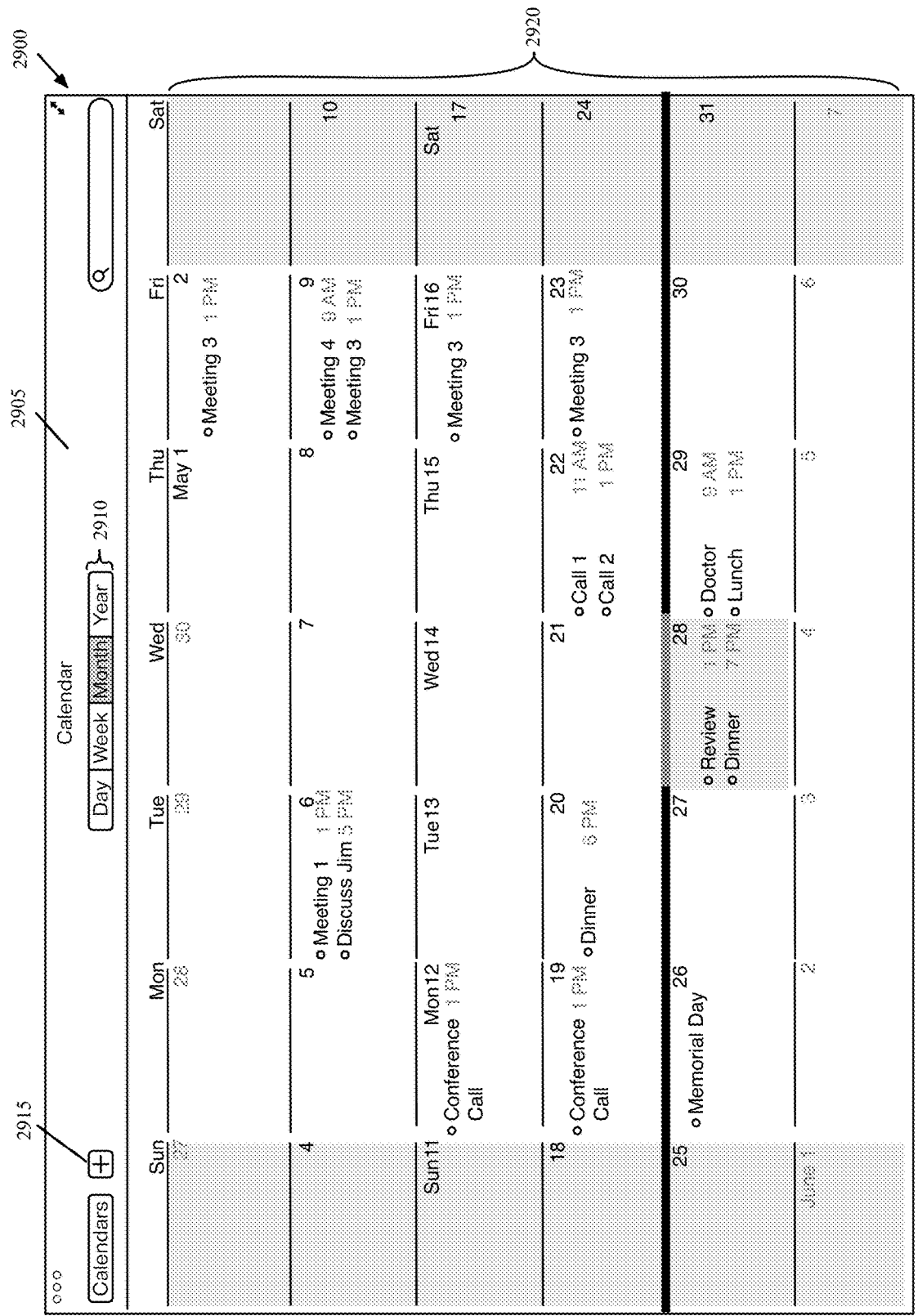
FIG. 29, like FIG. 24, illustrates a monthly view GUI of a user's schedule.

FIG. 29, like FIG. 24, illustrates a monthly view GUI 2900 of a user's schedule. The monthly view GUI 2900 will be used as a reference for the subsequent FIGS. 30-32. The display of the monthly view GUI 2900 is the same as that of the GUI 2400, with a top bar 2905 including several tabs 2910, a search bar, a calendar toggle item, and a new appointment creation item 2915. The tabs 2910, search bar, and calendar toggle item operate in the same manner as described above for FIG. 24.

The new appointment creation item 2915, in some embodiments, causes the calendar application to display a dialog for creating a new appointment in the user's calendar. In some embodiments, the new appointment creation dialog provides a text field into which the user can enter a name of a new appointment. In some embodiments, as with the new appointment creation item 2415 described above, upon receipt of additional input the application creates a new appointment in the next available time slot. The user can also enter additional details into the text field (e.g., text clearly indicative of a time and/or date), and the calendar application will account for this information when creating the new appointment.

In some embodiments, as the user enters text into the text field, the application searches through the user's calendar history for previous appointments that match the input text string, or come close to matching. For instance, as the user enters the text string, the application might identify appointment titles, invitee names, locations, etc. that match the text string. The user might also input text indicative of a day or time (e.g., "Tuesday"), causing the calendar application to identify appointments that match the input day/time. Based on the matching previous appointments, the calendar application generates proposed new appointments to present to the user, similar to the proposed appointments describe by reference to the above figures.

As in the GUI 2400, the monthly view GUI 2900 includes a monthly calendar 2920, with the current day (May 28) highlighted. The monthly calendar 2920 indicates that various appointments (dinners, meetings, etc.) were scheduled over the past month.

Figure 30:
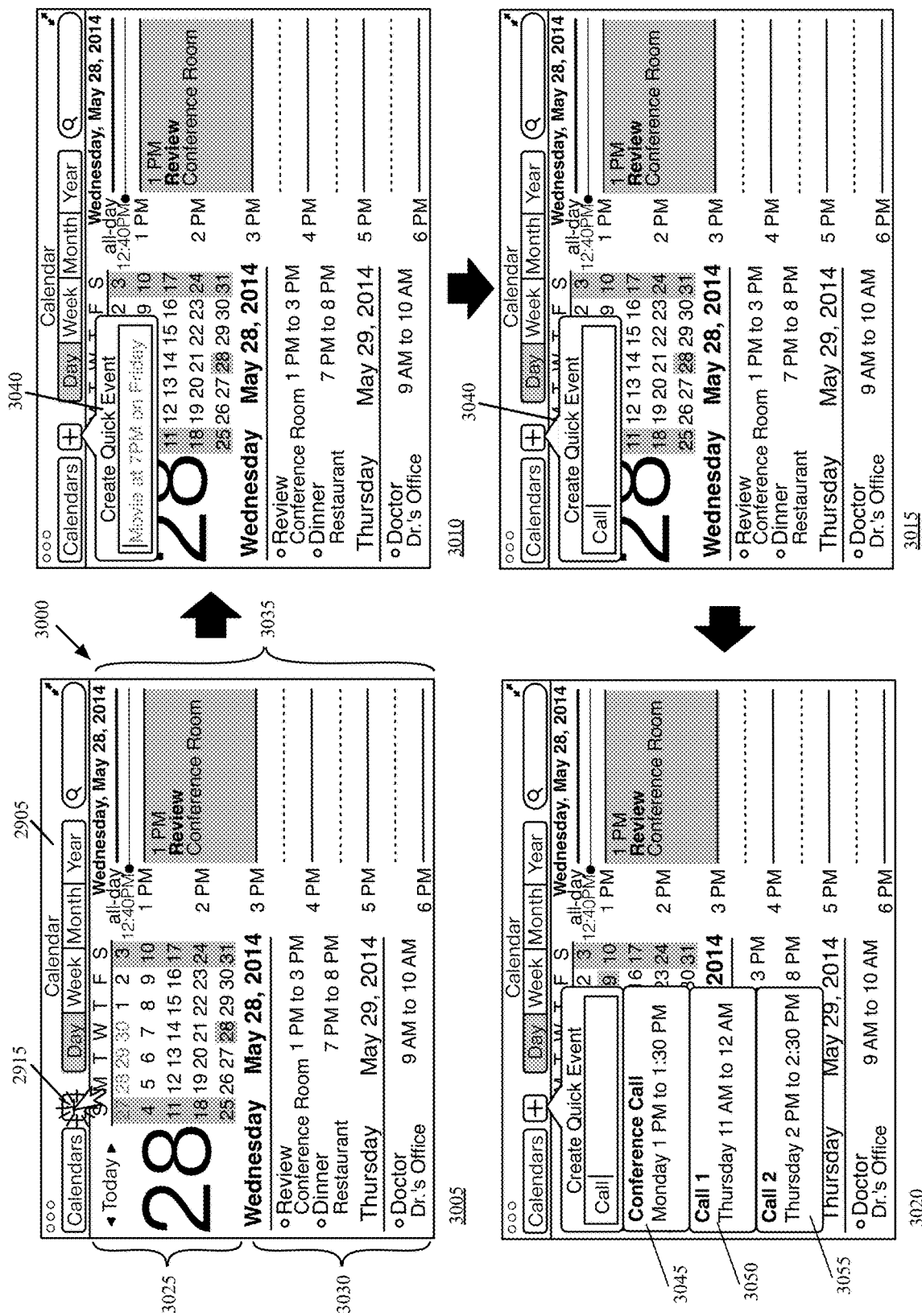
FIGS. 30 and 31 illustrate the generation of proposed new appointment options in a daily view GUI of some embodiments based on user text input.
Figure 31:
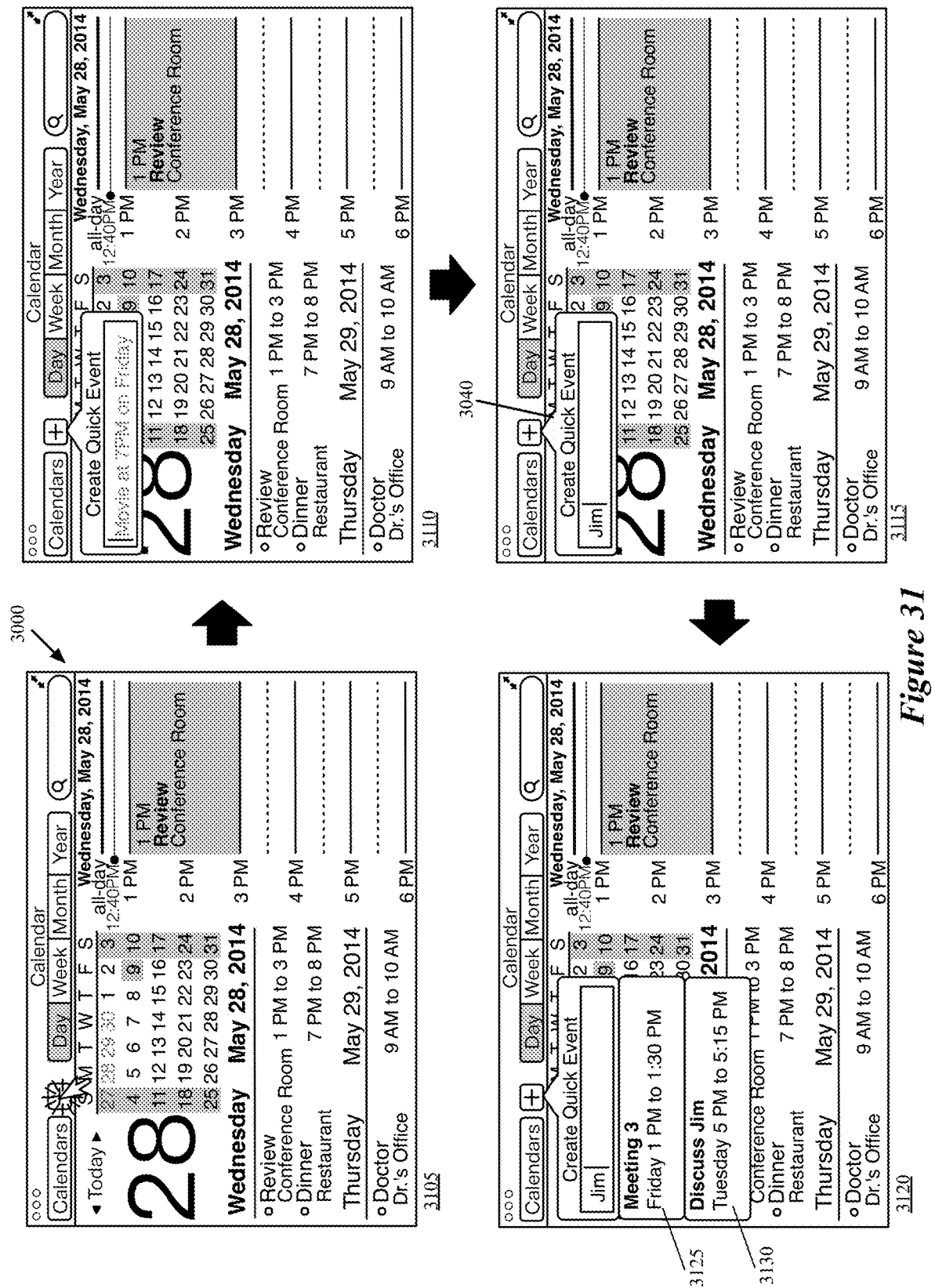

FIGS. 30 and 31 illustrate the generation of proposed new appointment options in a daily view GUI 3000 of some embodiments based on user text input. Specifically, FIG. 30 illustrates four stages 3005-3020 of the GUI 3000, in which the application receives selection of the new appointment creation item 2915 and subsequent text input, and then provides proposed new appointment creation items based on the text input.

The first stage 3005 illustrates the daily view GUI 3000 of some embodiments, which is similar to the daily view GUI 2500 described above. The GUI 3000 includes the top bar 2905, miniaturized month view 3025, an upcoming appointments view 3030, and a schedule view 3035. These GUI sections operate in similar fashion to those described above for the GUI 2500 in FIG. 25. The first stage 3005 illustrates that the user selects the new appointment creation item 2905.

The second stage 3010 illustrates that the application, as a result of the selection of the new appointment creation item 2915, displays a fillable text field 3040 with background example text, similar to the fillable text field 2540 described above. The user may enter text input into the text field 2540 in order to name a new appointment and/or specify other details about the new appointment. Unlike the example of FIG. 25, however, the calendar application does not display additional proposed appointment items at this time.

Instead, the third stage 3015 illustrates that the user has begun entering text into the fillable text field 3040 (e.g., using a keyboard, a touchscreen keyboard if the application operates on a touchscreen device, etc.). The user has entered the text "Call". At this stage, the user has just entered the text, and the application has not yet generated any proposed new appointments to display for the user.

The fourth stage 3020 illustrates the display of several selectable items 3045-3055 representing proposed new appointments based on the text input and the user's past calendar history. In some embodiments, the application provides such selectable items as soon as the user starts typing (e.g., as soon as the user had typed "C" the application would have been presenting possible new appointments based on the letter "C") and updates these with each keystroke. In other embodiments, as shown here, the application waits until the user has completed at least a portion of the input (e.g., until a space is received or the input pauses for a short amount of time).

In this example, the three selectable items 3045-3055 propose appointments based on matching the text string "Call" to the appointment title for the user's past appointments. The first selectable item 3045 is based on the twice-recurring event "Conference Call", which occurred on Monday, May 12 and Monday, May 19, at 1 pm, but did not occur on Monday, May 26 (possibly due to Memorial Day). Had a conference call been scheduled for Tuesday, May 27 at fpm, some embodiments would recognize this as a recurrence of the previous two appointments on account of the Monday holiday, rather than proposing a Tuesday call for the following week. The user also had phone calls scheduled on the previous Thursday at 11 am and 1 pm, and the application proposes new appointments based on these prior appointments with selectable items 3050 and 3055. The time slot from 11 am-12 am is open for the user, and therefore the selectable item 3050 proposes "Call 1" at the same time as the call from the previous week. However, the time slot from 1 pm-1:30 pm is already occupied on Thursday, May 29, so the selectable item 3055 instead proposes "Call 2" from 2 pm-2:30 pm.

While in this example all three of the selectable items 3045-3055 are for proposed appointments based on matches with previous appointment titles, some embodiments match on other appointment characteristics as well. For example, some embodiments match over the invitee names, location, notes, etc. fields that define an appointment. When a user enters a person's name, that name might turn up matches over both the invitee field (i.e., appointments to which that person is an invitee) as well as the title field (e.g., appointments for which the person's name appears in the title).

Once the application identifies the proposed appointments for which to display selectable items in the GUI, different embodiments order the selectable items differently. Some embodiments generate the proposed appointments at their specific times, then display the appointments in time order. Other embodiments score each proposed appointment based on a variety of factors, and order the selectable items based on these scores. For instance, as in the previous examples, more commonly occurring appointments might score higher (e.g., the "Conference Call" proposed appointment appearing before "Call 1" or "Call 2" in FIG. 30. Furthermore, some embodiments score the proposed appointments based on the strength of the match. Thus, matching multiple words in an appointment title scores higher than matching one word, matching multiple fields is more indicative of the user's desire than matching a single field, etc.

FIG. 31 illustrates a second example of the operation of the new appointment creation item 2915 over four stages 3105-3120 of the GUI 3000. The first two stages 3105 and 3110 are the same as the first two stages 3005-3010 of FIG. 30, and then in the third stage 3115 the user types "Jim" into the fillable text field 3040. The fourth stage 3120 illustrates the selectable items 3125 and 3130 displayed based on this text input. In this case, the user has had a "Meeting 3" appointment at 1 pm the last four Fridays, for which a person named Jim is an invitee. As such, the first selectable item 3125 is for another recurrence of this meeting. The second selectable item 3130 is for an appointment titled "Discuss Jim", proposed for 5 pm on the following Tuesday. The user's calendar, shown in FIG. 29, includes a past appointment with this title on an earlier Tuesday at 5 pm.

In this case, the selectable item for "Meeting 3" is listed as the first option because it has occurred on each of the past four Fridays. Although some embodiments prefer a match of the appointment title to a match of an invitee name, a proposed appointment based on a set of appointments that have occurred repeatedly each week may score higher than a proposed appointment based on a single appointment that occurred several weeks prior.

Figure 32:
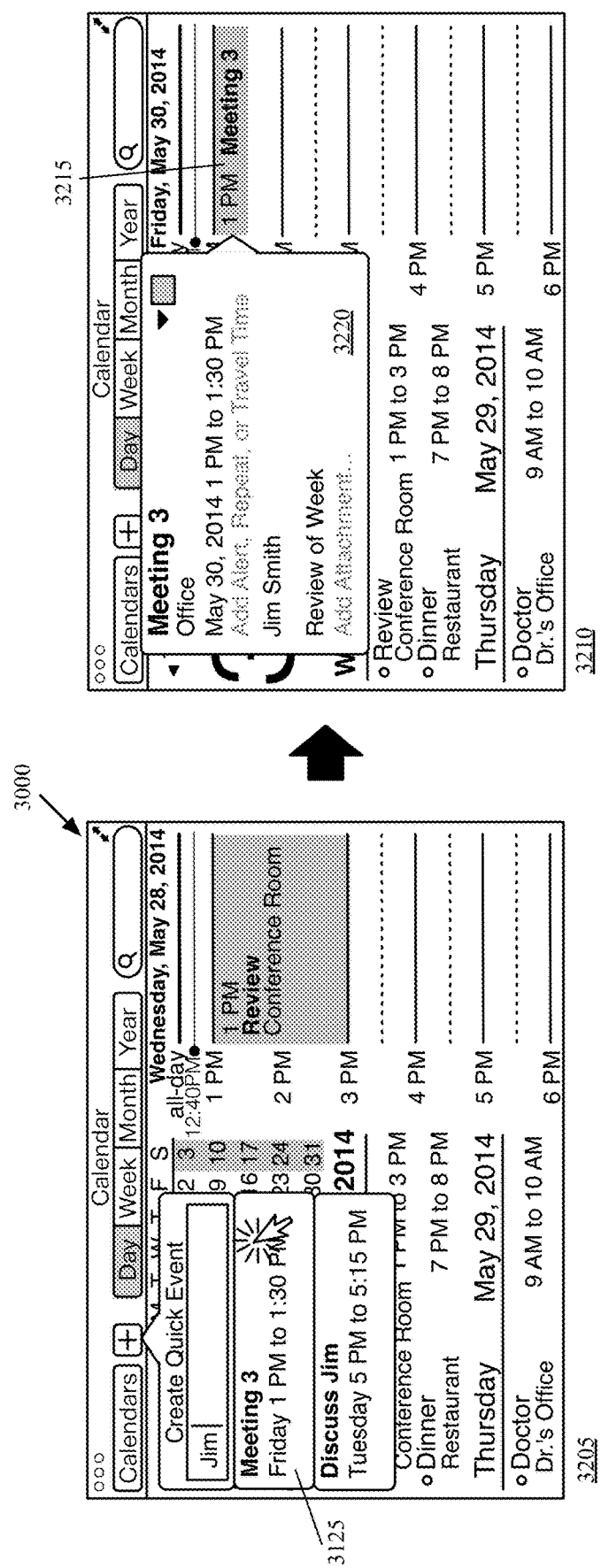
FIG. 32 illustrates the selection of one of the proposed appointment items and the resulting creation of a new appointment in the user's calendar.

FIG. 32 illustrates the selection of one of the proposed appointment items and the resulting creation of a new appointment in the user's calendar over two stages 3205-3210. The first stage 3205 illustrates the GUI 3000 in the same state as at the fourth stage 3120 of FIG. 31. At this stage, the user selects the first selectable item 3125 in order to create a new appointment with the characteristics specified by the appointment.

The second stage 3110 illustrates that the new appointment is created from 1 pm-1:30 pm on Friday, May 15. When the application creates the new appointment, some embodiments automatically select the calendar daily view to the day of the newly created appointment, as was shown in FIG. 27 above. The application generates and displays an appointment representation 3215 for the newly created appointment, and displays an appointment details dialog 3220 that displays the characteristics of the appointment and allows the user to modify these characteristics. For this appointment, the application automatically generated a title, time, location, invitee (Jim Smith), and notes ("Review of Week"). As illustrated here, the calendar generated and displayed the selectable item for the appointment on account of the invitee name "Jim Smith" matching the text string "Jim" input by the user. Though not shown in this figure, the user could subsequently modify the characteristics of the newly created appointment, as was shown in FIG. 27.

Figure 33:
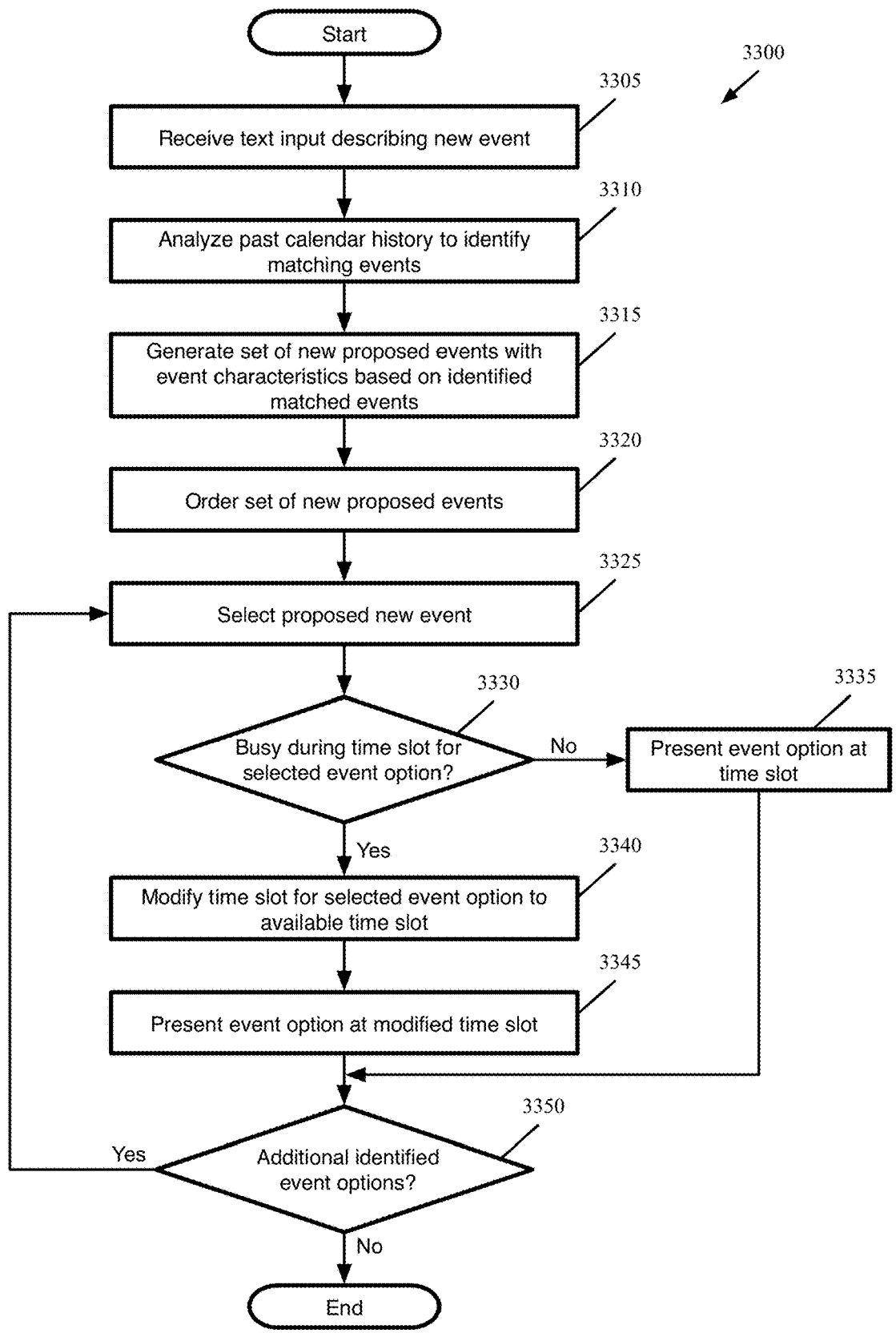
FIG. 33 conceptually illustrates a process of some embodiments for automatically generating proposed appointments based on matching text input to a user's past calendar appointment history.

FIG. 33 conceptually illustrates a process 3300 of some embodiments for automatically generating proposed appointments based on matching text input to a user's past calendar appointment history. In some embodiments, this process is performed by a calendar application operating on a desktop or laptop computer, a mobile device, etc., when the user selects a "new event" or "new appointment" option, then provides text input (e.g., by typing in a text string).

The process 3300 begins when the application receives (at 3305) text input describing a new event or appointment. In some embodiments, the user types this information into a fillable text field displayed by the calendar application after the application received a selection of a new appointment creation item, as shown in the first three stages of FIGS. 30 and 32. In other embodiments, the user enters text input into a different GUI construct, such as a permanent text field that does not require additional GUI interaction to access.

Upon receiving the text input, the process analyzes (at 3310) the user's past calendar history to identify events that match the received text input. In some embodiments, the user of the calendar application may have multiple calendars (e.g., a work calendar, personal calendar, etc.). Some embodiments analyze all of the schedules together, whereas other embodiments only analyze a currently selected schedule. In some embodiments, analyzing the user's past calendar history entails searching the names, invitee lists, locations, notes, attachment file names, etc. for text strings that match the input string. Some embodiments also identify near-matches (e.g., based on common typographical errors, such as matching an input of "Meting" with "Meeting". When multiple words are input, different embodiments use different interpretations of the text string to identify matches in the appointment history. Some embodiments interpret the input "a b" to require a match of the single string "a b", other embodiments require a match of "a" and a match of "b", while still other embodiments require a match of either "a" or "b". Yet other embodiments allow all of these, but prefer a full string match, then a match of both terms, then a match of one of the terms.

In analyzing the past calendar history, some embodiments do not analyze the user's entire previous schedule. Instead, different embodiments only analyze appointments a particular amount of time into the past. For example, some embodiments only analyze appointments from the prior month, prior three months, prior year, etc.

Next, the process 3300 generates (at 3315) a set of new proposed appointments with appointment characteristics based on identified matched appointments, and orders (at 3320) the set of new proposed appointments. Some embodiments have a maximum number of proposed appointments that will be displayed to the user, and thus only generate proposed appointments based on this maximum number of matched appointments. When there are more matching appointments than this maximum number, some embodiments assign scores to each matched past appointment or series of appointments and display proposed appointments with the highest scores. Some embodiments score the matches based on a combination of the characteristic matched (e.g., preferring title to other appointment characteristics), the type of match (e.g., entire string matched, all words matched, only one word matched), the recurring nature of the past appointment (e.g., a recurring appointment that matches will score higher), etc.

Once the set of matching appointments from which proposed appointments will be generated is identified, the calendar application generates the proposed appointments in a similar manner to that described above for FIG. 28. The calendar application of some embodiments identifies the next day and time occurrence that matches the day/time of the past appointment, then proposes an appointment at that identified day and time with the same characteristics as the matched past appointment (e.g., the same name, set of invitees, location, etc.). When the matched appointment is a recurring appointment with some of the characteristics varying between appointment instances (e.g., different sets of invitees or different locations), some embodiments use an algorithm to determine, for each characteristic, which values to use for the proposed appointment. For instance, some such embodiments first identify, among the recurring appointment instance, which value of the characteristic appeared most often. If there is a tie for the most often occurrence of the value, then the application uses the value for the characteristic from the most recent occurrence of the recurring appointment.

To order the set of proposed appointments (i.e., those that will be displayed to the user), some embodiments start with the earliest proposed time. Other embodiments use the scores calculated to determine which appointments to propose, with the highest score displayed first (e.g., at the top of a list of selectable items).

With the appointment options identified, the process 3300 performs a scheduling check to make sure that the application does not propose appointments that overlap with existing appointments in the user's calendar. Thus, the process selects (at 3325) one of the identified appointment options. The application may perform the subsequent operations on each of the proposed appointment options in random order, from earliest to latest, based on their respective matching scores, etc. One of ordinary skill in the art will also recognize that some embodiments may not perform the operations in a linear process, one appointment option at a time. Instead, some embodiments perform these operations in parallel for the various appointment options.

For the selected appointment option, the process determines (at 3330) whether the user is busy during the time slot assigned to that appointment option. For instance, if the calendar application identifies a matching appointment on previous Fridays from 1 pm-2 pm, but the user has a different appointment scheduled at this time (or at other time slots that partially or wholly overlap with the identified time, such as 12:30 pm-1:30 pm, or 1:30 pm-2 pm), then the user would be busy during the identified time slot. Some embodiments examine both the calendar of the user that is selected and to which the appointment will be assigned if created, as well as any other calendars of the user. Other embodiments only examine the currently selected calendar for overlapping appointments.

When the time slot is available, the process 3300 presents (at 3335) the appointment option for the identified time slot. On the other hand, when the time slot is not available, the process modifies (at 3340) the time slot for the selected appointment option to an available time slot. The process then presents (at 3345) the appointment option for the modified time slot. In some embodiments, presenting an appointment options entails displaying a selectable item in the GUI of the calendar application, which the user can select in order to create a new appointment in her calendar with the identified characteristics. FIGS. 30-32 above illustrate examples of such proposed selectable appointment options, though some embodiments provide additional details within the selectable items, such as the list of invitees for the proposed appointment and/or other details regarding the appointment.

When required to modify a time slot for an appointment due to the existence of a previously-scheduled appointment overlapping or partially overlapping the time slot identified based on recurrence, some embodiments identify the next available time slot after the time slot determined based on recurrence. Other embodiments also look for time slots prior to the time slot determined from the recurring appointments.

After presenting the option (although one of ordinary skill in the art will recognize that some embodiments actually present all of the options to the user at once as selectable items), the process 3300 determines (at 3350) whether additional appointment options were identified that have not been checked for scheduling. If additional appointment options remain, the process returns to 3325 to select another of the identified appointment options. Otherwise, the process 3300 ends.

As mentioned above, the processes 2800 and 3300 are not mutually exclusive. In some embodiments, the calendar application initially performs the process 2800 (or a similarly functional process) to generate proposed appointments upon the user's selection of a new appointment item in the calendar application GUI. If the user enters text rather than selecting one of the proposed appointments, then the application performs the process 3300 (or a similarly functional process) to generate proposed appointments that match the entered text.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 34:
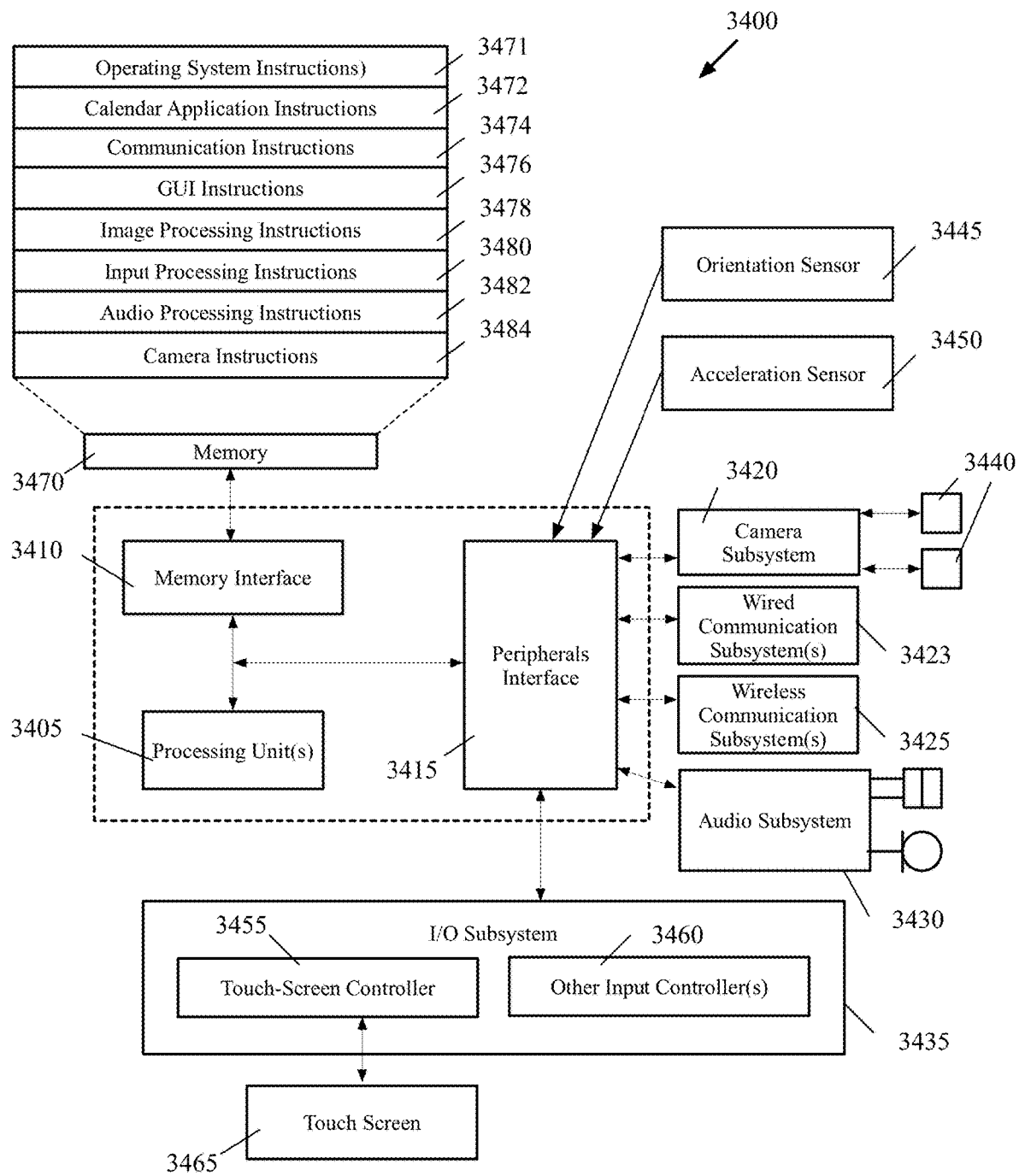
FIG. 34 is an example of an architecture of a mobile computing device of some embodiments.

The user data sharing of some embodiments occurs on mobile devices, such as smart phones (e.g., iPhones®) and tablets (e.g., iPads®). FIG. 34 is an example of an architecture 3400 of such a mobile computing device. As shown, the mobile computing device 3400 includes one or more processing units 3405, a memory interface 3410 and a peripherals interface 3415.

The peripherals interface 3415 is coupled to various sensors and subsystems, including a camera subsystem 3420, a wired communication subsystem(s) 3423, a wireless communication subsystem(s) 3425, an audio subsystem 3430, an I/O subsystem 3435, etc. The peripherals interface 3415 enables communication between the processing units 3405 and various peripherals. For example, an orientation sensor 3445 (e.g., a gyroscope) and an acceleration sensor 3450 (e.g., an accelerometer) is coupled to the peripherals interface 3415 to facilitate orientation and acceleration functions.

The camera subsystem 3420 is coupled to one or more optical sensors 3440 (e.g., a charged coupled device (CCD) optical sensor, a complementary metal-oxide-semiconductor (CMOS) optical sensor, etc.). The camera subsystem 3420 coupled with the optical sensors 3440 facilitates camera functions, such as image and/or video data capturing. The wired communication subsystem 3423 and wireless communication subsystem 3425 serve to facilitate communication functions.

In some embodiments, the wireless communication subsystem 3425 includes radio frequency receivers and transmitters, and optical receivers and transmitters (not shown in FIG. 34). These receivers and transmitters of some embodiments are implemented to operate over one or more communication networks such as a GSM network, a Wi-Fi network, a Bluetooth network, etc. The audio subsystem 3430 is coupled to a speaker to output audio (e.g., to output voice navigation instructions). Additionally, the audio subsystem 3430 is coupled to a microphone to facilitate voice-enabled functions in some embodiments.

The I/O subsystem 3435 involves the transfer between input/output peripheral devices, such as a display, a touch screen, etc., and the data bus of the processing units 3405 through the peripherals interface 3415. The I/O subsystem 3435 includes a touch-screen controller 3455 and other input controllers 3460 to facilitate the transfer between input/output peripheral devices and the data bus of the processing units 3405. As shown, the touch-screen controller 3455 is coupled to a touch screen 3465. The touch-screen controller 3455 detects contact and movement on the touch screen 3465 using any of multiple touch sensitivity technologies. The other input controllers 3460 are coupled to other input/control devices, such as one or more buttons. Some embodiments include a near-touch sensitive screen and a corresponding controller that can detect near-touch interactions instead of or in addition to touch interactions.

The memory interface 3410 is coupled to memory 3470. In some embodiments, the memory 3470 includes volatile memory (e.g., high-speed random access memory), non-volatile memory (e.g., flash memory), a combination of volatile and non-volatile memory, and/or any other type of memory. As illustrated in FIG. 34, the memory 3470 stores an operating system (OS) 3471. The OS 3471 includes instructions for handling basic system services and for performing hardware dependent tasks.

The memory 3470 additionally includes calendar application instructions 3472 in order for the device 3400 to execute the calendar application of some embodiments. The calendar application 3472 may include instructions to perform some or all of the various features described herein (e.g., processing touch interactions to resize the time scale of the calendar layout in the application GUI, handling time zone information for calendar appointments, processing a user's commenting on appointment invitations, scheduling appointments using the calendars of others, proposing appointments based on a user's calendar history, etc.).

The memory 3470 also includes communication instructions 3474 to facilitate communicating with one or more additional devices (e.g., for peer-to-peer data sharing, or to connect to a server through the Internet for cloud-based data sharing); graphical user interface instructions 3476 to facilitate graphic user interface processing; image processing instructions 3478 to facilitate image-related processing and functions; input processing instructions 3480 to facilitate input-related (e.g., touch input) processes and functions; audio processing instructions 3482 to facilitate audio-related processes and functions; and camera instructions 3484 to facilitate camera-related processes and functions. The instructions described above are merely exemplary and the memory 3470 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 34 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 34 may be split into two or more integrated circuits.

B. Computer System

Figure 35:
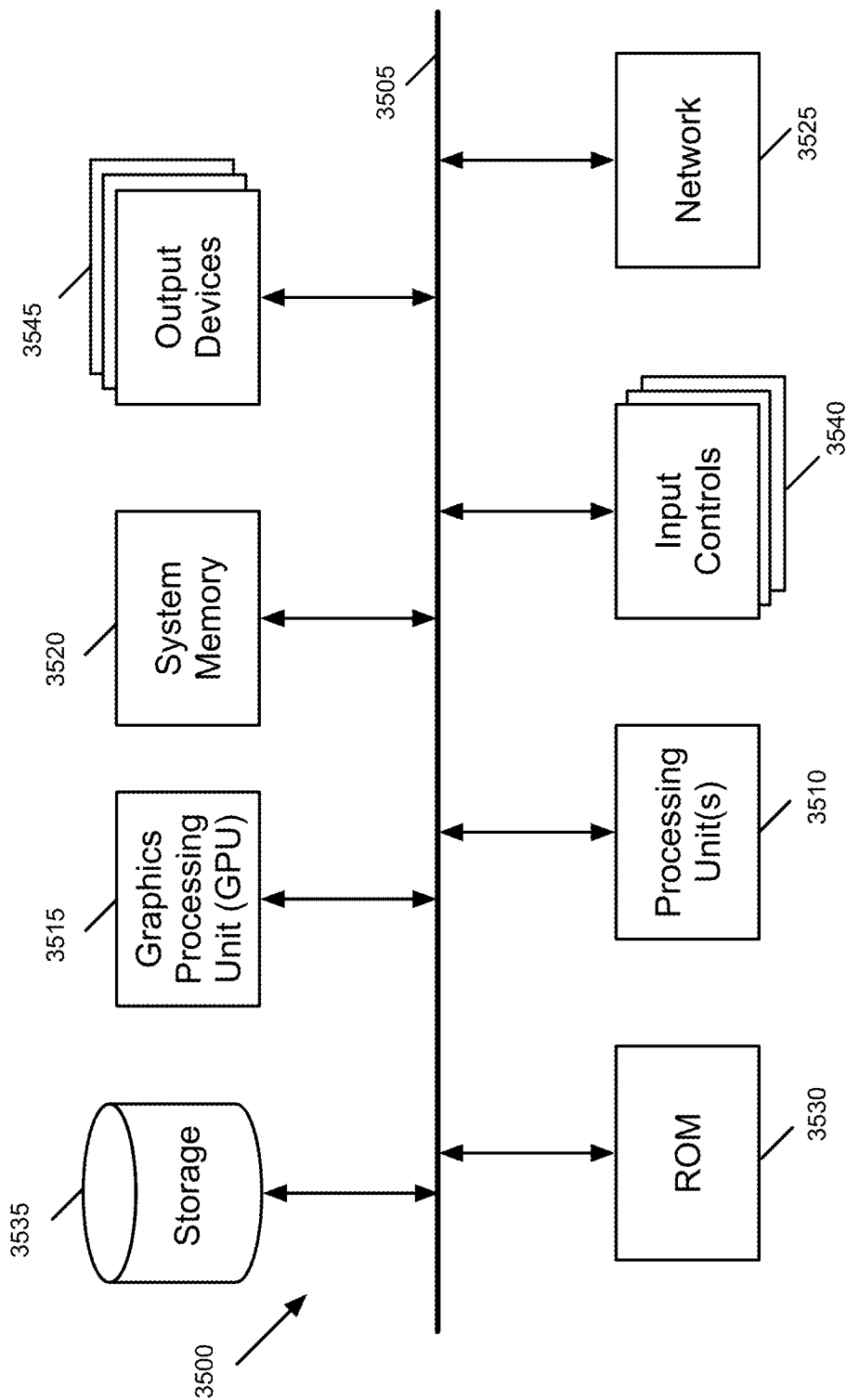
FIG. 35 conceptually illustrates an example of an electronic system with which some embodiments of the invention are implemented.

FIG. 35 conceptually illustrates another example of an electronic system 3500 with which some embodiments of the invention are implemented. The electronic system 3500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 3500 includes a bus 3505, processing unit(s) 3510, a graphics processing unit (GPU) 3515, a system memory 3520, a network 3525, a read-only memory 3530, a permanent storage device 3535, input devices 3540, and output devices 3545.

The bus 3505 collectively represents all system, peripheral, and chipset buses that communicatively connect the numerous internal devices of the electronic system 3500. For instance, the bus 3505 communicatively connects the processing unit(s) 3510 with the read-only memory 3530, the GPU 3515, the system memory 3520, and the permanent storage device 3535.

From these various memory units, the processing unit(s) 3510 retrieves instructions to execute and data to process in order to execute the processes of the invention. The processing unit(s) may be a single processor or a multi-core processor in different embodiments. Some instructions are passed to and executed by the GPU 3515. The GPU 3515 can offload various computations or complement the image processing provided by the processing unit(s) 3510. In some embodiments, such functionality can be provided using CoreImage's kernel shading language.

The read-only-memory (ROM) 3530 stores static data and instructions that are needed by the processing unit(s) 3510 and other modules of the electronic system. The permanent storage device 3535, on the other hand, is a read-and-write memory device. This device is a non-volatile memory unit that stores instructions and data even when the electronic system 3500 is off. Some embodiments of the invention use a mass-storage device (such as a magnetic or optical disk and its corresponding disk drive, integrated flash memory) as the permanent storage device 3535.

Other embodiments use a removable storage device (such as a floppy disk, flash memory device, etc., and its corresponding drive) as the permanent storage device. Like the permanent storage device 3535, the system memory 3520 is a read-and-write memory device. However, unlike storage device 3535, the system memory 3520 is a volatile read-and-write memory, such a random access memory. The system memory 3520 stores some of the instructions and data that the processor needs at runtime. In some embodiments, the invention's processes are stored in the system memory 3520, the permanent storage device 3535, and/or the read-only memory 3530. For example, the various memory units include instructions for processing multimedia clips in accordance with some embodiments. From these various memory units, the processing unit(s) 3510 retrieves instructions to execute and data to process in order to execute the processes of some embodiments.

The bus 3505 also connects to the input and output devices 3540 and 3545. The input devices 3540 enable the user to communicate information and select commands to the electronic system. The input devices 3540 include alphanumeric keyboards and pointing devices (also called "cursor control devices"), cameras (e.g., webcams), microphones or similar devices for receiving voice commands, etc. The output devices 3545 display images generated by the electronic system or otherwise output data. The output devices 3545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 35, bus 3505 also couples electronic system 3500 to a network 3525 through a network adapter (not shown). In this manner, the computer can be a part of a network of computers (such as a local area network ("LAN"), a wide area network ("WAN"), or an Intranet), or a network of networks, such as the Internet. Any or all components of electronic system 3500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4 and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for automatically generating an appointment for an electronic calendar, the method comprising:

displaying a text input field for creating a new appointment for a calendar;

receiving a first portion of a text input in the text input field to create a new appointment for the calendar, wherein the first portion of the text input includes at least a part of a first appointment characteristic;

displaying, in the text input field, the first portion of the text input;

while receiving the first portion of the text input, analyzing a plurality of previous appointments stored for the calendar to identify one or more appointments that include the first appointment characteristic, wherein the one or more appointments that include the first appointment characteristic include:

a first appointment on a first date that includes the first appointment characteristic, and a first new appointment characteristic that is different from the first appointment characteristic;

displaying, based on the identified one or more appointments that include the first appointment characteristic, a new appointment proposal;

receiving a second portion of the text input that is a continuation of the first portion of the text input in the text input field, wherein the second portion of the text input includes at least a part of a second appointment characteristic that is different from the first appointment characteristic;

displaying, in the text input field, the second portion of the text input;

while receiving the second portion of the text input, updating the analysis of the plurality of previous appointments stored for the calendar to identify updated one or more appointments that include the first appointment characteristic and the second appointment characteristic, wherein the one or more appointments that include the first appointment characteristic and the second appointment characteristic include:

a second appointment on a second date that includes the first appointment characteristic and the second appointment characteristic, and a second new appointment characteristic that is different from the first appointment characteristic and the second appointment characteristic; and displaying, based on the updated analysis, an updated new appointment proposal that is on a third date different from the second date, wherein:

the new appointment has at least one appointment characteristic other than the first appointment characteristic and the second appointment characteristic shared with the second appointment, and the at least one appointment characteristic other than the first appointment characteristic and the second appointment characteristic includes the second new appointment characteristic.

2. The method of claim 1, wherein the text input is to name the new appointment and create the new appointment at a next available time.

3. The method of claim 1, wherein the appointment characteristics comprise at least one of (i) a day of the week, a start time, and an end time, (ii) a set of associated documents, and (iii) a location for the appointment.

4. The method of claim 1, wherein the appointment characteristics comprise a set of invitees, the method further comprising:

receiving a user selection of the updated new appointment proposal; and in response to receiving the user selection of the updated new appointment proposal, sending invitations regarding the updated new appointment proposal to each of the invitees in the set of invitees.

5. The method of claim 1, wherein the updated new appointment proposal shares appointment characteristics with a set of previous appointments that occurred at a same day of the week and time of day.

6. The method of claim 5, wherein the updated new appointment proposal has a same location and set of invitees as the set of previous appointments, and occurs at a next instance of the same day of the week and time of day.

7. The method of claim 5, wherein the updated new appointment proposal has a same location and set of invitees as the set of previous appointments, and occurs at a closest available time to a next instance of the same day of the week and time of day.

8. The method of claim 1, wherein analyzing the plurality of previous appointments stored for the calendar comprises identifying regular occurrences in the previous appointments.

9. The method of claim 1, further comprising:

in addition to displaying the updated new appointment proposal on the third date that is different from the second date, displaying a second updated new appointment proposal on a fourth date different from the third date, wherein:

the second new appointment has at least one appointment characteristic other than the first appointment characteristic and the second appointment characteristic shared with the second appointment, and the at least one appointment characteristic other than the first appointment characteristic and the second appointment characteristic includes the second new appointment characteristic;

receiving a user selection of the updated new appointment proposal or the updated second new appointment proposal; and creating an appointment in the calendar for the selected appointment.

10. The method of claim 9, wherein:

the selected appointment is proposed for a particular date and time, at a particular location, for a particular set of invitees, and the particular date and time, particular location, and particular set of invitees are editable prior to sending invitations of the appointment to the particular set of invitees.

11. The method of claim 1, wherein displaying the updated new appointment proposal comprises using at least one of the identified updated one or more appointments as a template for the updated new appointment proposal.

12. A non-transitory machine readable medium storing a program which when executed by at least one processing unit automatically generates an appointment for an electronic calendar, the program comprising sets of instructions for:

displaying a text input field for creating a new appointment for a calendar;

receiving a first portion of a text input in the text input field to create a new appointment for the calendar, wherein the first portion of the text input includes at least a part of a first appointment characteristic;

displaying, in the text input field, the first portion of the text input;

while receiving the first portion of the text input, analyzing a plurality of previous appointments stored for the calendar to identify one or more appointments that include the first appointment characteristic, wherein the one or more appointments that include the first appointment characteristic include:

a first appointment on a first date that includes the first appointment characteristic, and a first new appointment characteristic that is different from the first appointment characteristic;

displaying, based on the identified one or more appointments that include the first appointment characteristic, a new appointment proposal;

receiving a second portion of the text input that is a continuation of the first portion of the text input in the text input field, wherein the second portion of the text input includes at least a part of a second appointment characteristic that is different from the first appointment characteristic;

displaying, in the text input field, the second portion of the text input;

while receiving the second portion of the text input, updating the analysis of the plurality of previous appointments stored for the calendar to identify updated one or more appointments that include the first appointment characteristic and the second appointment characteristic, wherein the one or more appointments that include the first appointment characteristic and the second appointment characteristic include:

a second appointment on a second date that includes the first appointment characteristic and the second appointment characteristic, and a second new appointment characteristic that is different from the first appointment characteristic and the second appointment characteristic; and displaying, based on the updated analysis, an updated new appointment proposal that is on a third date different from the second date, wherein:

the new appointment has at least one appointment characteristic other than the first appointment characteristic and the second appointment characteristic shared with the second appointment, and the at least one appointment characteristic other than the first appointment characteristic and the second appointment characteristic includes the second new appointment characteristic.

13. The non-transitory machine readable medium of claim 12, wherein the text input is to name the new appointment and create the new appointment at a next available time.

14. The non-transitory machine readable medium of claim 12, wherein the appointment characteristics comprise a set of invitees, the program further comprising sets of instructions for:

receiving a user selection of the updated new appointment proposal; and in response to receiving the user selection of the updated new appointment proposal, sending invitations regarding the updated new appointment proposal to each of the invitees in the set of invitees.

15. The non-transitory machine readable medium of claim 12, wherein:

the updated new appointment proposal shares appointment characteristics with a set of previous appointments that occurred at a same day of the week and time of day, and the updated new appointment proposal has a same location and set of invitees as the set of previous appointments, and occurs at a next instance of the same day of the week and time of day.

16. The non-transitory machine readable medium of claim 12, wherein:

the updated new appointment proposal shares appointment characteristics with a set of previous appointments that occurred at a same day of the week and time of day, and the updated new appointment proposal has a same location and set of invitees as the set of previous appointments, and occurs at a closest available time to next instance of the same day of the week and time of day.

17. A device comprising:

a set of processing units; and a machine readable medium storing a program which when executed by at least one of the processing units automatically generates an appointment for an electronic calendar, the program comprising sets of instructions for:

displaying a text input field for creating a new appointment for a calendar;

receiving a first portion of a text input in the text input field to create a new appointment for the calendar, wherein the first portion of the text input includes at least a part of a first appointment characteristic;

displaying, in the text input field, the first portion of the text input;

while receiving the first portion of the text input, analyzing a plurality of previous appointments stored for the calendar to identify one or more appointments that include the first appointment characteristic, wherein the one or more appointments that include the first appointment characteristic include:

a first appointment on a first date that includes the first appointment characteristic, and a first new appointment characteristic that is different from the first appointment characteristic;

displaying, based on the identified one or more appointments that include the first appointment characteristic, a new appointment proposal;

receiving a second portion of the text input that is a continuation of the first portion of the text input in the text input field, wherein the second portion of the text input includes at least a part of a second appointment characteristic that is different from the first appointment characteristic;

displaying, in the text input field, the second portion of the text input;

while receiving the second portion of the text input, updating the analysis of the plurality of previous appointments stored for the calendar to identify updated one or more appointments that include the first appointment characteristic and the second appointment characteristic, wherein the one or more appointments that include the first appointment characteristic and the second appointment characteristic include:

a second appointment on a second date that includes the first appointment characteristic and the second appointment characteristic, and a second new appointment characteristic that is different from the first appointment characteristic and the second appointment characteristic; and displaying, based on the updated analysis, an updated new appointment proposal that is on a third date different from the second date, wherein:

the new appointment has at least one appointment characteristic other than the first appointment characteristic and the second appointment characteristic shared with the second appointment, and the at least one appointment characteristic other than the first appointment characteristic and the second appointment characteristic includes the second new appointment characteristic.

18. The device of claim 17, wherein the set of instructions for analyzing the plurality of previous appointments stored for the calendar comprises a set of instructions for identifying regular occurrences in the previous appointments.

19. The device of claim 17, the program further comprising sets of instructions for:

in addition to displaying the updated new appointment proposal on the third date that is different from the second date, displaying a second updated new appointment proposal on a fourth date different from the third date, wherein:

the second new appointment has at least one appointment characteristic other than the first appointment characteristic and the second appointment characteristic shared with the second appointment, and the at least one appointment characteristic other than the first appointment characteristic and the second appointment characteristic includes the second new appointment characteristic;

receiving a user selection of the updated new appointment proposal or the updated second new appointment proposal; and creating an appointment in the calendar for the selected appointment.

20. The device of claim 19, wherein:

the selected appointment is proposed for a particular date and time, at a particular location, for a particular set of invitees, and the particular date and time, particular location, and particular set of invitees are editable prior to sending invitations of the appointment to the particular set of invitees.

21. The device of claim 17, wherein the set of instructions for displaying the updated new appointment proposal comprises a set of instructions for using at least one of the identified updated one or more appointments as a template for the updated new appointment proposal.

22. The method of claim 1, wherein:
   displaying the new appointment proposal comprises displaying a first affordance for creating a new appointment corresponding to the new appointment proposal, and
   displaying the updated new appointment proposal comprises displaying a second affordance for creating a new appointment corresponding to the updated new appointment proposal.

23. The method of claim 1, wherein displaying the updated new appointment proposal comprises replacing display of the new appointment proposal with the updated new appointment proposal, wherein replacing display of the new appointment proposal includes removing display of the new appointment proposal prior to displaying the updated new appointment proposal.

24. The non-transitory machine readable medium of claim 12, wherein the appointment characteristics comprise at least one of (i) a day of the week, a start time, and an end time, (ii) a set of associated documents, and (iii) a location for the appointment.

25. The non-transitory machine readable medium of claim 12, wherein analyzing the plurality of previous appointments stored for the calendar comprises identifying regular occurrences in the previous appointments.

26. The non-transitory machine readable medium of claim 12, the program further comprising sets of instructions for:
   in addition to displaying the updated new appointment proposal on the third date that is different from the second date, displaying a second updated new appointment proposal on a fourth date different from the third date, wherein:
      the second new appointment has at least one appointment characteristic other than the first appointment characteristic and the second appointment characteristic shared with the second appointment, and
      the at least one appointment characteristic other than the first appointment characteristic and the second appointment characteristic includes the second new appointment characteristic;
   receiving a user selection of the updated new appointment proposal or the updated second new appointment proposal; and
   creating an appointment in the calendar for the selected appointment.

27. The non-transitory machine readable medium of claim 26, wherein:
   the selected appointment is proposed for a particular date and time, at a particular location, for a particular set of invitees, and
   the particular date and time, particular location, and particular set of invitees are editable prior to sending invitations of the appointment to the particular set of invitees.

28. The non-transitory machine readable medium of claim 12, displaying the updated new appointment proposal comprises using at least one of the identified updated one or more appointments as a template for the updated new appointment proposal.

29. The non-transitory machine readable medium of claim 12, wherein:
   displaying the new appointment proposal comprises displaying a first affordance for creating a new appointment corresponding to the new appointment proposal, and
   displaying the updated new appointment proposal comprises displaying a second affordance for creating a new appointment corresponding to the updated new appointment proposal.

30. The non-transitory machine readable medium of claim 12, wherein displaying the updated new appointment proposal comprises replacing display of the new appointment proposal with the updated new appointment proposal, wherein replacing display of the new appointment proposal includes removing display of the new appointment proposal prior to displaying the updated new appointment proposal.

31. The device of claim 17, wherein the text input is to name the new appointment and create the new appointment at a next available time.

32. The device of claim 17, wherein the appointment characteristics comprise at least one of (i) a day of the week, a start time, and an end time, (ii) a set of associated documents, and (iii) a location for the appointment.

33. The device of claim 17, wherein the appointment characteristics comprise a set of invitees, the program further comprising sets of instructions for:
   receiving a user selection of the updated new appointment proposal; and
   in response to receiving the user selection of the updated new appointment proposal, sending invitations regarding the updated new appointment proposal to each of the invitees in the set of invitees.

34. The device of claim 17, wherein:
   the updated new appointment proposal shares appointment characteristics with a set of previous appointments that occurred at a same day of the week and time of day, and
   the updated new appointment proposal has a same location and set of invitees as the set of previous appointments, and occurs at a next instance of the same day of the week and time of day.

35. The device of claim 17, wherein:
   the updated new appointment proposal shares appointment characteristics with a set of previous appointments that occurred at a same day of the week and time of day, and
   the updated new appointment proposal has a same location and set of invitees as the set of previous appointments, and occurs at a closest available time to next instance of the same day of the week and time of day.

36. The device of claim 17, wherein:
   displaying the new appointment proposal comprises displaying a first affordance for creating a new appointment corresponding to the new appointment proposal, and
   displaying the updated new appointment proposal comprises displaying a second affordance for creating a new appointment corresponding to the updated new appointment proposal.

37. The device of claim 17, wherein displaying the updated new appointment proposal comprises replacing display of the new appointment proposal with the updated new appointment proposal, wherein replacing display of the new appointment proposal includes removing display of the new appointment proposal prior to displaying the updated new appointment proposal.

* * * * *